United States Patent [19]
Nakamura et al.

[11] Patent Number: 5,987,174
[45] Date of Patent: *Nov. 16, 1999

[54] IMAGE PROCESSING APPARATUS FOR VEHICLES

[75] Inventors: Kazuto Nakamura, Hitachinaka; Kazuaki Takano, Mito; Tatsuhiko Monji, Hitachinaka; Eiryo Ondo, Higashi-murayama; Yasunari Tanaka, Mito; Kazuhiko Hanawa, Hitachinaka, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,988

[22] PCT Filed: Apr. 25, 1996

[86] PCT No.: PCT/JP96/01133

§ 371 Date: Dec. 24, 1996

§ 102(e) Date: Dec. 24, 1996

[87] PCT Pub. No.: WO96/34363

PCT Pub. Date: Oct. 31, 1996

[30] Foreign Application Priority Data

| Apr. 26, 1995 | [JP] | Japan | 7-102441 |
| May 18, 1995 | [JP] | Japan | 7-11986 |
| May 18, 1995 | [JP] | Japan | 7-119857 |

[51] Int. Cl.[6] .................................................. G06K 9/48
[52] U.S. Cl. ................................. 382/199; 382/104
[58] Field of Search .................................... 382/104, 153, 382/199, 103, 203, 298, 266, 162

[56] References Cited

U.S. PATENT DOCUMENTS

| 5,307,419 | 4/1994 | Tsujino et al. ........................... 382/153 |
| 5,555,312 | 9/1996 | Shima et al. ............................. 382/104 |

FOREIGN PATENT DOCUMENTS

| 0 390 583 A2 | 10/1990 | European Pat. Off. . |
| 62-221800 | 9/1987 | Japan . |
| 3-194670 | 8/1991 | Japan . |

(List continued on next page.)

OTHER PUBLICATIONS

H. Münkel, K. Welz, "Verfolgung des Strassenverlaufes in einer Farbbildofolge" (Tracking the Course of a Road in a Color Image Sequence), Mustererkennung 1991, 13, ADGM–Symposium, Munich, pp. 515–520, Springer–Verlag.

L. Tsinas, H. Meier, W. Efenberger, "Farbgestützte Verfolgung von Objekten mit dem PC–basierten Multiprozessorsystem BVV4" (Color–Assisted Tracking of Objects in the PC–based Multiprocessor System BVVR), Mustererkennung 1993, 15, DAGM–Symposium, Lübeck, pp. 741–748, Springer–Verlag.

(List continued on next page.)

Primary Examiner—Joseph Mancuso
Assistant Examiner—Vikkram Bali
Attorney, Agent, or Firm—Evenson, McKeown, Edwards & Lenahan, P.L.L.C.

[57] ABSTRACT

An image pickup unit (2) mounted on a vehicle shoots an image in front thereof to attain image information. An edge pixel extraction section (40202 to 40206) scans the obtained image information for each line and then checks boundaries between a particular color and the other colors to extract pixels having the particular color as edge pixels. Moreover, a candidate line extraction section (40208 to 40212) references position coordinates of the extracted edge pixels such that assuming the edge pixels to be classified to configure straight lines, the edge pixels are coupled with each other to configure straight lines according to the classification so as to obtain the straight lines as candidate lines.

Thereafter, a line selection section (40212) selects a left line and a right line in front of the vehicle from the plural candidate lines, thereby attaining the left and right lines.

29 Claims, 34 Drawing Sheets

FOREIGN PATENT DOCUMENTS

| | | |
|---|---|---|
| 4-134503 | 5/1992 | Japan . |
| 4-273587 | 9/1992 | Japan . |
| 6-124340 | 5/1994 | Japan . |
| 6-229760 | 8/1994 | Japan . |

OTHER PUBLICATIONS

E.D. Dickmans, Birger D. Mysliwetz, "Recursive 3–D Road and Relative Ego–State Recoginition", IEEE Transactions on pattern analysis and machine intelligence, vol. 14, No. 2, Feb. 1992, pp. 199–213.

| REFERENCE VECTOR | COMPORISON VECTOR | GROUPED VECTOR | GROUP NO. | NO. OF POINTS OF GROUPED VECTOR |
|---|---|---|---|---|
| L0 |  | L0 | 1 | 2 |
| L1 | L1 | L0+L1 | 1 | 3 |
| L2 | L0+L1 | L0+L1+L2 | 1 | 4 |
| L3 | L0+L1+L2 | L3<br>M0 | 2<br>3 | 2<br>2 |
| L4 | M0<br>L3 | L4<br>M1 | 4<br>5 | 2<br>2 |
| M1 | L0+L1+L2 | M1+L0+L1+L2<br>M1 | 1<br>5 | 5<br>0 |
| L5 | M1+L0+L1+L2<br>L4 | M1+L0+L1+L2<br>+L5 | 1 | 6 |

IDEAL LANE WIDTH W 50

SCREEN BOTTOM
HORIZONTAL LINE 42

IDEAL LANE WIDTH W 50

SCREEN BOTTOM
HORIZONTAL LINE 42

(DAYTIME COLOR SIGNAL CONDITION)

(DAYTIME LUMINANCE SIGNAL CONDITION)

(NIGHTTIME COLOR SIGNAL CONDITION)

(NIGHTTIME LUMINANCE SIGNAL CONDITION)

WITHOUT UPDATE

NEW SETTING

INSIDE OF
SETTING AREA

OUTSIDE OF
SETTING AREA

WITHOUT UPDATE

NEW SETTING

INSIDE OF
SETTING AREA

OUTSIDE OF
SETTING AREA

ROAD SURFACE
LINE

AREA SATISFYING EXTRACTION COLOR CONDITION

EDGE PIXEL

SCREEN CENTER
RECOGNITION LINE

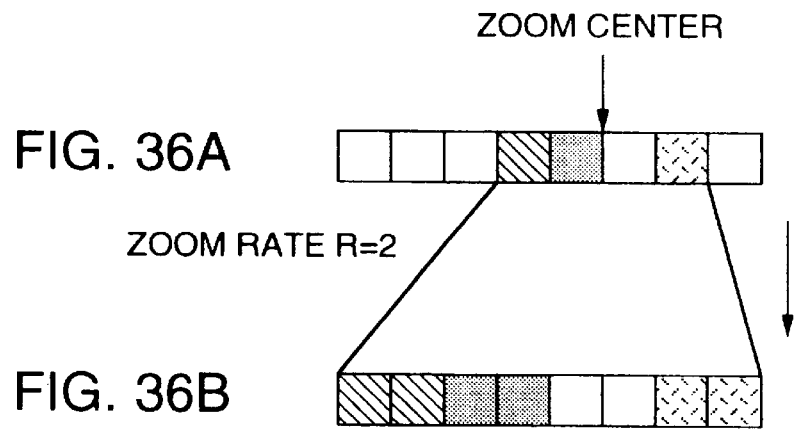
FIG. 36A
FIG. 36B
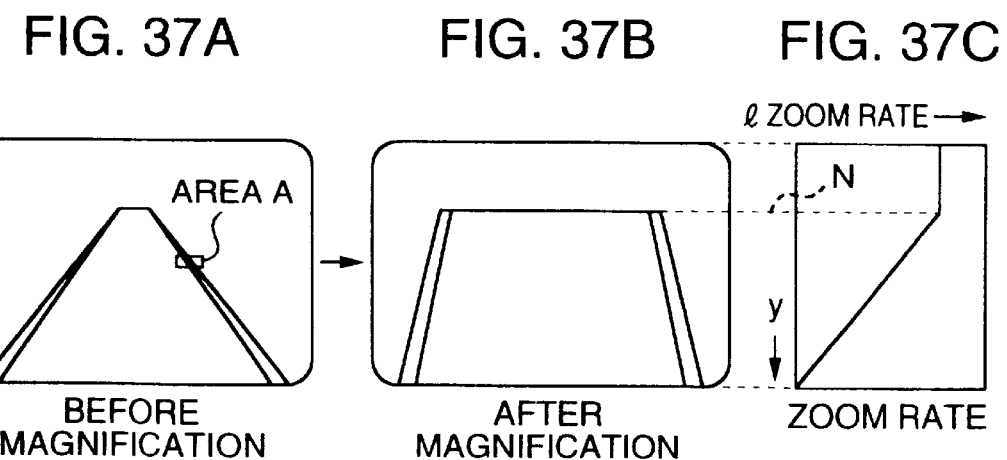
FIG. 37A  FIG. 37B  FIG. 37C

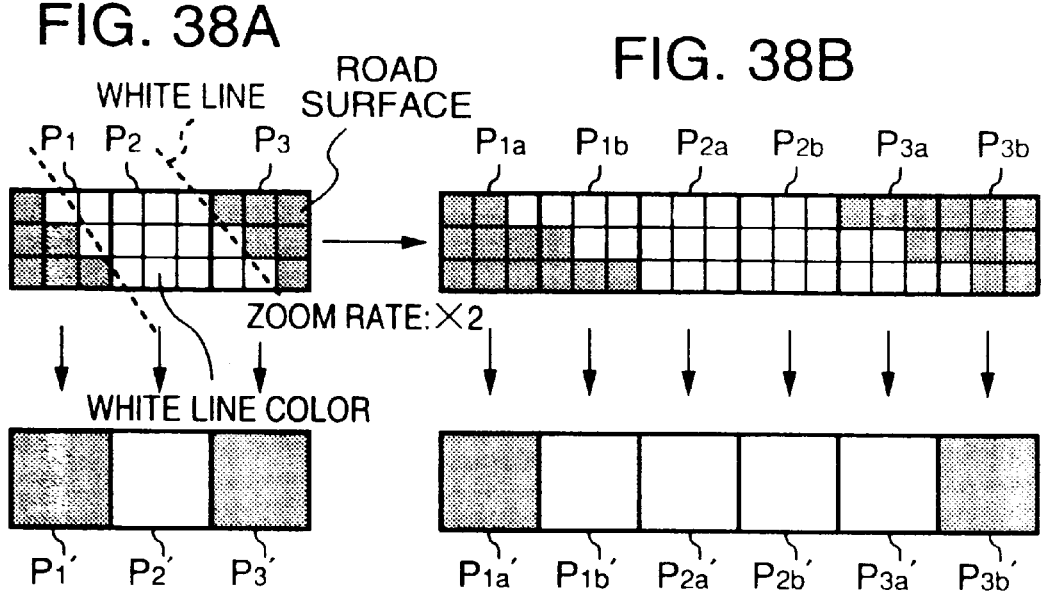
FIG. 38A  FIG. 38B
FIG. 38C  FIG. 38D
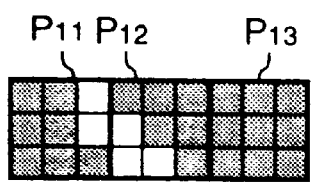
FIG. 39A
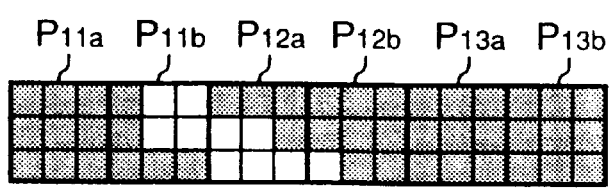
FIG. 39B
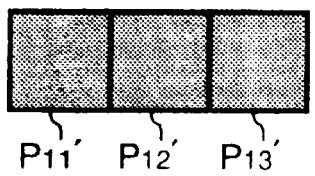
FIG. 39C
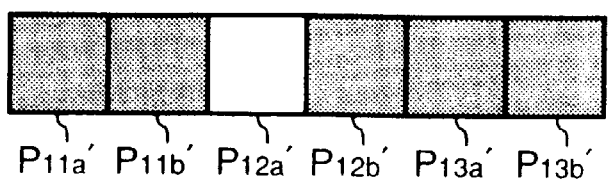
FIG. 39D

BEFORE MAGNIFICATION

AFTER MAGNIFICATION

ZOOM RATE

ZOOM CENTER COORDINATES

BEFORE MAGNIFICATION

AFTER MAGNIFICATION

ZOOM RATE

SCREEN IMAGE

RECOGNITION LINE

SCREEN IMAGE
+RECOGNITION LINE

SCREEN IMAGE
+RECOGNITION LINE
+WARNING

IMAGE PROCESSING APPARATUS FOR VEHICLES

TECHNICAL FIELD

The present invention relates to an image processing apparatus for selecting an image indicating a particular straight or curved line according to image information obtained through an image pickup operation, and in particular, to an apparatus operative according to image information obtained through an image pickup operation by an onboard camera for correctly recognizing a line for a vehicle with respect to a lane on which the vehicle is running.

BACKGROUND ART

An apparatus for recognizing a running route or lane area according to image information obtained through an image pickup operation by an onboard camera has been described, for example, in the JP-A-4-134503 (article (1)).

The apparatus above includes scan means for extracting a running route edge from image information inputted via image input means and scanning upward an image associated with the extracted running route edge beginning at a particular reference point in a horizontal direction and means for setting a center of the scanned area to a particular reference point in the horizontal direction for the subsequent scanning operation such that the running route zone according to the area scanned by the scan means.

In other words, a color corresponding to pixels which constitute the image information and which are at the lower portion of the screen is assumed as a particular color (color of the road surface) to examine an area including a set of pixels having color information equivalent to the particular color, thereby determining a zone or an area enclosed with the particular color as a road area in front of the vehicle.

However, in accordance with the prior art described in article (1), although the zone enclosed with the particular color is assumed as a road area in front of the vehicle, there still remains a problem, for example, occurrence of an event in which the road zone enclosed with road edges (corresponding to lines of the vehicle) cannot be exactly extracted only by the technology.

For example, in a case in which the contour of the road area in front of the vehicle is complicated due to presence of wheel tracks, it is determined that there exist edges of the running route in addition to the line in the road. Resultantly, the edge cannot be appropriately recognized. In addition, there have frequently occurred a case in which the road zone cannot be correctly recognized.

On the other hand, for such a vehicle which runs on a road, it is necessary for the driver to appropriately drive the vehicle so that the vehicle runs along a predetermined running lane.

Consequently, the driver is required to continuously monitor the running road surface to pay attention to the state of the road surface and presence of other vehicles and obstacles. Therefore, a heavy psychological and physical load is imposed on the driver.

As a result, if the driver loses concentration or the driver's attention is distracted in a driving state in which the vehicle exceeds its own running lane at random, there may possibly occur a grave accident.

In particular, on a general road including opposing traffic lanes in which vehicles run mutually in the opposite directions, if a vehicle exceeds a central line of the road into the opposing traffic lane, there will possibly occur quite a serious accident.

To solve the problem, the JP-A-62-221800 (article (2)) has disclosed an apparatus in which an image of a road surface in front of the pertinent vehicle is obtained by a color image pickup device. According to the obtained color image signal, a line of the vehicle is decided according to the difference in color between the line and the road surface to thereby issue an alarm message to the driver of the vehicle.

In the conventional technology described in article (2), the existence of the line is determined according to a color representing the line, namely, yellow or white.

Since the road surface is grey and hence it is guaranteed to discriminate the road surface from the yellow line. However, the discrimination is impossible by the color difference between the white line and the grey road surface and it is therefore necessary to achieve the discrimination according to luminance.

Consequently, in a case in which the state around the road, namely, the road environment is altered, for example, luminance varies in a tunnel (an obtained image is yellow due to the yellow illumination) or due to illumination at night, it is difficult to recognize the line of vehicle according to the change in the state.

On the other hand, in the apparatus in which the line of vehicle is recognized according to image data obtained by the onboard camera, there has been generally used a method in which the state in front of the vehicle is shot by one camera. However, such an apparatus is attended with the following problems. To recognize the state in a wide range, when there is disposed a wide-angle lens, it is difficult to recognize the line in the faraway place. On the other hand, to recognize the line in the faraway place, when there is adopted a zoom mechanism of the optical system, the recognizable field of vision is restricted.

To improve the apparatus, there has been disclosed an apparatus described, for example, in the JP-A-06-229760 (article (3)).

The apparatus includes a solid-state image pickup block including an optical system having a low zoom rate and a solid-state image pickup block including an optical system having a high zoom rate. Comparing image data attained by the block of low zoom rate with that obtained by the block of high zoom rate, it is recognized that the running route in a relatively faraway place in front of the vehicle has a contour of a curved route or that the vehicle is in a state to enter a curved route.

However, according to the prior art of article (3) described above, the configuration includes a solid-state image pickup block including an optical system having a high zoom rate to recognize the contour of the line in a relatively faraway place. Therefore, there are required two optical systems for the high and low zoom rates and two solid-state image pickup blocks for the respective optical systems. This leads to a problem, namely, the size of the apparatus is increased and hence the apparatus is not necessarily suitable as a device to be mounted on a vehicle; moreover, the production cost thereof is inevitably soared.

Additionally, in consideration of the environment related to the mounting of the apparatus, namely, in the environment of a high temperature and a large amplitude of vibration, it is strongly desired that the number of optical systems is to be possibly reduced in the configuration of the apparatus.

It is therefore a first object of the present invention in relation to the problem of the prior art of article (1) to provide an apparatus in which when recognizing a line of vehicle for a running lane of the vehicle according to image information obtained by a camera mounted thereon, the line of vehicle can be correctly recognized even there exists such an edge other than the line as a noise in the road area in front of the vehicle.

A second object of the present invention in relation to the problem of the prior art of article (2) is to provide a road surface monitor apparatus employing an image process in which changes in luminance and color of the road surface just in front of the vehicle are determined to discriminate the road surface from the line of vehicle according to the luminance and color, thereby appropriately recognizing the line.

A third object of the present invention in relation to the problem of the prior art of article (3) is to provide a road surface monitor apparatus employing an image process in which when recognizing a line of vehicle for a running lane of the vehicle according to image information obtained by a camera mounted thereon, the configuration of the apparatus is not required to include a plurality of optical systems and the line can be correctly recognized in a running lane in a relatively faraway place while retaining a wide field of vision.

DISCLOSURE OF INVENTION

To achieve the first object, there is provided according to the present invention an image processing apparatus including an image pickup unit for shooting an image to attain image information, an edge pixel extraction unit for scanning for each line the image information obtained through the shooting operation by the image pickup unit, checking boundaries between a particular color and other colors, and extracting pixels having the particular color as edge pixels, a line image extraction unit for coupling the extracted edge pixels into a straight line, thereby attaining a line image, and a line image selection unit for selecting two line images according to a predetermined rule from the extracted plural line images.

The image processing apparatus favorably includes an image pickup unit mounted on a vehicle for shooting an image to attain image information, an edge pixel extraction unit for scanning for each line the image information obtained through the shooting operation by the image pickup unit, checking boundaries between a particular color and other colors, and extracting pixels having the particular color as edge pixels, a candidate line extraction unit for referencing position coordinates of the extracted edge pixels, assuming the edge pixels to be classified into straight lines, obtaining straight lines by coupling the edge pixels corresponding to respective results of the classification, and setting the obtained straight lines as candidate lines, and a line selection unit for selecting a left line and a right line in front of the vehicle from the candidate lines.

Incidentally, in the image processing apparatus, the line selection unit favorably selects, in an operation to select either one of the left and right lines by assuming a central perpendicular line of front image information, as a line of vehicle one of the candidate lines which has the largest number of edge pixels on the left or right side of the central perpendicular line.

In addition, favorably, an image in front of the vehicle is shot by an image pickup unit mounted on the vehicle, thereby obtaining image information.

Desirably, the edge pixel extraction unit scans the obtained image information for each line, checks boundaries between a particular color and other colors, and extract pixels having the particular color as edge pixels. Moreover, the candidate line extraction unit references position coordinates of the extracted edge pixels, assumes the edge pixels to be classified into straight lines, obtains straight lines by coupling the edge pixels corresponding to respective results of the classification, and sets the obtained straight lines as candidate lines Favorably, the line selection unit selects the left and right lines in front of the vehicle from the plural candidate lines, thereby obtaining the left and right lines.

Favorably, the line selection unit may select, in an operation to select lines by assuming a central perpendicular line of front image information, as a line of vehicle one of the candidate lines which has the largest number of edge pixels on the left or right side of the central perpendicular line.

As above, according to the present invention, the left and right lines can be detected from the plural candidate lines according to information such as an arrangement relationship between lines. Resultantly, the road surface area on which the vehicle can run can be correctly recognized.

To achieve the second object, there is provided according to another aspect of the present invention an image processing apparatus for identifying a line of vehicle disposed on a running road surface according to color image data of the road surface, including a color image pickup unit for shooting an image in front of a vehicle along a running direction thereof, an edge pixel extraction unit for scanning for each line the image data obtained through the shooting operation by the color image pickup unit, checking boundaries between a particular color and other colors, obtaining pixels having the particular color as edge pixels, and extracting pixels satisfying a particular extraction color condition from the obtained edge pixels, a color sampling unit for sampling color data of the decided pixels from a screen of the image data, extraction condition decision means for determining the extraction color condition according to the sampled color data, and a line image extraction unit for attaining as a line of vehicle a line image configured by coupling the extracted edge pixels into a straight line.

Favorably, there is disposed a unit to decide an illumination condition of the running road surface according to the sampled color data such that the opening of the iris of the optical system included in the color image pickup unit and the color conversion gain of an image data processing system thereof are controlled according to a result of the decision.

Desirably, the image extraction unit extracts pixels satisfying the determined extraction color condition from the screen configured with the image data, the color sampling unit samples color data from the pixels extracted by the pixel extraction unit, and the extraction condition deciding unit decides the extraction condition according to the sampled color data.

In this way, since the line recognition is carried out according to the extracted pixels, the road surface can be discriminated from the line according to the luminance and colors in association with the change in the state of the periphery of the road, thereby appropriately recognizing the line.

To achieve the third object, there is provided according to further another aspect of the present invention an image processing apparatus including an image processing apparatus including an image pickup unit for shooting an image to attain image information, an image magnification process unit for magnifying a size of the obtained image information, an edge pixel coordinate sense unit for scanning for each line the magnified image information, checking boundaries between a particular color and other colors, and extracting pixels on the boundaries, and obtaining position coordinates of the extracted edge pixels, an edge pixel coordinate conversion means for converting the position coordinates of the extracted edge pixels into coordinates before the magnification process, a line image extraction unit for referencing the converted coordinates of the edge pixels and coupling the edge pixels into a straight line, thereby attaining a line image, and a magnifying condition storage unit for storing therein a zoom rate as a magnitude of magnification of the image information and a magnification center coordinate indicating a reference position for the execution of the magnification process of the image information, the magnification factor and the magnification center coordinate being defined for each horizontal line.

Favorably, the image magnification process unit conducts a process to reference storage contents in the magnifying condition storage means so as to magnify for each horizontal line the size of the image information with the magnification center coordinate set to a center of magnification according to a magnification factor indicated by the zoom rate.

Desirably, the image processing apparatus includes an image pickup means mounted on a vehicle for shooting an image in front thereof to attain image information, an image magnification process unit for magnifying a size of the obtained image information, an edge pixel coordinate sense unit for scanning for each line the magnified image information, checking boundaries between a particular color and other colors, and extracting pixels on the boundaries, and obtaining position coordinates of the extracted edge pixels, an edge pixel coordinate conversion unit for converting the position coordinates of the extracted edge pixels into coordinates before the magnification process, a line extraction unit for referencing the converted coordinates of the edge pixels and coupling the edge pixels into a straight line so as to attaining a left line and a right line, and a magnifying condition storage unit for storing therein a zoom rate as a magnitude of magnification of the image information and a magnification center coordinate indicating a reference position for the execution of the magnification process of the image information, the magnification factor and the magnification center coordinate being defined for each horizontal line.

Favorably, the image magnification process unit conducts a process to reference storage contents in the magnifying condition storage unit so as to magnify for each horizontal line the size of the image information with the magnification center coordinate set to a center of magnification according to a magnification factor indicated by the zoom rate.

Favorably, the image magnification process unit conducts a process to magnify the size of the obtained image information only in the horizontal direction.

Favorably, an image in front of the vehicle is shot by an image pickup unit mounted on the vehicle to obtain image information.

Desirably, stored in the magnification condition storage unit are a zoom rate as a magnitude of magnification of the image information and a magnification center coordinate indicating a reference position for the execution of the magnification process of the image information, the magnification factor and the magnification center coordinate being defined for each horizontal line.

Favorably, the size of the obtained image information is magnified by the image magnification process unit.

Specifically, the image magnification process unit executes a process to reference the storage contents in the magnifying condition storage means so as to magnify for each horizontal line the size of the image information with the magnification center coordinate set to a center of magnification according to a magnification factor indicated by the zoom rate. In this operation, the image magnification process unit conducts a process to magnify the size of the obtained image information only in the horizontal direction.

Additionally, the edge pixel coordinate sense unit scans the magnified image information for each horizontal line, checks boundaries between a particular color and the other colors, and extracts pixels on the boundaries as edge pixels to obtain position coordinates of the extracted edge pixels. Moreover, the edge pixel coordinate conversion unit converts the position coordinates of the extracted edge pixels into coordinates before the magnification process.

In addition, the line extraction unit references the converted coordinates of the edge pixels and couples the edge pixels into straight lines to obtain the left and right lines.

As above, according to the present invention, the image information obtained by the image pickup unit is magnified (simply referred to as "zooming an image" for convenience herebelow) such that the running traffic lines can be correctly recognized according to the image data undergone the magnification process.

In other words, adopting the image zooming operation, it is possible to extract pixels (edge pixels) indicating the boundaries between the road surface and the lines in a state in which the line width is magnified and hence the lines in the faraway place can be appropriately recognized.

BRIEF DESCRIPTION OF DRAWINGS

FIGS. 36A and 36B are diagrams for explaining the principle of a zoom process.

FIGS. 37A to 37C are diagrams for explaining images before and after the zoom process and a zoom rate.

FIGS. 38A to 38D are diagrams for explaining an edge decision process.

FIGS. 39A to 39D are diagrams for explaining an edge decision process.

BEST MODE FOR CARRYING OUT THE INVENTION

Figure 1:
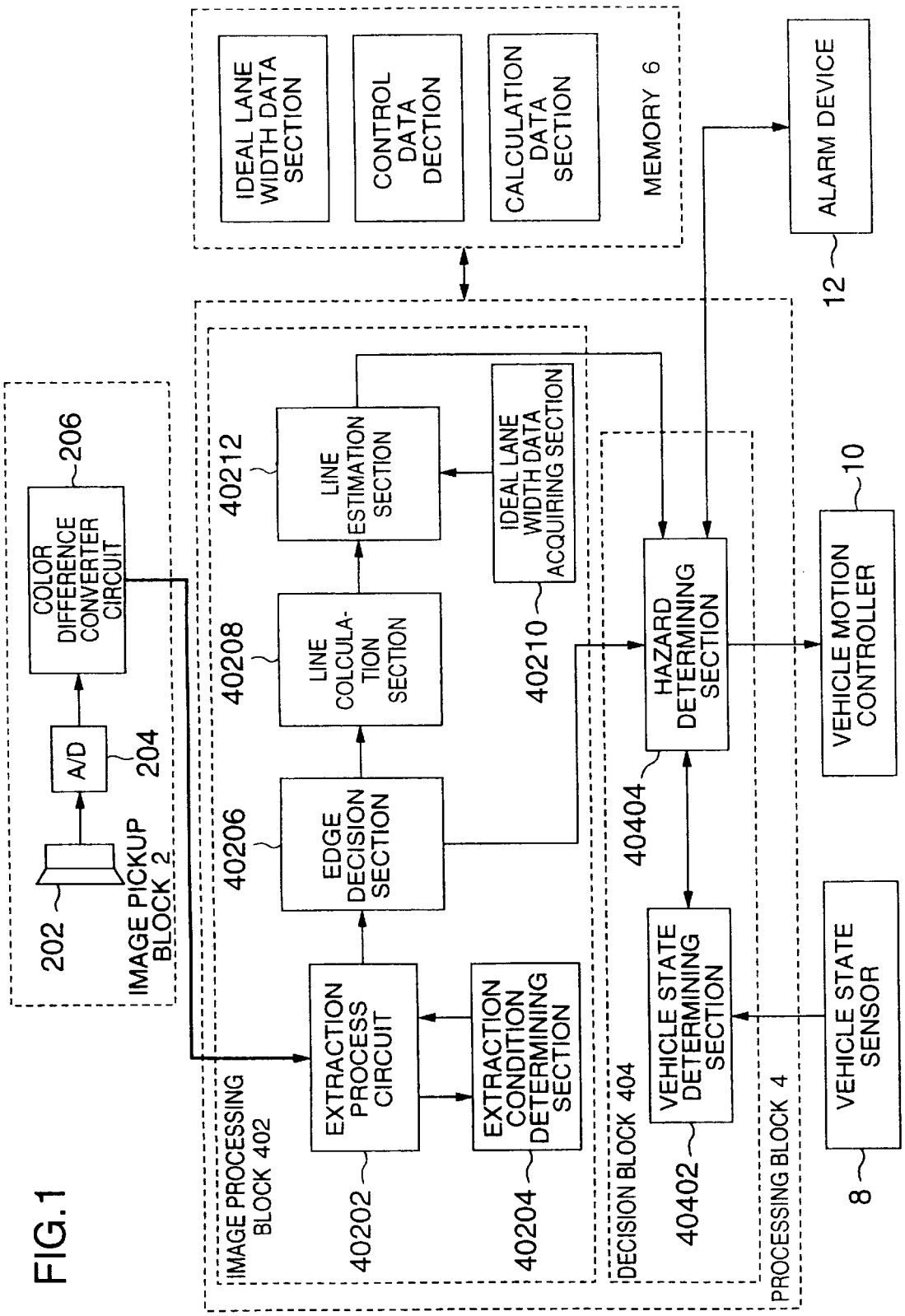
FIG. 1 is a block diagram showing the overall configuration of a first embodiment of the image processing apparatus according to the present invention.

Referring now to the drawings, description will be given of an embodiment of the image processing apparatus according to the present invention.

FIG. 1 shows the configuration diagram of a first embodiment of the image processing apparatus according to the present invention.

The apparatus includes an image pickup block 2, a processing block 4, and a memory 6. Moreover, the processing block 4 includes an image processing section 402 and a decision section 404. In this configuration, signals are communicated between the decision section 404 and a vehicle state sensor 8, a vehicle motion controller 10, and an alarm device 12. Incidentally, like in the embodiment shown in FIG. 11F, a display section may be connected to an output side of the imaging block (image pickup block) also in this embodiment.

The respective constituent components will be next described.

First, the constituent elements of the image pickup block 2 will be described.

A CCD camera 202 is image pickup means to shoot an image in front thereof so as to obtain image information and has a function to attain image information of an object in front thereof and to convert the information into a color analog signal. In the onboard apparatus, the CCD camera 202 need only be arranged, for example, at a position in a favorable environment with little dirt in the vicinity of the grille in the front side of the vehicle.

Subsequently, an A/D converter 204 accomplishes a process to convert an analog image signal outputted from the CCD camera 202 into a digital signal.

Next, a color difference converter circuit 206 is a circuit having a function to multiply the digital signal produced from the A/D converter 204, i.e., a digital signal of the object including three primary colors R(red), G (green), and B (blue) components by a color emphasis gain including $\gamma R$, $\gamma G$, and $\gamma B$ components to thereafter convert the signal into a luminance signal Y and color difference (R−Y) and (B−Y)) image signal.

In this connection, although the process of the multiplication of the color emphasis gain is not necessarily required, it is favorable to conduct this process.

The image signals Y, R−Y, and B−Y are defined according to the R, G, and B signals as follows. First, R', G', and B' are defined using the R, G, and B signals and color emphasis gain components γR, γG, and γB as shown below.

$$R'=R\cdot\gamma R$$

$$G'=G\cdot\gamma G$$

$$B'=B\cdot\gamma B$$

Employing R', G', and B' thus defined, the luminance and color difference signals are defined as follows.

$$Y=0.3R'+0.6G'+0.1B'$$

$$R-Y=0.7R'-0.6G'-0.1B'$$

$$B-Y=-0.3R'-0.6G'+0.9B'$$

As above, the color difference converter circuit 206 multiplies the digital signals of object including three primary colors R(red), G (green), and B (blue) components by the color emphasis gain (γR, γG, and γB) and then converts the resultant signals into the image signals including the luminance signal Y and color difference signals R−Y and B−Y to send the signals to the image processing section 402.

Next, the image processing section 402 will be described. However, since the contents of operation thereof will be described in detail later, the functions of the respective elements will be briefly described in the following paragraphs.

As shown in FIG. 1, the processing block includes the image processing section 402 and the decision section 404.

First, description will be given of the constituent components of the image processing section 402.

An extraction process circuit 40202 is a circuit having two primary functions.

According to one of the functions, the image signal sent from the color difference converter circuit 206 is processed for each horizontal scan line so as to extract therefrom pixels corresponding to extraction color condition data (which will be described later) transferred from an extraction color condition determining section 40204. Thereafter, position coordinate data (edge coordinate data) corresponding to the extracted pixels on one horizontal line is transferred to an edge decision section 40206. Incidentally, the image signal may be supplied to the extraction process circuit 40202 via a buffer, not shown.

In this regard, in the investigation of one horizontal line, assuming a change point from a pixel not satisfying the extraction color condition data to a pixel satisfying the extraction color condition data, the pixel satisfying the extraction color condition data is called a rising edge and its coordinate data is referred to as edge coordinate data of rising edge. Similarly, in the investigation of one horizontal line, assuming a change point from a pixel satisfying the extraction color condition data to a pixel not satisfying the extraction color condition data, the pixel satisfying the extraction color condition data is called a falling edge and its coordinate data is referred to as edge coordinate data of falling edge. In this regard, the edge coordinate data includes, in addition to coordinate information, an information item indicating that the pertinent edge coordinates are related to a rising or falling edge.

According to the remaining one of the functions of the circuit, color data including Y, R−Y, and B−Y components of a particular pixel (pixel at a particular position of one frame) is sampled from the image information obtained by the pickup operation and is then transferred to the extraction color condition determining section 40204.

Subsequently, according to data (Y, R−Y, B−Y) corresponding to the road color beforehand stored in a control data section 604 of the memory 6 and the color data (Y, R−Y, B−Y) sampled by the extraction process circuit 40202, the extraction color condition determining section 40204 decides an extraction color condition and then transfers the condition to the extraction process circuit 40202.

The extraction color condition data is color data of pixels. As described above, according to the data, the circuit 40202 extracts pixels satisfying the extraction color condition data to obtain edge coordinate data. Incidentally, there may be considered, for example, a method of determining the extraction color condition data in which the beforehand stored data corresponding to the road color is used immediately after the apparatus is initiated. At lapse of a predetermined period of time thereafter, the color data sampled by the extraction process circuit 402020 is utilized. A more specific method of deciding the data will be described later.

Next, an edge decision section 40206 is a circuit to decide according to a predetermined algorithm that each of the edge coordinate data items (edge coordinate data items respectively of rising and falling edges) corresponds to either one of the edge coordinate data assumed to constitute a left line of the running lane of the vehicle, the edge coordinate data assumed to constitute a right line of the running lane of the vehicle, and other edge coordinate data. The algorithm will be described later. In this connection, the other edge coordinate data includes, for example, edge coordinate data extracted for image information of a vehicle in front of the pertinent vehicle.

The edge decision section 40206 then transmits edge coordinate data considered to form the right and left lines to a line calculation section 40208 and any other edge coordinate data to a hazard decision section 40404.

Next, according to the edge coordinate data set from the edge decision section 40206 as data considered to form the right and left lines, the line calculation section 40208 decides linearity thereof and calculates as a candidate line a straight line constituted with edge coordinate of each line. Only one candidate line may be obtained or two or more such lines may be generated depending on cases. In this connection, the decision of linearity will be described later.

An ideal lane width data acquiring section 40210 possesses a function to acquire ideal lane width data and the like from an ideal lane width data section 602. In this context, the ideal lane width data is data which indicates the width of a running lane defined by the right and left lines.

A line estimation section 40212 checks, according to the ideal lane width data and the like acquired by the data acquiring section 40210, the candidate lines received from the line calculation section 40208 to determine right and left lines to be recognized (recognition lines) and then sends edge coordinate data and the like corresponding to the right and left lines to the hazard decision section 40404.

Subsequently, the constituent elements of the decision block 404 will be described.

In this connection, the decision block 404 is an example in which the embodiment is applied to a facility to stimulate attention of the driver. The decision block itself is not included in the primary portion of the embodiment.

A vehicle state decision section 40402 determines the running state of the pertinent vehicle according to a signal sent from the vehicle state sensor 8 and then transfer the result of decision to the hazard decision section 40404.

In this construction, the sensor 8 is means to sense the momentum of the vehicle, driving intention of the driver, and the like and includes, for example, a vehicle speed sensor to measure the speed of the vehicle, a direction indicator, a steering angle sensor, or the like.

In the hazard decision section 40404, the running lane of the pertinent vehicle is recognized according to the data of right and left recognition lines sent from the line estimation section 40212, presence of a car, an obstacle, or the like in front of the vehicle according to the edge coordinate data transmitted from the edge decision section 40206, and the degree of hazard of the vehicle according to the data sent from the vehicle state decision section.

For example, the speed of the vehicle detected by the vehicle speed sensor is equal to or more than a predetermined value and it is recognized that a car or the like exists at a particular position in image information of an image in front of the vehicle, the hazard decision section regards the state as a hazard and then drives the vehicle motion controller 10 and the alarm device 12. The controller 10 is a facility to control the driving system, control system, steering system, and the like. A specific example of the controller is, for example, an automatic brake.

Furthermore, the alarm device 12 may be any means which stimulates attention of the driver via the driver's auditory and visual senses. There can be considered, for example, a chime driving operation and an LED presentation.

The decision block 40 above may be constructed in various configurations.

Additionally, the memory 6 includes an ideal lane width data section 602 for storing therein ideal lane width data to be adopted in the line decision, a control data section 604 for storing therein such data as various data items to control the apparatus and data items (Y, R–Y, B–Y) associated with the road color, and a calculation data section 606 for temporarily storing therein data items calculated or estimated by the circuits related thereto.

Figure 2:
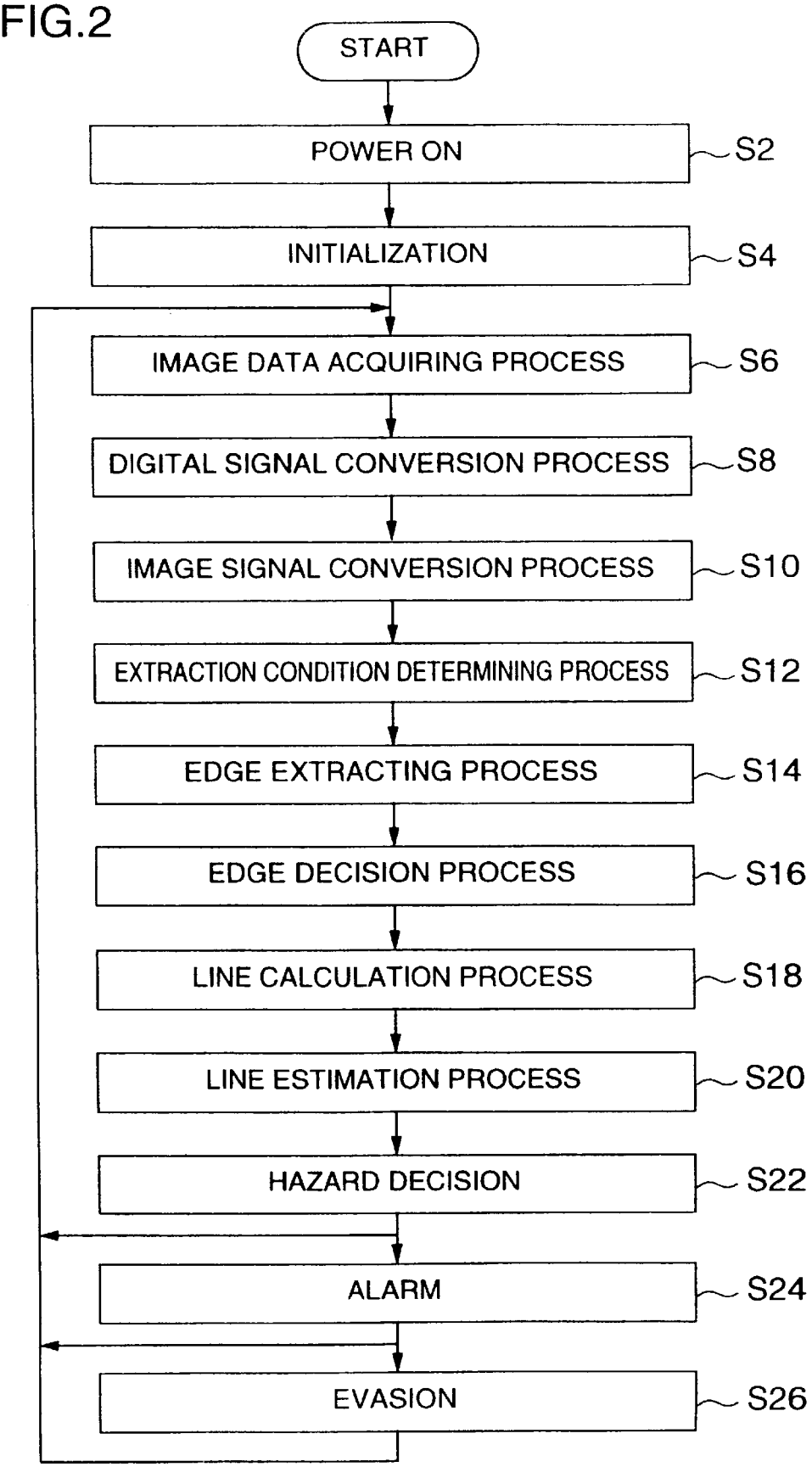
FIG. 2 is a flowchart for explaining the entire processing of the embodiment of FIG. 1.

Referring next to FIG. 2, description will be given of operation of the apparatus according to the present embodiment.

First, to initiate the apparatus, the power source of the apparatus is turned on (S2).

Subsequently, the apparatus is initialized (S4). In this connection, the initialization is a process including, for example, the clearing of the work area in the calculation data section 606.

Next, a signal corresponding to image information of an image in front of the vehicle shot by the CCD camera 202 is outputted as analog RGB signal (S6).

The analog signal is then converted by the A/D converter 204 into a digital RGB signal (S8).

Thereafter, according to the conversion formula, the color difference converter circuit 206 transform the RGB signal into a luminance signal Y and color difference signals R–Y and B–Y (S10) and then transfers the signals to the extraction process circuit 40202.

In this regard, the reason for the adoption of the luminance and color difference signals is that the obtained signal indicates a large difference between the road and the vehicle when compared with the case in which the RGB signal is directly utilized.

Next, there is carried out a process to determine extraction color condition data (S12). In this specification, the extraction color condition is a condition of color data to extract pixels of the road surface.

In this process, the extraction process circuit 40202 samples color data (Y, R–Y, B–Y) of particular pixels (pixels at positions of the road in the screen) from the obtained image information.

Subsequently, according to the sample data and the data (Y, R–Y, B–Y) associated with the road color beforehand stored in the control data section 604 of the memory 6, the extraction color condition decision section 40204 determines extraction color condition data. The data thus determined is defined, for example, as follows. Incidentally, in the determination of the extraction color condition data, "minimum" in the following description indicates that a data item having the smallest value need only be selected from the sample data and the data corresponding to the road color beforehand memorized and "maximum" designates that a data item having the largest value need only be chosen from the sample data and the data corresponding to the road color beforehand memorized.

$Y(Minimum) < Y < Y(Maximum)$ $R-Y(Minimum) < R-Y < R-Y(Maximum)$ $B-Y(Minimum) < B-Y < B-Y(Maximum)$ As above, there are decided a condition having a range of value such that the color of the road in front of the vehicle satisfies the condition, but the lines and the color of the car in front of the vehicle does not satisfy the condition. With this provision, it is possible to recognize the lines and the car in front of the vehicle.

Incidentally, although the extraction color condition data is decided according to the sampled data and the data beforehand set in the embodiment, the data may also be determined according only to the data beforehand prepared (for example, beforehand set in association with a luminance condition).

Thereafter, for each horizontal line, the extraction process circuit 40202 conducts a process in which the circuit 40202 extracts, from the obtained image information, pixels having color information associated with the extraction color condition data transferred from the condition decision section 40204 and then transfers edge coordinate data of the rising edge and edge coordinate data of the falling edge described above to the edge decision section 40206 (S14). That is, there are extracted the rising and falling edges representing edge points enclosing the road area (traffic lane). In this regard, as shown in FIG. 3, the extracted rising and falling edges (indicated by circles) are referred to as rising edge data and falling edge data, respectively.

Figure 3A:
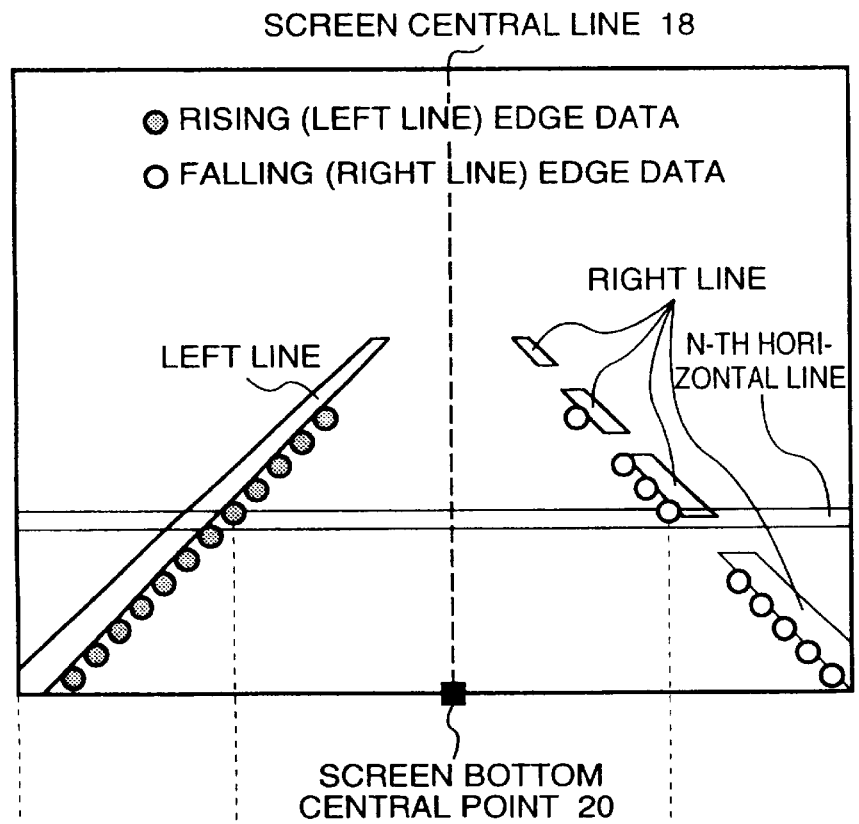
FIGS. 3A and 3B are diagrams for explaining an edge detecting operation in the embodiment of FIG. 1.
Figure 3B:
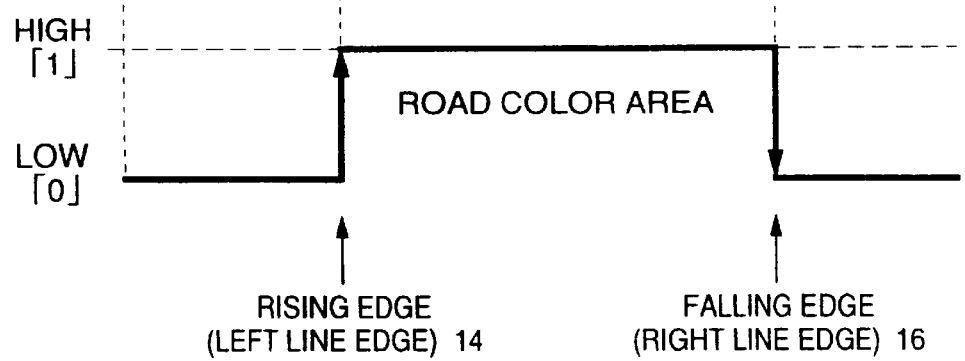

Referring now to FIG. 3, the process above will be described in detail. As can be seen from FIG. 3, according to the extraction method, all pixels of one frame having a color belonging to the range of the extraction condition data are detected from the image pickup or image signal (Y, R–Y, B–Y) to assign a high-level value of "1" to each detected pixel and a low-level value of "0" to the other pixels, thereby producing binarized data.

This process is carried out for each horizontal line. In this case, the process has been described in conjunction with an example of the N-th horizontal line (row N horizontal line) as shown in FIG. 3.

Any pixels at which pixel data alters from Low "0" to High "1" or from High "1" to Low "0" are retrieved. Namely, a rising edge 14 from Low "0" to High "1" and a falling edge 16 from High "1" to Low "0" are detected. When such pixels are present, the positions thereof are assumed to represent edge coordinate data. According to the edge coordinate data, existence of pixels corresponding to the extraction color condition data can be determined in one horizontal line such that a region enclosed with the edge coordinate data is obtained as a road area (area of road color)

of the running lane of the pertinent vehicle. There exist the right and left lines on the respective sides of a screen central line 18 which passes a screen bottom central point 20 indicating the central position of the screen bottom in the horizontal direction and which is perpendicular to the horizontal direction.

In addition, ordinarily, the left line is decided according to the rising edge data, whereas the right line is decided according to the falling edge data. However, when there exists a plurality of kinds of edge data items for objects other than the lines, the lines cannot be recognized in such a simple fashion.

Subsequently, the edge decision section 40206 investigates the edge coordinate data sent from the extraction process circuit 40202 to determine that the data is edge data assumed to be related to the left line, the data is edge data assumed to be related to the left line, or the data is other than edge point data so as to classify the edge coordinate data (S16).

In the process (S16), the kind of edge data is determined according to the edge coordinate data transmitted from the extraction process circuit 40202. In this case, the edge coordinate data includes coordinate information of each edge and rising or falling information. In general, when a road color is set to the extraction color condition data, the rising and falling edges indicate the left and right lines, respectively. However, in a case in which a car or an obstacle is present in front of the vehicle in the road area, edge data other than that of lines is erroneously recognized as line edge data.

To overcome this difficulty, it is only necessary to assume in the decision process that the rising edge existing on the left-hand side of the screen central line 18 of FIG. 3 is left line edge data 14, the falling edge existing on the right-hand side thereof is right line edge data 16, and the other edge data is edge data of other than the lines of the car or the line in front of the vehicle. In this connection, according to the embodiment shown in FIG. 3, the left and right lines are determined according to the screen central line 18. However, it is also possible to adopt, in place of the central line 18, a perpendicular line passing the middle point of the intersections between the right and left lines and the screen bottom horizontal line.

Thereafter, the edge coordinate data items 14 and 16 of the left and right lines are sent to the line calculation section 40208 and the other edge coordinate data to the hazard decision section 40404.

Next, according to the edge coordinate data items 14 and 16 of the left and right.lines sent from the edge decision section 40206, the line calculation section 40208 decides linearity of the edge data and then calculates a line according to each edge coordinate data to obtain a candidate line (S18). Incidentally, the process is important in this embodiment and hence will be described in detail later.

Subsequently, according to the ideal lane width data acquired by the ideal lane width data acquiring section 40210, the line estimation section 40212 estimates inherent right and left lines (recognition lines) using the candidate lines sent from the line calculations 40208 and then transmits the estimated result to the hazard decision section 40404 (S20). In this regard, this process is also essential in this embodiment and therefore will be described later in detail.

Next, in a hazard decision process (S22), the running state of the vehicle (running speed or the like) is determined according to a signal from the vehicle state sensor (e.g. a vehicle speed sensor) to estimate whether or no the vehicle is in a dangerous state according to the relationship between the result of decision, the available road surface recognized by the line estimation section 40212, and the edge data of the car in front of the vehicle sent from the edge decision section 40206.

For example, when the speed of the vehicle detected by the vehicle speed sensor is equal to or more than a predetermined value and a car or the like is present in front of the vehicle at a particular position in the image information of the image in front of the vehicle, a hazardous state is assumed.

In the subsequent alarm process (S24), when the hazard decision section 40404 decides the hazardous state, the alarm device 12 is driven to notify the state to the driver of the vehicle.

Next, in an evasion process (S26), when the hazard decision section 40404 decides the hazardous state, the vehicle motion controller 10 is activated.

In this connection, the apparatus may be configured such that the vehicle motion controller 10 is activated when it is decided that the operation of the driver is insufficient for the warning of the hazardous state.

As a result, repeating the sequence of processes (S6 to S26), the apparatus accomplishes its operation.

Referring next to FIGS. 4 to 10, description will be given in detail of the line calculation process (S18) and line estimation process (S20).

Figure 5A:
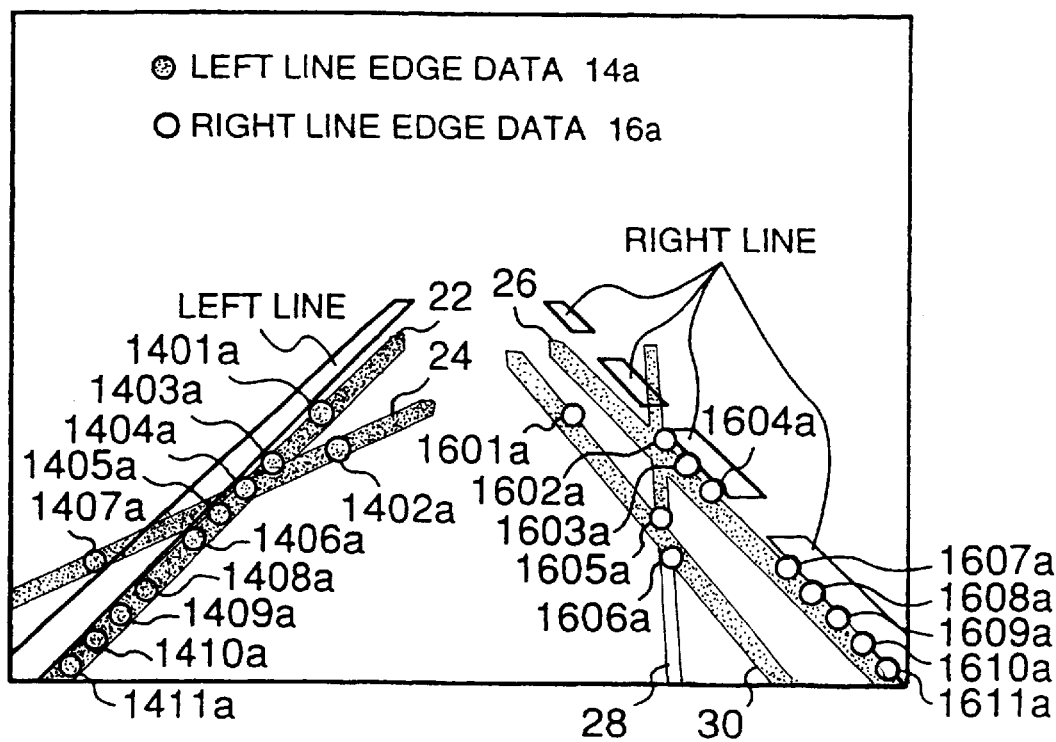
FIGS. 5A and 5B are diagrams showing an edge data extraction example for explaining the line estimation process.
Figures 5B, 5D:
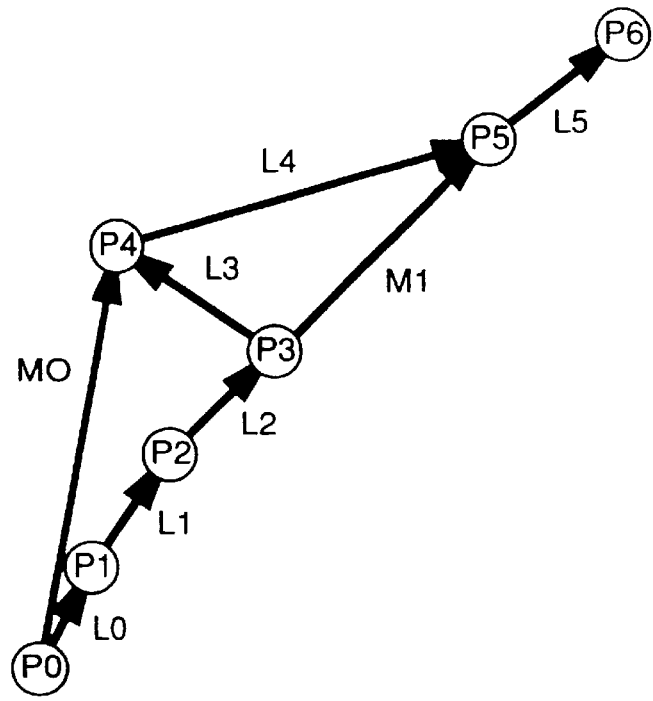
FIG. 5D is a diagram for explaining the line recognition process in FIG. 5B.

The contents of the processes will be first described by referring to FIGS. 5A and 5B.

Figure 4:
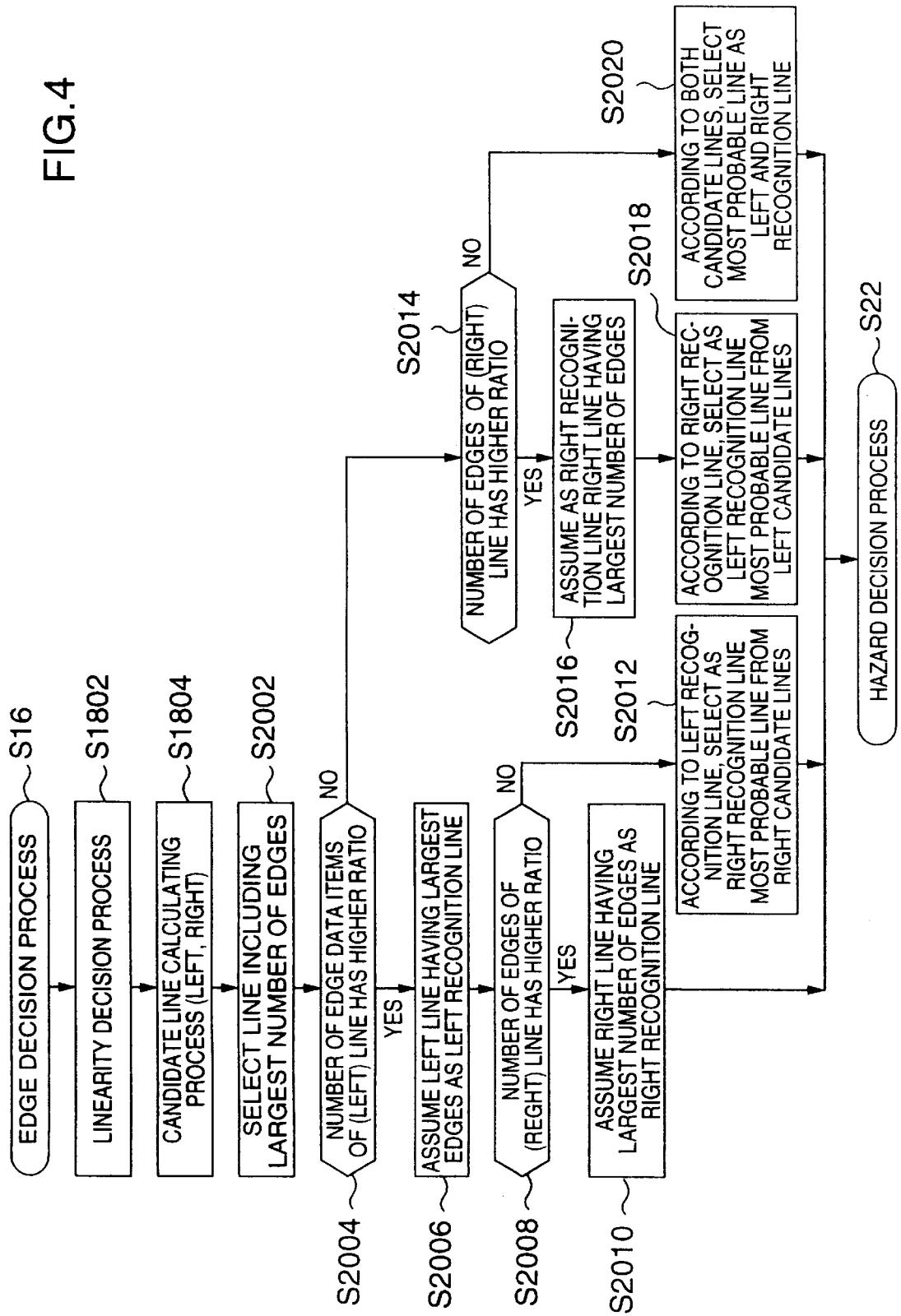
FIG. 4 is a flowchart for explaining operations of line calculation and estimation processes in the embodiment of FIG. 1.

First, as shown in FIG. 4, for the edge data 14a (1401a to 1411a) related to the left line and the edge data 16a (1601a to 1611a) related to the right line obtained in the edge decision process (S16), the system decides linearity (S1802).

In this process, to decide linearity, there are obtained vectors for each edge data.

That is, assuming that the coordinates of any edge data item of the left line at a lower position in the screen information is set as a start point and the coordinates of any edge data item of the left line at a next higher position in the screen is set as an end point, the line calculation section 40208 sequentially determines the direction of each vector.

In the operation, the reason for the procedure in which the coordinates of any edge data item of the left line at a lower position in the screen information is set as a start point is that there exist many images other than the road surface and hence there exist many noise factors in the upper portion of the screen. In the example of FIG. 5A, there is first assumed a vector having a start point 1411a and an end point 1410a. In this way, the value designating the direction of each vector is sequentially stored in the calculation data section 606. Thereafter, of the vectors having an identical direction, namely, of the vectors mutually having an angle difference of 10° or less therebetween are decided to form a group of edge data items respectively associated with the start and end points respectively of the vectors.

Figure 5C:
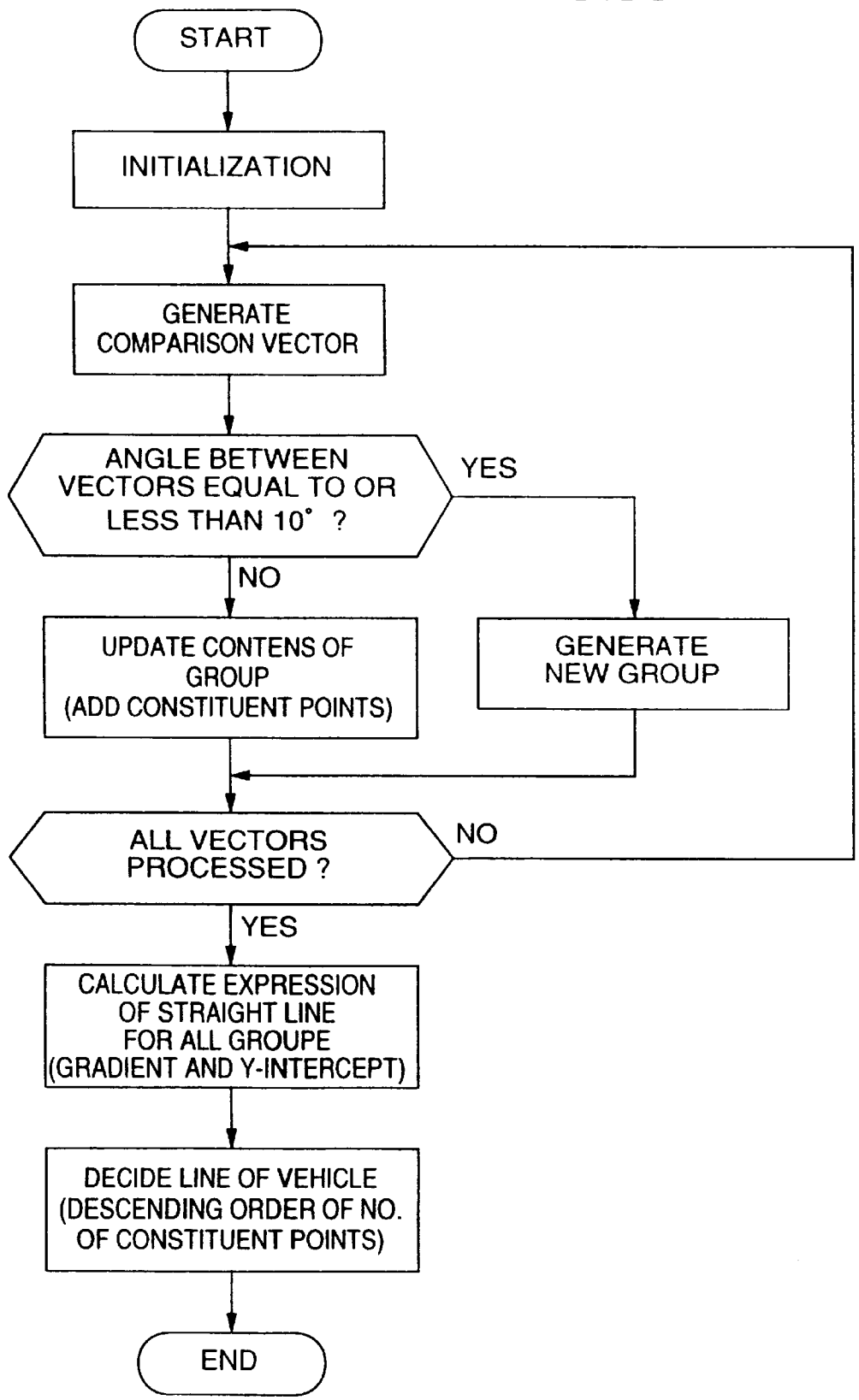
FIG. 5C is a flowchart for explaining the line recognition process in FIG. 5B.

FIGS. 5B to 5D show in detail the method of recognizing vehicle running lines.

In the initialization, vector L0 is generated by connecting cluster point P0 to cluster point P1, vector L1 is created by linking cluster point P1 to cluster point P2, and vectors L2 to L5 are sequentially produced in the similar manner. In this regard, vector L0 is registered to group 1 and the number of group constituent points is assumed to be two.

Next, setting L0 as the comparison vector, there is attained an angle between vector L0 and reference vector L1. If the angle is, for example, 10° or less, these lines are assumed to be equal to each other. In the case of FIG. 5B, a straight line is assumed and vector (L0+L1), i.e., the vector connecting P0 to P2 is registered again as group 1 and then the number of group constituent points is set to three.

Thereafter, L0+L1 is set as the comparison vector to be compared with reference vector L2 and a straight line is assumed. As a result, group 1 is updated such that vector L0+. . . +L2, namely, the vector connecting P0 to P3 is registered again as group 1 and hence the number of group constituent points is set to four.

Vector L0+. . . +L2 is then set as the next comparison vector to be compared with reference vector 3. Since the angle is 10° or more, there is generated a new group, i.e., group 2. Resultantly, vector L3 connecting P3 to P4 is registered to group 2 and the number of group constituent points is set to two. Furthermore, when it is decided that the adjacent reference vectors (L2,L3) are of the mutually different groups, vector L0+. . . +L2+L3, namely, vector M0 connecting P0 to P4 is registered to group 3 and the number of group constituent points is set to two.

In this step, the new vector M0 thus created is assumed as a reference vector to determined the comparison vector. However, vector M0 includes the start point P0 of the process and hence is not employed as the reference vector in the process.

Next, two vectors including M0 and L3 are set as comparison vectors to be compared with reference vector L4. Since the angle obtained for each comparison is 10° or more, there is generated a new group, i.e., group 4. As a result, vector L4 connecting P4 to P5 is registered thereto. The number of group constituent points is set to two. Additionally, the adjacent reference vectors (L3,L4) are related to mutually different groups, vector L3+L4, namely, vector M1 connecting P3 to P5 is registered to group 5 and the number of group constituent points is set to two.

In this situation, the new vector M1 thus produced is set to the reference vector to decide the comparison vector. There is attained L0+L1+L2 as the comparison vector. Since the attained angle is 10° or less, group 1 is updated and vector L0+. . . +L2+M1 connecting P0 to P5 is registered again as group 1. As a result, the number of group constituent points is set to five. The number of group constituent points of M1 is set to zero (0).

Two vectors L0+. . . +L2+M1 and L4 are set as the comparison vectors to be compared with reference vector L5. Since the angles obtained from the respective comparisons are 10° or less, there is conducted a comparison with respect to the angle such that L5 and L0+. . . +L2+M1 related to the smaller angle are assumed to form a straight. Resultantly, group 1 is updated such that vector L0+. . . +L2+M1+L5 connecting P0 to P6 is registered again as group 1 and the number of group constituent points of the group is set to six.

Conducting the above process for all vectors, there are obtained the gradient of the straight line and y-intercept of each group.

Finally, the straight lines of the respective groups are re-arranged in the descending order of the number of constituent points. In the case of FIG. 5C, groups 1 to 5 are arranged in this order such that four straight lines excepting group 5 of which the number of constituent points is zero (0) are recognized as candidate lines for vehicle running lines.

For example, the edge data related to the left line of FIG. 5A is classified into a group including edge data 1401a, 1403a to 1406a, and 1408a to 1411a and a group including edge data 1402a, 14041, and 1407a. The group classification process of this kind is also carried out for the edge data related to the right line. The edge data of the right line is classified into a group including edge data 1601 and 1605a, a group including edge data 1602a and 1606a, and a group including edge data 1602b, 1603b, 1604b, and 1607b to 1611b.

Subsequently, applying the method of least squares to the edge coordinate data of each group, the line calculation section 40208 attains a straight line as a candidate line (1804). In the example shown in FIG. 5A, straight lines 22 and 24 are assumed to be candidate lines for the left line, whereas straight lines 26, 28, and 30 are regarded as candidate lines for the right line.

Thereafter, there is decided and selected a candidate line including the largest number of edge data items (S2002). In the example of FIG. 5A, straight line 22 is selected from the candidate lines for the left line. Similarly, straight line 26 is selected from the candidate lines for the right line.

There are then obtained the number of edge data items (nine points of 1401a, 1403a to 1406a, and 1408a to 1411a) of the left candidate line (straight line 22) having the largest number of edge data items and that of the other edge data items (two points of 1402a and 1407a; S2004). In the example shown in FIG. 5A, the total number of edge data items of the left candidate lines 22 and 24 is eleven, whereas that of the edge data items of the left candidate line (straight line 22) having the largest number of edges is nine. Therefore, the ratio of the number of edge data items of the left candidate line 22 to that of the edge data items of the overall left candidate lines is 82%. This ratio is decided to be higher than the predetermined ratio "70%" (the ratio need only be stored in the control data section 604 in advance) and then the left candidate line (straight line 22) is assumed as the left line to be recognized (left recognition line; S2006).

Next, for the right line, there are similarly attained the number of edge data items (eight points of 1602a to 1604a and 1607a to 1611a) of the right candidate lines (straight line 26) having the largest number of edge data items among the right candidate lines 26, 28, and 30 and that of the other edge data items (three points of 1601a, 1605, and 1606a; S2008). In the example shown in FIG. 5A, the number of edge data items of the overall right candidate lines is eleven, whereas that of the edge data items of the right candidate line (straight line 26) including the largest number of edges is eight. The ratio therebetween is "73%". In this situation, the ratio is decided to be higher than the predetermined ratio "70%" (the ratio is only required to be beforehand stored in the control data section 604) and hence the right candidate (straight line 26) is assumed to be the right line to be recognized (right recognition line; S2010).

Namely, when the number of edge data items constituting each of the left and right recognition lines is higher as above, it is determined that both lines are appropriately recognized and therefore the recognition line data is transmitted to the hazard decision section 40404. Thereafter, the hazard decision process is accomplished (S22).

Figure 6:
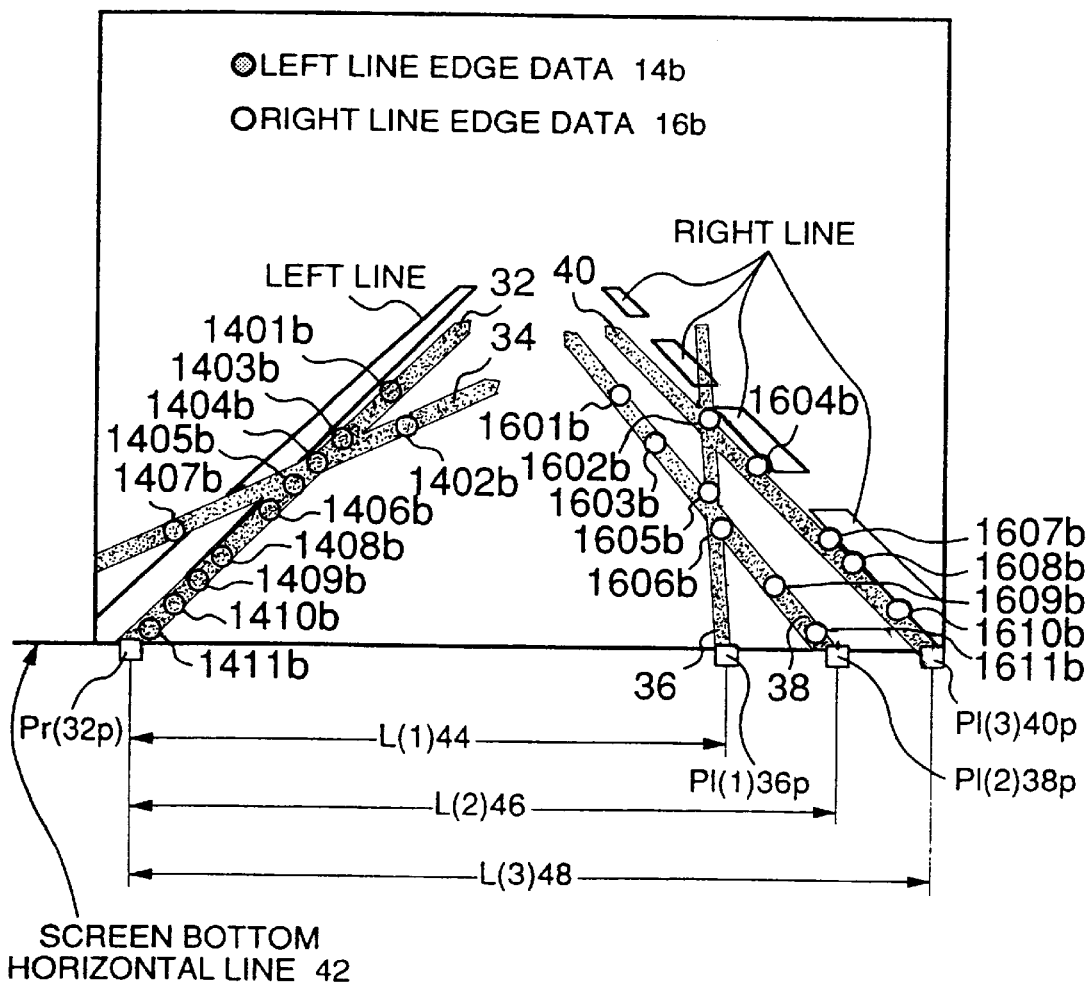
FIG. 6 is a diagram showing an edge data extraction example for explaining another example of the line estimation process.
Figure 7:
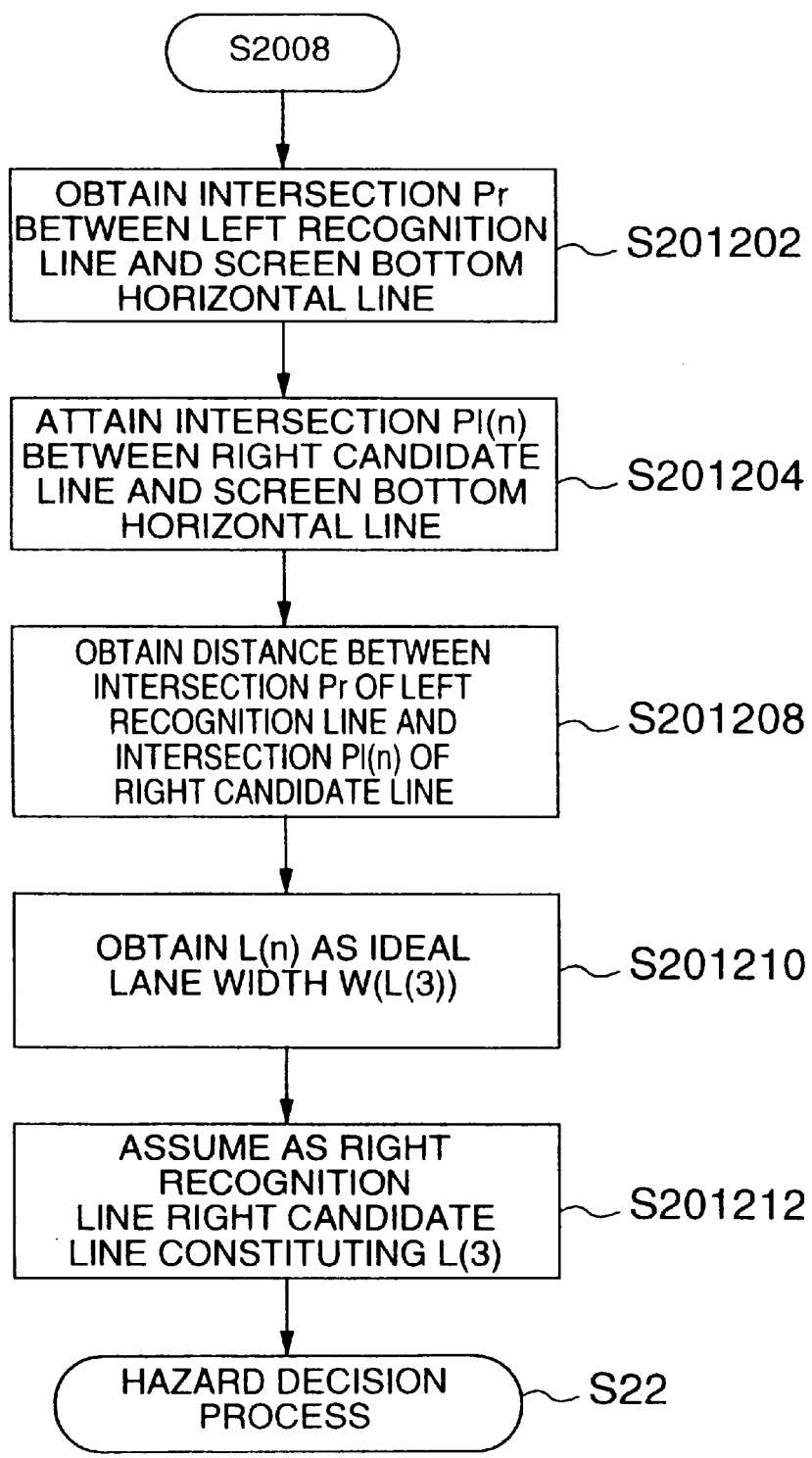
FIG. 7 is a flowchart for explaining the line estimation process in FIG. 6.
Figure 8A:
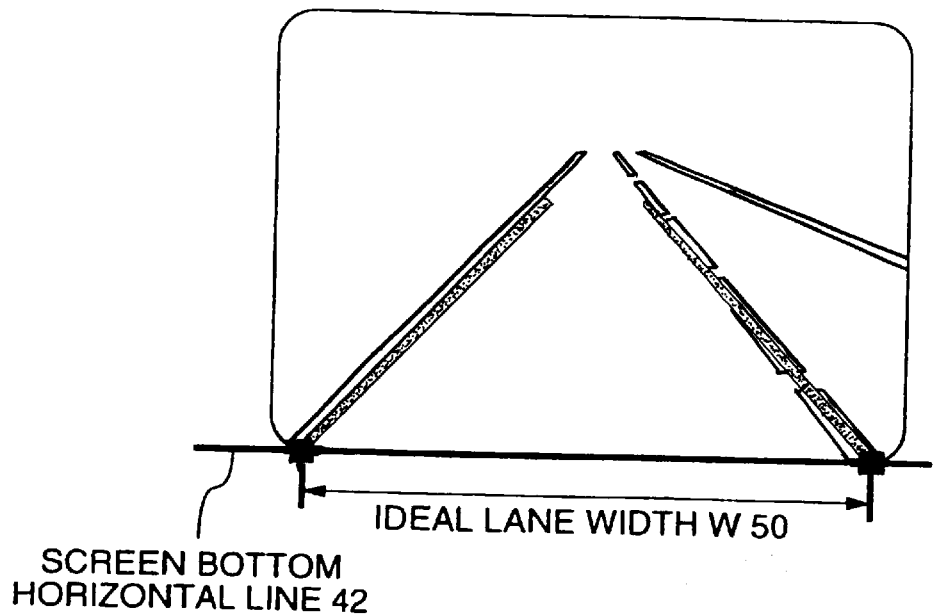
FIGS. 8A and 8B are diagrams for explaining an ideal lane width.
Figure 8B:
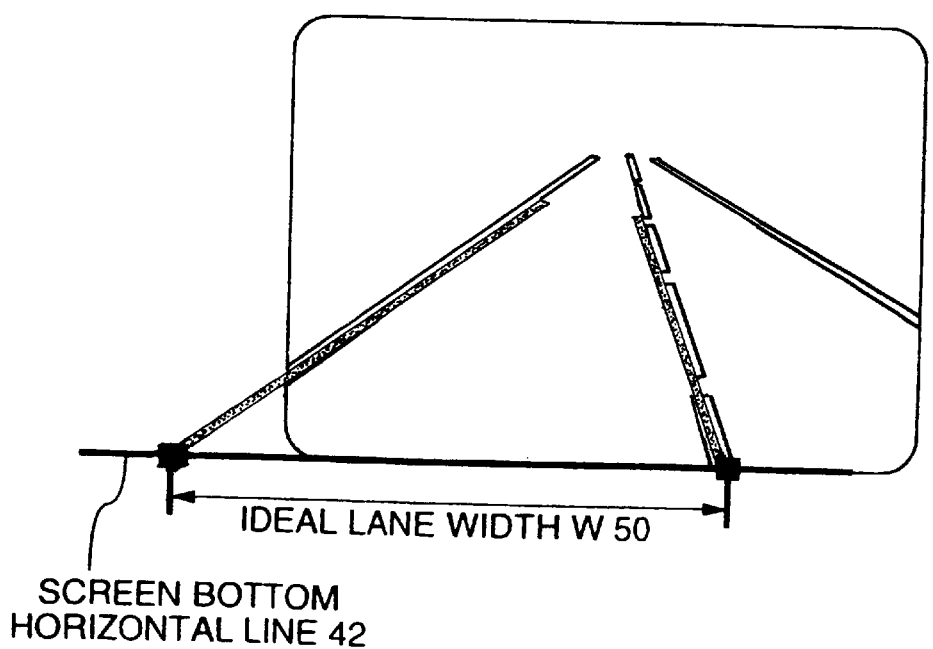

Referring next to FIGS. 4, 7, and 8, description will be given of the line calculation process (S18) and the line estimation Process (S20) in the example shown in FIG. 6. Incidentally, the processes of the steps S16, S1802, S1804, and S2002 are carried out in a fashion similar to that of the case of FIG. 5A.

In the example of FIG. 6, for the left line, there are obtained in the same fashion as for FIG. 5A the number of edge data items (nine points of 1401b, 1403b to 1406b, and 1408b to 1411b) of the left candidate line (straight line 32) including the largest number of edge data items and that of the other edge data items (two points of 1402b and 1407b;

S2004). The number of edge data items of the overall left candidate lines is eleven, whereas that of the left candidate line (straight line 32) including the largest number of edge data items is nine. The ratio therebetween is "82%". In this case, the ratio is determined to be higher than the predetermined ratio (e.g., 70%) and hence the left candidate line (straight line 32) is assumed to be the left line to be recognized (left recognition line; S2006).

However, for the right line, the number of edge data items (six points of 1601b, 1603b, 1605b, 1606b, 1409b and 1611b) of the right candidate line (straight line 38) including the largest number of edge data items and that of the other edge data items (five points of 1602b, 1604b, 1607b, 1608b, and 1610b) are obtained (S2008). While the number of edge data items of the overall left candidate lines is eleven, that of the left candidate line (straight line 38) including the largest number of edge data items is six, and hence the ratio therebetween is "55%" and is determined to be lower than the predetermined ratio (e.g., 70%). This event occurs when tracks of wheels exist on the side of the right line or the line is obscure. In this situation, it is required to decide whether or not each of the right candidate lines including the straight lines 36, 38, and 40 is a line to be recognized.

For this purpose, there is executed a process (S2012) in this embodiment in which according to the left recognition line recognized in the stable state, a right recognition line is decided in the right candidate lines (straight lines 36, 38, and 40) using the arrangement relationship between the left and right lines (S2012).

In this connection, FIG. 7 shows a flowchart for explaining in detail the contents of process S2012 of FIG. 4.

Incidentally, the process is to be achieved by the line estimation section 40212 in the configuration.

In the process, there is first obtained an intersection Pr (32p) between the left recognition line 32 and the horizontal line 42 in the bottom of the screen of FIG. 6 (S201202). Also for the right candidate lines, there are obtained intersections P1(1)(36p), P1(2)(38p), and P1(3)(40p) between the respective right candidate lines (straight lines 36, 38, and 40) and the screen bottom horizontal line 42 (S201204).

Thereafter, there are attained distances L(1)44, L(2)46, and L(3)48 between the left-side intersection Pr(32p) and the respective right-side intersections P1(1)(36p), P1(2)(38p), and P1(3)(40p) (S201208).

In this state, when the angle of view and direction of the camera, the lane width, and the like are not changed as shown in FIG. 8, in a state in which the vehicle is running in the central portion of the running lane (FIG. 8A) and in a state in which the vehicle is running on the right portion thereof, distance W between two intersections formed between the right and left lines and the screen bottom horizontal line is characteristically kept unchanged even when the running position of the vehicle altered.

Under this condition, assume the distance W to be the ideal lane width W 50 and set the value to the ideal lane width data section 602 in advance. It is naturally possible that according to the recognized information, the ideal lane width W 50 is attained through an image process for each process cycle to thereby update the width W 50.

Next, using the distances L(1) 44, L(2) 46, and L(3) 48 obtained in S201208, there is obtained a distance value most similar to the ideal lane width W 50 (S201210). In this example, L(3) 48 is decided to be most similar thereto and hence the right candidate line 40 corresponding to L(3) is assumed as the right line to be recognized (right recognition line; S201212). The left and right recognition line data items are transmitted to the hazard decision section 40404 and then control is passed to step S22.

Incidentally, the horizontal line at the screen bottom is utilized in the example of FIG. 6. However, the screen bottom horizontal line need not be necessarily used, namely, any horizontal line constituting the screen information or a virtual horizontal line which exceeds the screen information area may also be adopted. In such a case, it is only required to beforehand decide and set ideal lane width W corresponding to each horizontal line.

In this way, even when only one line of vehicle can be recognized in a stable state, the other line can be recognized according to the arrangement relationship between the lines.

Figure 9:
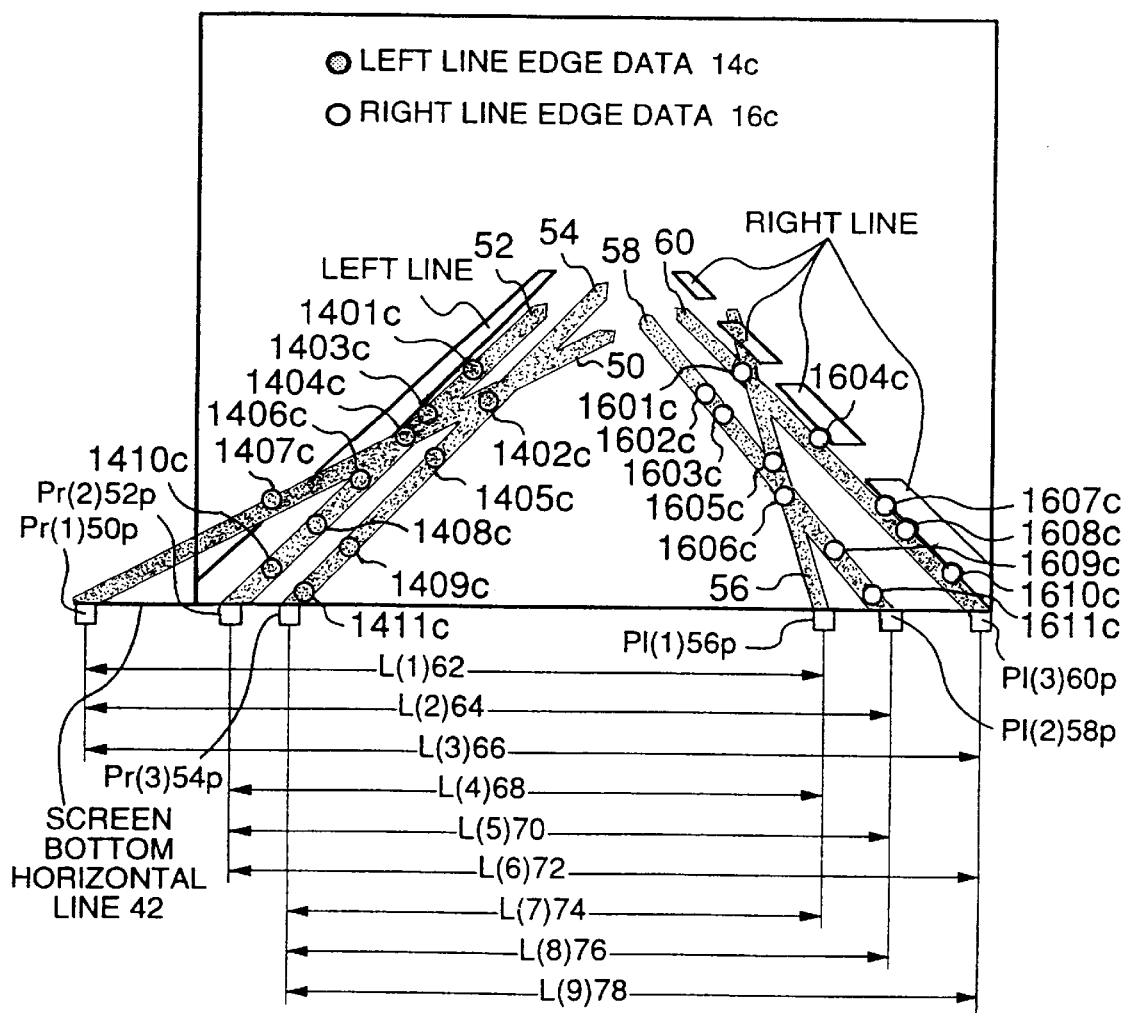
FIG. 9 is a diagram showing an edge data extraction example for explaining still another example of the line estimation process.
Figure 10:
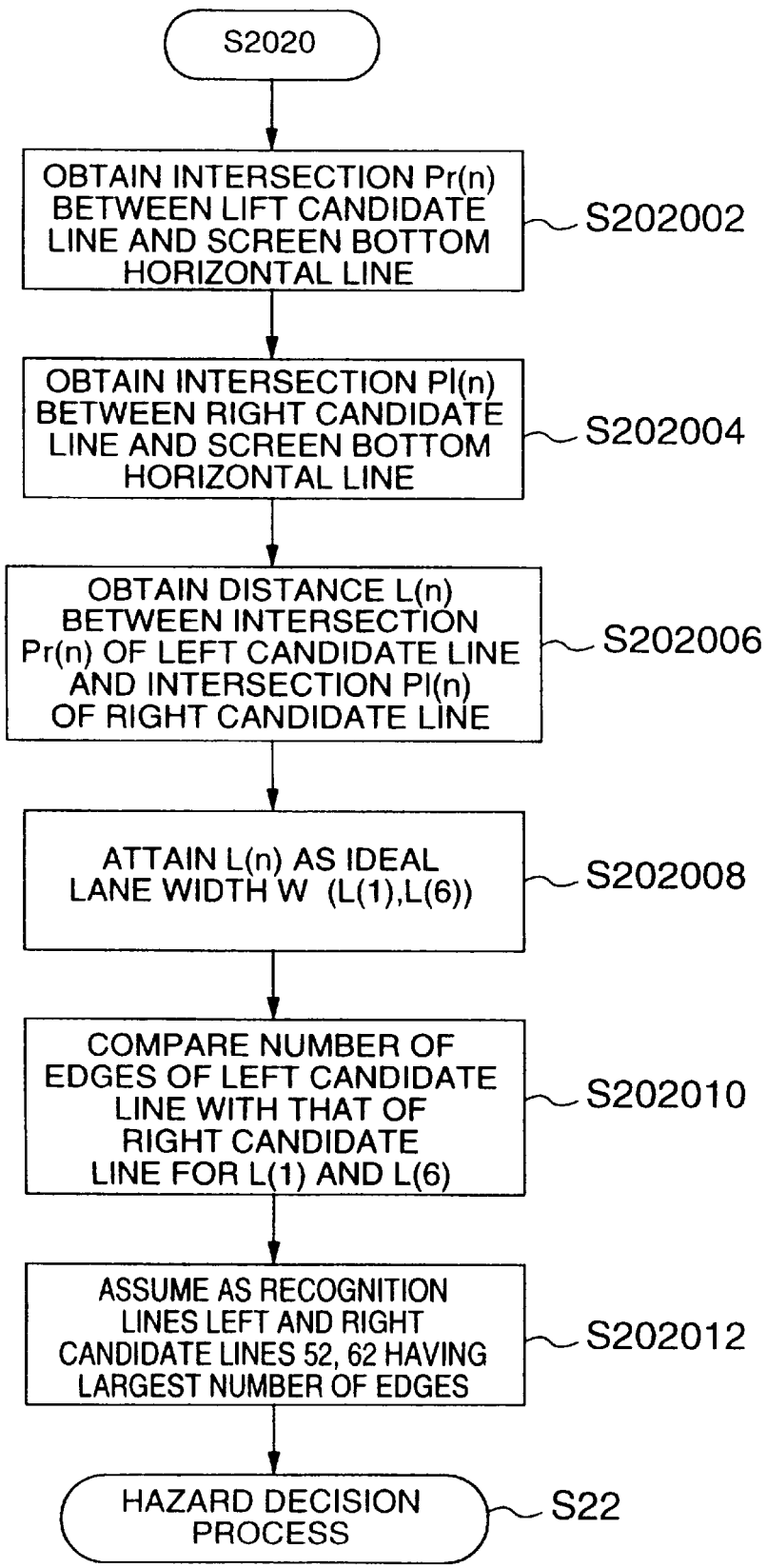
FIG. 10 is a flowchart for explaining the line estimation process in FIG. 9.

Referring now to FIGS. 4 and 10, description will be given of the line calculation process (S18) and line estimation process (S20) in the example of FIG. 9. In this connection, it is assumed that the processes of steps S16, S1802, S1804, S2002, and S2004 have already been executed.

The example shown in FIG. 9 is a case in which for each of the candidate lines having the largest number of edge data items for the left and right lines (straight lines 52 and 58), the ratio of the number of edge data items is less than the predetermined ratio (S2004, S2014). In this case, for each of the straight lines 50, 52, and 54 of left candidate lines and the straight lines 56, 58, and 60 of right candidate lines, it is necessary to determine according to the arrangement relationship between the lines whether or not the pertinent line is a line to be recognized.

For this purpose, there is executed a process (S2020) to recognize lines among the left candidate lines (straight lines 50, 52, and 54) and right candidate lines (straight lines 56, 58, and 60).

FIG. 10 is a flowchart showing in detail the contents of process S2020.

In this connection, the process is to be achieved by the line estimation section 40212 in the configuration.

In the process, there are first obtained intersections Pr(1) 50p, Pr(2) 52p, and Pr(3) 54p between the respective left candidate lines (straight lines 50, 52, and 54) and the screen bottom horizontal line 42 (S202002). Similarly, there are attained intersections P1(1) 56p, P1(2) 58p, and P1(3) 60p between the respective left candidate lines (straight lines 50, 52, and 54) and the screen bottom horizontal line 42 (S202004).

Thereafter, as can be seen from FIG. 9, there are obtained distances L(1) 62 to L(9) 78 respectively between the intersections Pr(1) 50p, Pr(2) 52p, and Pr(3) 54p and P1(1) 56p, P1(2) 58p, and P1(3) 60p (S202006).

Next, from the distances L(1) 62 to L(9) 78 obtained in S202006, there are selected a plurality of, for example, two distances less apart from the ideal lane width W 50 (S202008). In the example of FIG. 9, L(1) 62 and L(6) 72 are determined to be less apart therefrom.

In this situation, the number of edge data items of the left and right candidate lines (straight lines 50 and 56) associated with L(1) 62 is compared with that of the left and right candidate lines (straight lines 52 and 60) constituting R(6) 72 (S202010).

As a result, the number of edge data items of the left and right candidate lines including straight lines 50 and 56 is assumed to be greater than that of the left and right candidate lines including straight lines 52 and 60 and hence the straight lines 52 and 60 are regarded as left and right lines to be recognized (left and right recognition lines; S202012) such that the left and right recognition line data items are transmitted to the hazard decision section 40404 for the succeeding process (S22).

In this connection, the left and right recognition lines may be decided as follows. That is, all combinations of left and right candidate lines are first arranged in the descending order of the number of edge data items to remove the combinations of which the number of edge data items is two or less. Thereafter, there are obtained intersections between the reduced combinations of left and right candidate lines and the screen bottom horizontal line and then the distances respectively between the intersections associated with the plural combinations of the left and right lines. From the distances thus obtained between the intersections, there are obtained a plurality of, for example, two distances less apart from the ideal lane width. Among the combinations of left and right lines constituting the plural distances, the left and right candidate lines having a larger number of edge data items are determined as the left and right recognition lines.

In this fashion, in a case in which the left and right lines cannot be recognized in a stable state, it is possible to recognize the left and right lines according to the arrangement relationship between the lines.

Incidentally, although the processes which use steps S2014, S2016, and S2018 of FIG. 4 are not explained in the description above, the contents of steps S2014, S2016, and S2018 are respectively identical to those of steps S2008, S2010, and S2012 and hence will not be duplicatedly explained.

Thanks to the execution of the line calculation process (S18) and line estimation process (S20), it is possible to avoid the erroneous line recognition which possibly occurs when tracks of wheels exist in the proximity of the line or the line is obscure.

Description will be next given of a variation of the line estimation process according to the embodiment above. In this variation, when recognizing the left and right lines, an angle difference between the latest candidate line and the recognition result of the previous screen is obtained such that when the angle difference is great, it is assumed that a wrong line is recognized as a candidate and hence there is executed another selection process.

Figure 11:
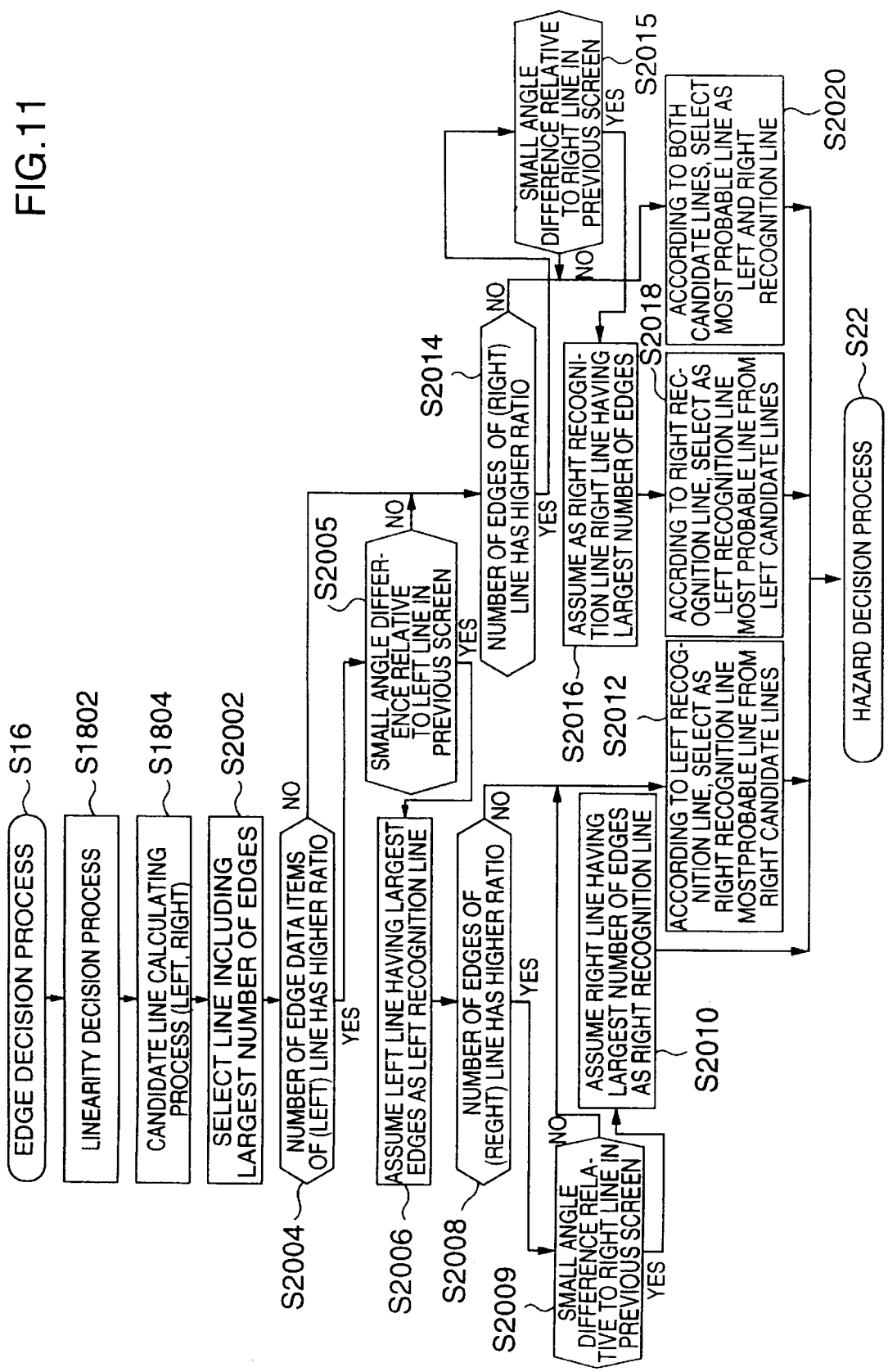
FIG. 11 is a flowchart for explaining a variation of the line estimation process in the embodiment of FIG. 1.
Figure 12:
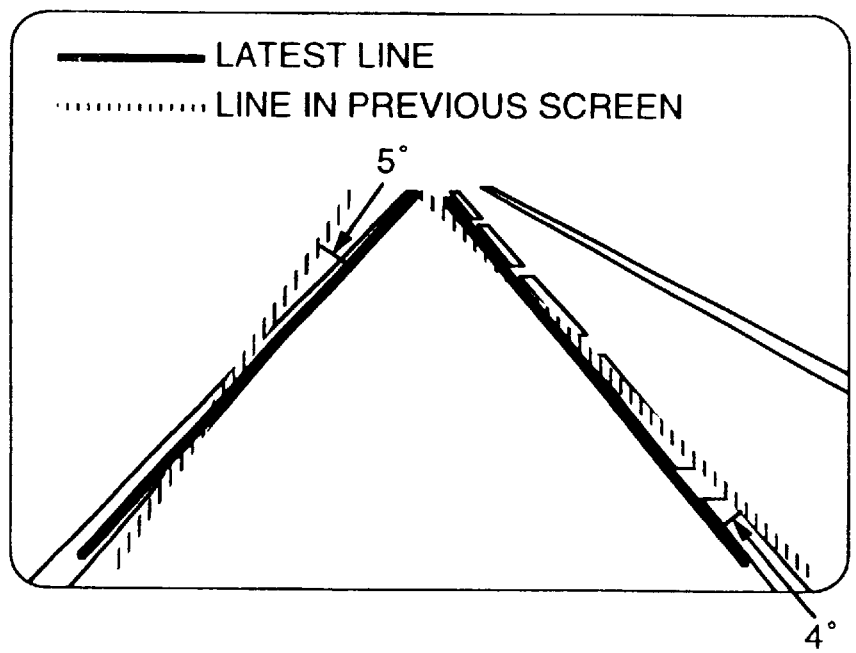
FIG. 12 is a diagram showing an edge data extraction example for explaining the line estimation process in the variation of FIG. 11.

FIG. 11 is a flowchart for explaining the variation, whereas FIG. 12 is a diagram showing an example of edge data extraction for explaining the line estimation process in the variation of FIG. 11. In the process of FIG. 11, the processes ranging from step S16 to step S2002 are the same as those of the case of FIG. 4 and hence will not be described. In step S2002, the system obtains the number of edge data items (nine point of 1401a, 1403a to 1406a, and 1408a to 1411a) of the left candidate line (straight line 22) having the largest number of edge data items and that of the other edge data items (two points of 1402a and 1407a; S2004). In the example of FIG. 5A, while the total number of edge data items of the left candidate lines 22 and 24 is eleven, whereas that of edge data items of the left candidate line (straight line 22) including the largest number of edges is nine and the ratio of the number of edge data items of the left candidate line 22 to that of the edge data items of the left candidate lines is therefore "82%". In this situation, the ratio is decided to be higher than the predetermined ratio "70%" (this ratio need only be stored in the control data section 604 in advance) and hence is assumed to be the left candidate line (straight line 22).

Subsequently, an angle difference is attained between the candidate line a the left line obtained in the previous screen (S2005). In the example shown in FIG. 12, the angle difference between the candidate line a the left line obtained in the previous screen is 4°. In this case, the angle difference is determined to be less than a predetermined angle, for example, "20°" this angle need only be predetermined to be stored in the control data section 604) and the left candidate line (straight line 22) is set as the left line to be recognized (left recognition line; S2006).

Next, the process is similarly conducted also for the right line such that the system obtains the number of edge data items (eight point of 1602a to 1604a and 1607a to 1611a) of the right candidate line (straight line 26) having the largest number of edge data items among the right candidate lines 26, 28, and 30 and that of the other edge data items (three points of 1601a, 1605a, and 1606a; S2008). In the example of FIG. 5A, while the total number of edge data items of the right candidate lines is eleven, whereas that of edge data items of the right candidate line (straight line 26) including the largest number of edges is eight and the ratio therebetween resultantly becomes "73%". In this case, the ratio is decided to be higher than the predetermined ratio "70%" (this ratio need only be stored in the control data section 604 in advance) and is consequently is assumed to be the right candidate line (straight line 26).

Subsequently, an angle difference is attained between the candidate line a the right line obtained in the previous screen (S2009). In the example shown in FIG. 11, the angle difference between the candidate line and the right line attained in the previous screen is 4°. In this situation, the angle difference is determined to be less than the predetermined angle, for example, "20°" this angle need only be predetermined to be stored in the control data section 604) and the right candidate line (straight line 22) is regarded as the right line to be recognized (right recognition line; S2010).

Thereafter, when the ratios of edge data items constituting the left and right recognition lines are higher and the angle differences with respect to the recognition lines in the previous screen are small, it is assumed that the lines are correctly recognized and hence the recognition line data items are transmitted to the hazard decision section 40404. The hazard decision process is then carried out (S22).

Referring next to FIGS. 4, 7, and 8, description will be given of the line calculation process (S18) and the line estimation process (S20) in the example shown in FIG. 6. Incidentally, the processes of the steps S16, S1802, S1804, and S2002 are assumed to be carried out in a fashion similar to that of the case of FIG. 5A.

In the example of FIG. 6, for the left line, there are obtained in the same fashion as for FIG. 5A the number of edge data items (nine points of 1401b, 1403b to 1406b, and 1408b to 1411b) of the left candidate line (straight line 32) including the largest number of edge data items and that of the other edge data items (two points of 1402b and 1407b; S2004). The number of edge data items of the overall left candidate lines is eleven, whereas that of the left candidate line (straight line 32) including the largest number of edge data items is nine. The ratio therebetween is "82%". In this case, the ratio is determined to be higher than the predetermined ratio (e.g., 70%) and hence the line is assumed to be the left candidate line (straight line 32).

Subsequently, an angle difference is attained between the candidate line and the left line obtained in the previous screen (S2005). When the obtained angle difference is determined to be less than a predetermined angle, for example, "20°" (the angle need only be stored in advance in the control data section 604), the left candidate line (straight line 22) is set as the left line to be recognized (left recognition line; S2006).

However, for the right line, the number of edge data items (six points of 1601b, 1603b, 1605b, 1606b, 1409b and 1611b) of the right candidate line (straight line 38) including the largest number of edge data items and that of the other edge data items (five points of 1602*b*, 1604*b*, 1607*b*, 1608*b*, and 1610*b*) are obtained (S2008). While the number of edge data items of the overall left candidate lines is eleven, that of the left candidate line (straight line 38) including the largest number of edge data items is six, and hence the ratio therebetween is "55%" and is determined to be lower than the predetermined ratio (e.g., 70%). This event occurs when tracks of wheels exist on the side of the right line or the line is obscure. In this situation, it is required to decide whether or not each of the right candidate lines including the straight lines 36, 38, and 40 is a line to be recognized.

Moreover, when the ratio between the number of edge data items of the right candidate line and that of the other edge data items is higher than the predetermined value, there is obtained an angle difference between the right candidate line and the right line attained in the previous screen (S2009).

When it is determined for some reasons that the angle difference is greater than a predetermined angle, for example, "20°" (this angle need only be beforehand decided and stored in the control data section 604), it is necessary to determine whether or not each of the other right candidate lines is a right line to be recognized.

For this purpose, there is executed a process (S2012) in this embodiment in which according to the left recognition line recognized in the stable state, a right recognition line is decided in the right candidate lines (straight lines 36, 38, and 40) according to the arrangement relationship between the left and right lines (S2012).

The example shown in FIG. 9 is a case in which with respect to the left and right line, for each of the candidate lines (straight lines 52 and 58) having the largest number of edge data items, the ratio of the number of edge data items is less than the predetermined ratio (S2004, S2014). In this case, for each of the straight lines 50, 52, and 54 of left candidate lines and the straight lines 56, 58, and 60 of right candidate lines, it is necessary to determine according to the arrangement relationship between the lines whether or not the pertinent line is a line to be recognized.

Moreover, with respect to the left and right line, even when it is determined that the ratio of the number of edge data items is higher than the predetermined ratio for each of the candidate lines having the largest number of edge data items, if the angle difference relative to the left or right recognition line in the previous screen is decided to exceed the predetermined angle (S2005, 2015), the following process is to be executed. Namely, for each of the left and right candidate lines, a process is achieved to decide according to the arrangement relationship between the lines whether or not the pertinent line is a line to be recognized.

According to the embodiment described above, the left and right lines of the running lane of vehicle can be appropriately recognized using a simple configuration. Furthermore, based on the information, the running road area and the like can be attained and hence the present invention can be applied to a hazard warning apparatus.

As described above, in accordance with the embodiment, when recognizing lines for a running lane of vehicle according to image information produced by an onboard camera, it is possible to correctly recognize the lines of the running lane among a plurality of candidate lines with reference to information such as the line arrangement relationship. Consequently, the road surface in front of the pertinent vehicle can be appropriately recognized.

Next, description will be given in detail of a second embodiment of the image processing apparatus according to the present invention.

Figure 13:
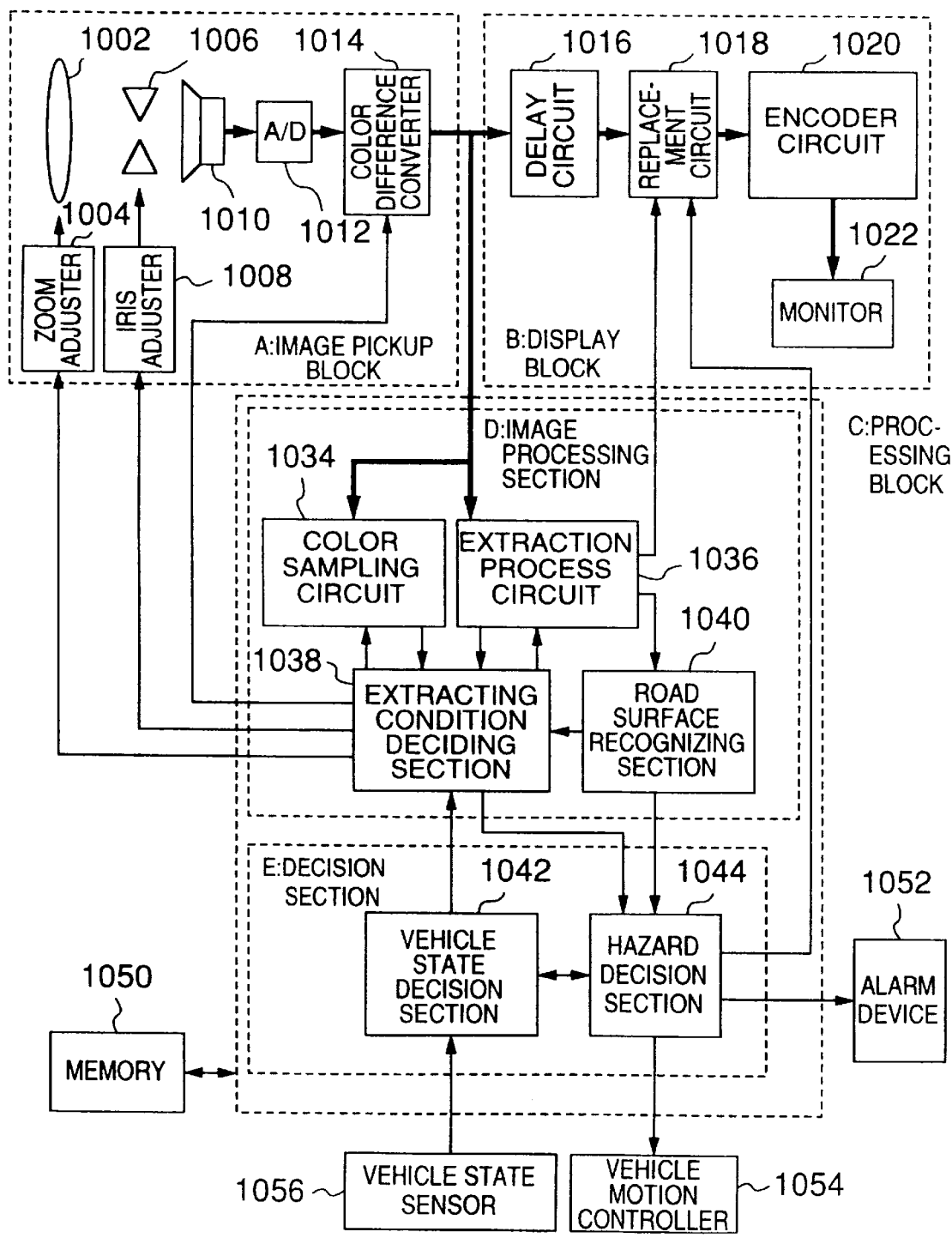
FIG. 13 is a block diagram showing the overall construction of a second embodiment of the image processing apparatus according to the present invention.

In FIG. 13 showing the second embodiment of the present invention, the configuration primarily includes an image pickup block A, a display block B, and a processing block C. The block C further includes an image processing section D and a decision section E. Incidentally, the display block B may be missing in the embodiment.

The image pickup block A is configured as follows.

A zoom lens mechanism section 1002 and a zoom adjuster section 1004 control the focal distance of the optical system in response to an optical system zoom signal indicated from an extraction condition deciding section 1038 (to be described later) to thereby magnify or minimize the obtained image.

An iris mechanism section 1006 and an iris adjuster section 1008 is responsive to an indication from the extraction condition deciding section 1038 to close the iris of the optical system when the obtained image including the target object is too bright and to open the iris when the image is too dark, thereby setting the brightness of the object to an appropriate value.

A CCD camera 1010 converts the optical image into a color image signal.

An A/D converter 1012 transforms the color image signal into a digital color signal.

A color difference converter circuit 1014 receives as an input thereto the digitized color image signal to convert the signal into color separation image signals including a luminance signal Y and color difference signals R−Y and B−Y. In this regard, the color separation image signals are defined according to the color components R (red), G (green), and B (blue) constituting three primary colors of the color image.

In the expressions, $\gamma R$, $\gamma G$, $\gamma B$ are conversion gains indicated by the extraction condition deciding section 1038.

$$Y = 0.3R \cdot \gamma R + 0.6G \cdot \gamma G + 0.1B \cdot \gamma B$$

$$R-Y = 0.7R \cdot \gamma R - 0.6G \cdot \gamma G - 0.1B \cdot \gamma B$$

$$B-Y = -0.3R \cdot \gamma R - 0.6G \cdot \gamma G + 0.9B \cdot \gamma B$$

Next, the display block B is constructed as follows.

A delay circuit 1016 is a circuit operative during the various processes conducted by the processing block C to delay the image output so as to establish synchronization between the results of the processes and the obtained image.

A replacement circuit 1018 is a circuit to superimpose the process results from the processing block C onto the obtained image.

An encoder circuit 1020 is a circuit which receives the process image signal processed by the replacement circuit 1018 and then converts the signal into an NTSC signal.

A monitor 1022 includes an image display facility such as a color CRT and receives the NTSC signal to display the processed image thereon.

The processing block C includes the image processing section D and decision section E as described above. The image processing section D is structured as follows.

A color sampling circuit 1034 samples color data from the image signal in relation to the sampling pixels specified by the extraction condition deciding section 1038 and then transfers the sampled color data (luminance signal Y and color difference signals R−Y and B−Y) to the extraction condition deciding section 1034.

An extraction process circuit 1036 includes a circuit to identify pixels for the obtained image satisfying the extraction color condition (which will be described later) so as to transfer the coordinate data (extraction coordinate data) of the pixels to the replacement circuit 1018, a circuit to transfer to a road surface recognizing section 1040 the coordinate data (edge coordinate data) of edge pixels (pixels on the boundary between the pixels satisfying the extraction condition and those not satisfying the condition) for the group of pixels satisfying the extraction condition, and a circuit which counts the number of pixels satisfying the extraction color condition among the pixels specified area to transfer the count value to the extraction condition deciding section 1038.

The extraction condition deciding section 1038 includes a circuit to indicate to the color sampling circuit 1034 sampling pixel positions necessary for the sampling of color data determined by the road surface data transferred from the load recognition section 1040, a circuit which decides an extraction color condition according to the color data transferred from the color sampling circuit 1034 and a distribution ratio attained from the count value transferred from the extraction process circuit 1036 and then transfers the condition to the extraction process circuit, a circuit to specify adjust values to the zoom adjuster 1004 and iris adjuster 1008, and a circuit to designate the conversion gain ($\gamma R$, $\gamma G$, $\gamma B$) to the color difference conversion circuit 1014.

The road recognition section 1040 recognizes according to the edge coordinate transferred from the extraction process circuit 1036 a road surface on which the pertinent vehicle can run and transfers road surface data resultant from the recognition to the hazard decision section 1044 and extraction condition decision section 1038.

The judging section E is configured as follows.

A vehicle state decision section 1042 decides the vehicle running state according to a signal from the vehicle state sensor 1056 to transfer the results of decision to the extraction condition decision section 1038 and hazard decision section 1044.

In this structure, the section 1044 estimates the degree of hazard according to the running state of vehicle and the available road surface and then notifies the degree of hazard via the warning device 1052 to the driver.

On this occasion, as a result of an action of the driver in response to the warning notification, when the action of the driver is not satisfactory for the hazard, the hazard decision section 1044 supplies the vehicle motion controller 1054 with a control signal necessary to achieve a function for the evasion of the hazard.

A memory 1050 is provided to keep therein the extraction condition determined by the extraction condition decision section 1038. Additionally, the memory 1050 serves as a storage to temporarily store therein data required for the processes executed by the extraction condition deciding section 1038, road recognition section 1040, vehicle state decision section 1042, and hazard decision section 1044.

The warning device 1052 is means to notify the driver of the degree of hazard estimated by the hazard decision section 1044.

The vehicle motion controller 1054 is a control device for the driving, braking, and steering systems.

The vehicle state sensor 1056 is means to sense the moment of the pertinent vehicle, and driver's intension, and the like, and the sensed signal is outputted to the vehicle state deciding section 1042.

Subsequently, operation of the embodiment will be described.

In this embodiment, two kinds of processes, i.e., a first process and a second process are executed in a concurrent manner.

Figure 14:
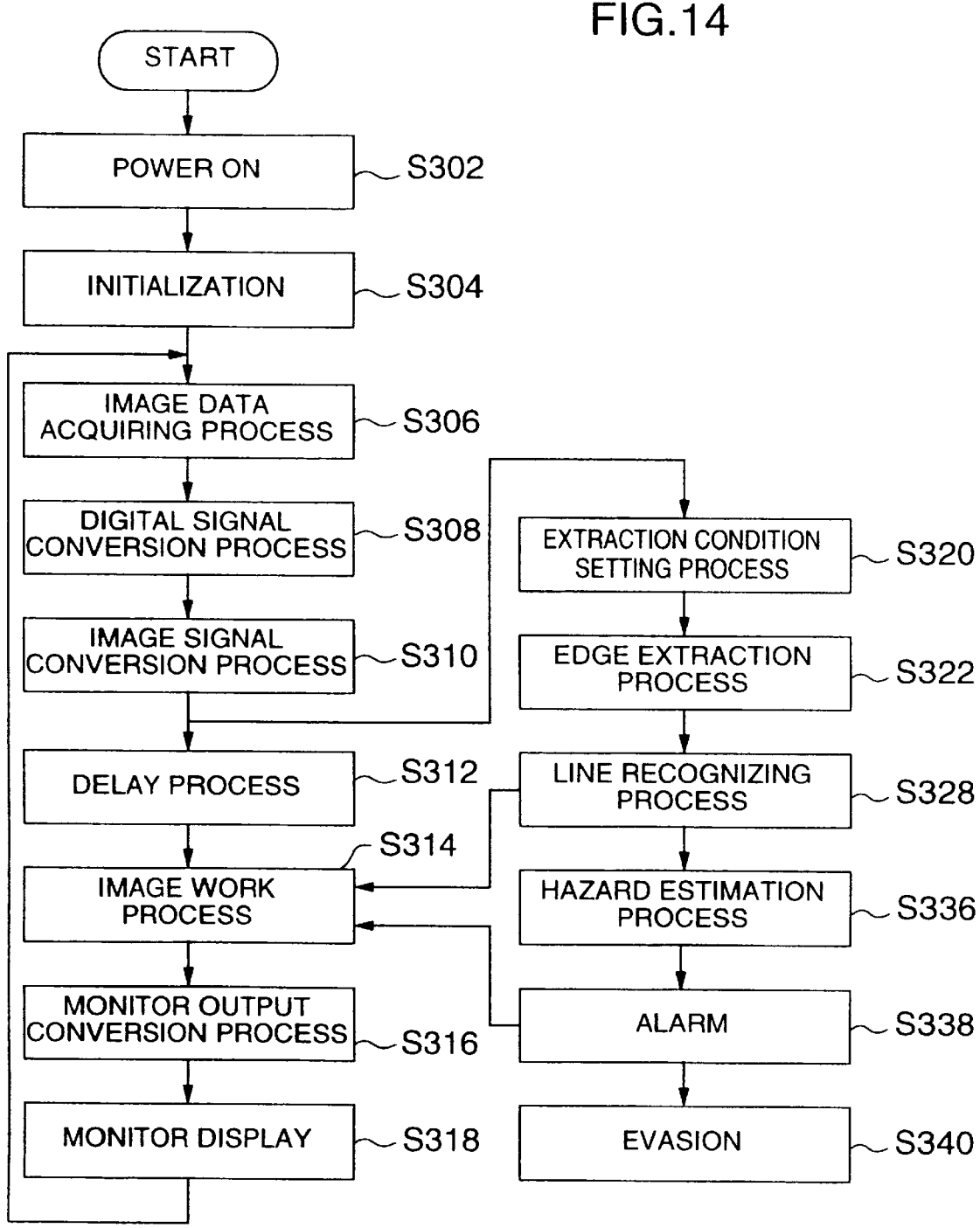
FIG. 14 is a flowchart for explaining the entire processing of the embodiment of FIG. 13.
Figure 15:
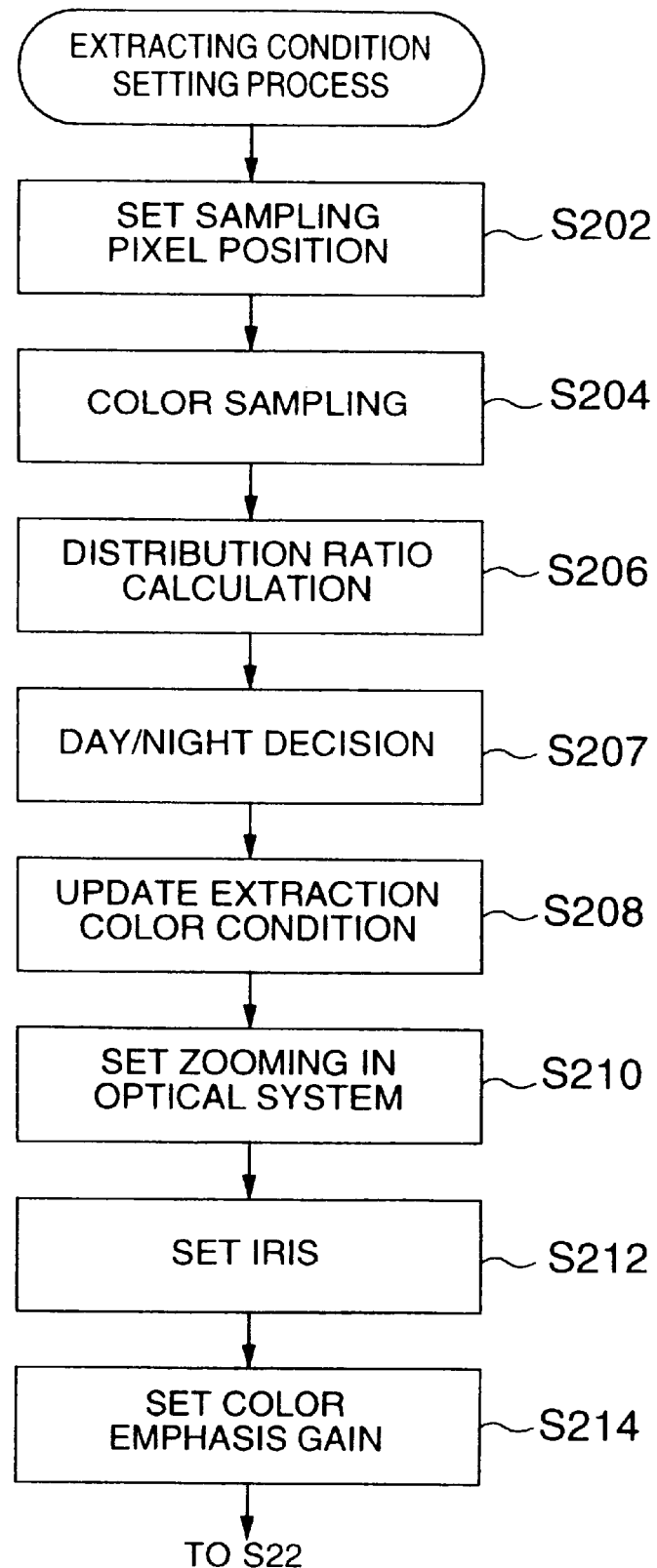
FIG. 15 is a flowchart for explaining a condition setting process in the embodiment of FIG. 13.

The first process includes processes of the image obtained by the pickup device in a stream of processes of the CCD camera 1010, A/D converter 1012, color difference converter 1014, delay circuit 1016, replacement circuit 1018, encoder circuit 1020, and monitor 1022. Referring to FIGS. 14 and 15, these processes will be next described.

In FIG. 14, when the system is powered for operation of the entire system (S302), there is achieved the initialization (S304).

Next, a color image signal of a target object shot by the CCD camera 1010 is acquired (S306) and is then converted by the A/D converter 1004 into a digital signal (S308).

In the color difference converter 1010, the digital signal is then transformed into a color separation image signal (S310).

The delay circuit 1012 then receives the color image signal to delay the signal for a period of time required for the process in the processing block C (S312) to establish synchronization between the obtained image and the results of the process.

Thereafter, the replacement circuit 1014 superimposes the results of the process in the processing block C onto the unprocessed color separation image signal (S314).

The encoder 1016 then transforms the resultant signal into an NTSC signal (S316).

The monitor 1018 receives the NTSC signal to display thereon the processed image (S318).

Control is then returned to the process to shoot the object in the next cycle (S306).

The processes above are accomplished in the field cycle (one field is 16.7 ms) of image signals.

Subsequently, as shown in FIG. 14, the second process includes a process to set the extraction condition (S320), a process to extract edges from the image signal produced by the image pickup block A (S322), a process to recognize the road surface available for the vehicle according to the edge coordinate data (S328), a process to estimate the degree of hazard for the vehicle (S336), and a process to evade the hazard (S340). In this connection, the edge extraction process may be executed in a fashion similar to that of the first embodiment.

Figure 16:
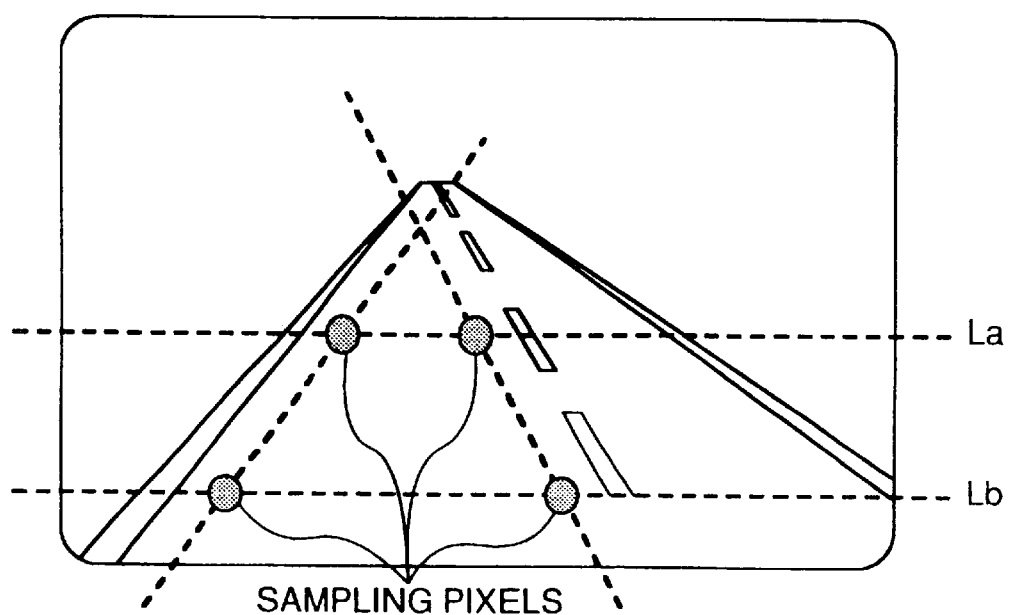
FIG. 16 is a diagram showing sampling pixel positions in the initialization of the embodiment of FIG. 13.

First, in the initialization (S304), as shown in FIG. 16, a color data sampling operation is beforehand accomplished in the traffic lane image for a plurality of pixels, for example, sampling pixels set to four positions immediately before the pertinent vehicle. Subsequently, according to the sampled color data, a discrimination process is conducted for the environment of the vehicle, for example, to decide day or night, which will be described later. According to the result of decision, the extraction color condition is set by using the setting values stored in the memory in advance. Incidentally, the method of setting the extraction color condition in this case will be described later.

Thereafter, while adjusting the extraction condition to the environment change, the system receives the image signal to extract therefrom by the extraction process circuit 1036 pixels having the color of the road surface. That is, the extraction condition to extract pixels of the road surface including $Y_{MIN}$, $Y_{MAX}$, $(B-Y)_{MIN}$, $(B-Y)_{MAX}$, $(R-Y)_{MIN}$, and $(R-Y)_{MAX}$ is compared with the color data of pixels on the screen image so as to extract pixels satisfying expression (1) from the image (S320).

$$\left. \begin{array}{l} Y_{MIN} < Y < Y_{MAX} \\ (B-Y)_{MIN} < B-Y < (B-Y)_{MAX} \\ (R-Y)_{MIN} < R-Y < (R-Y)_{MAX} \end{array} \right\} \quad (1)$$

Additionally, boundary coordinate data including the set of extracted data, i.e., edge coordinate data is transferred to the road surface recognition section 1040 (S322).

Next, according to the transferred edge coordinate data, there are calculated a plurality of straight or curved lines to estimate an available running road surface according to the positional relationship therebetween (S328). The estimation of the road surface, namely, the line estimation process may be conducted in the same manner as for the first embodiment.

Subsequently, according to signals from the vehicle state sensor 1056 including a vehicle speed sensor, a brake pedal operation sensor, an indicator operation sensor, and a steering angle sensor, there are decided the running state of the vehicle including the vehicle speed, the braking rate, the line change intention, and the steering amount. Based on the relationship between the results of decision and the available running lane recognized by the road recognition section 1040, the system estimates the degree of hazard for the vehicle such as the distance between the pertinent vehicle and a car in front thereof, a relative speed of the vehicle with respect the car, presence or absence of a car running in parallel with the vehicle, and unstable running state of the vehicle (S336).

The degree of hazard estimated by the hazard decision section 1044 is then notified to the drive of the vehicle via the warning device (such as an indicator, voice, warning tone, LED, etc.) 1052 or via the monitor (onboard television and "headup" display) of the display block B (S338).

In this situation, the degree of hazard is also notified to the drivers of nearby automobiles via the warning device (for example, via a character display board or through communication between vehicles) 1052 depending on cases.

Next, in association with the degree of hazard estimated by the hazard decision section 1044, when the driver does not satisfactorily conduct operations, the section 1044 changes the control characteristic of the vehicle motion controller 1054 and/or set the vehicle in the automatic driving mode to evade the hazard (S340).

Referring next to FIG. 15, the extraction condition setting process (S320) will be described in detail.

In a sampling pixel position setting process (S202), as shown in FIG. 16, there are first set such fixed horizontal lines in the screen as three lines La, Lb, and Lc in the lower (nearby) area, a middle (faraway) area, and an intermediate (middle) area therebetween.

Thereafter, for each of the fixed horizontal line, a distance between the intersections between the pertinent line and the straight lines representing the left and right approximation line obtained in the previous process is equally divided, for example, into three partitions. The six obtained positions are set to the sampling pixel positions. It is assumed that there exists at least one sampling pixel for each fixed horizontal line.

In a color data sampling process (S204), from the image signal sequentially conveying color data of all pixels of the obtained image, there are sampled by the color sampling circuit 1034 color data (Y, B–Y, and R–Y) of the six specified sampling pixels.

Figure 19:
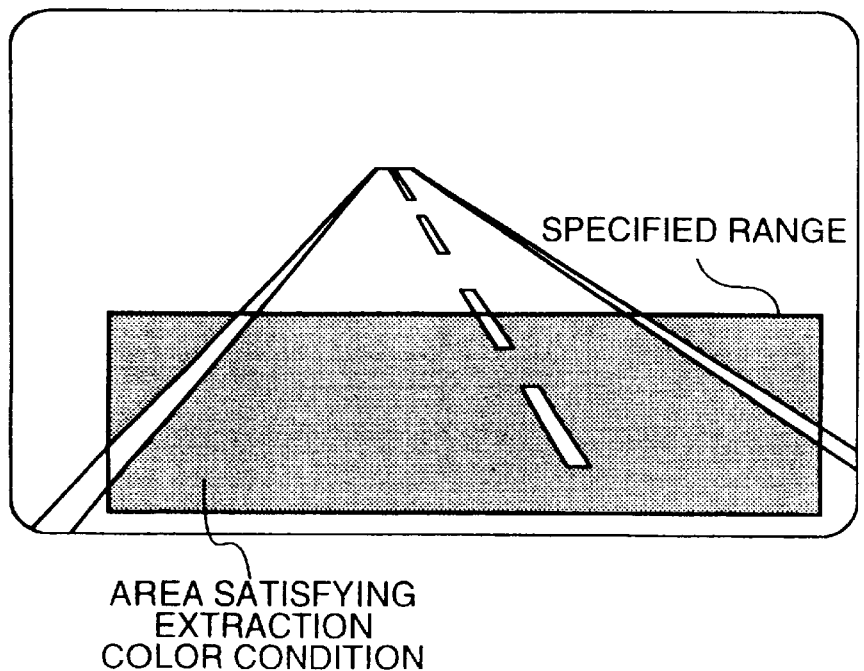
FIG. 19 is a diagram for explaining a screen area employed to calculate a distribution ratio in the embodiment of FIG. 13.

Subsequently, in a distribution ratio calculation process (S206), the extraction color condition ($Y_{MIN}$, $Y_{MAX}$, $(B-Y)_{MIN}$, $(B-Y)_{MAX}$, $(R-Y)_{MIN}$, $(R-Y)_{MAX}$) is compared with the color data (Y, B–Y, and R–Y) of the pixels in the range specified on the screen image shown in FIG. 19. Among the pixels in the specified range, there are counted the number of those satisfying the relationship of expression (1), namely, the extraction color condition.

$Y_{MIN} < Y < Y_{MAX}$ $(B-Y)_{MIN} < B-Y < (B-Y)_{MAX}$ $(R-Y)_{MIN} < R-Y < (R-Y)_{MAX}$

And then, according to the following formulae, there are attained a calculated distribution ratio indicating the ratio of the pixels satisfying the extraction color condition in the specified range to all pixels in the specified range and a target distribution ratio denoting the ratio of such pixels in the specified range excepting those of the recognized lines and those in the area of the car in front of the vehicle to all pixels in the specified range.

Calculated distribution ratio=Number of pixels satisfying extraction condition in specified range/Total number of pixels in specified range Target distribution ratio=(Total number of pixels in specified range–Number of pixels of recognized lines and in area of car in front of vehicle)/Total number of pixels in specified range In the formulae, "number of pixels satisfying extraction condition in specified range" designates the number of pixels in the road surface excepting the lines in the specified range. Furthermore, "total number of pixels in specified range" denotes the number of pixels in the road surface including the lines of vehicle. Additionally, "number of pixels of recognized lines and in area of car in front of vehicle" may be a predetermined value or a variable value according to the road environment. Moreover, the number may be the estimated value passed from the previous screen. In addition, the target distribution ratio is ordinarily in a range of from 80% to 90%. "Specified range", "number of pixels of recognized lines and in area of car in front of vehicle", and target distribution ratio may be beforehand stored as setting values in the extraction condition deciding section 38 or may be set from an external device.

Next, a day/night decision process (S207) is next carried out for the color data sampled at six points.

Figure 18:
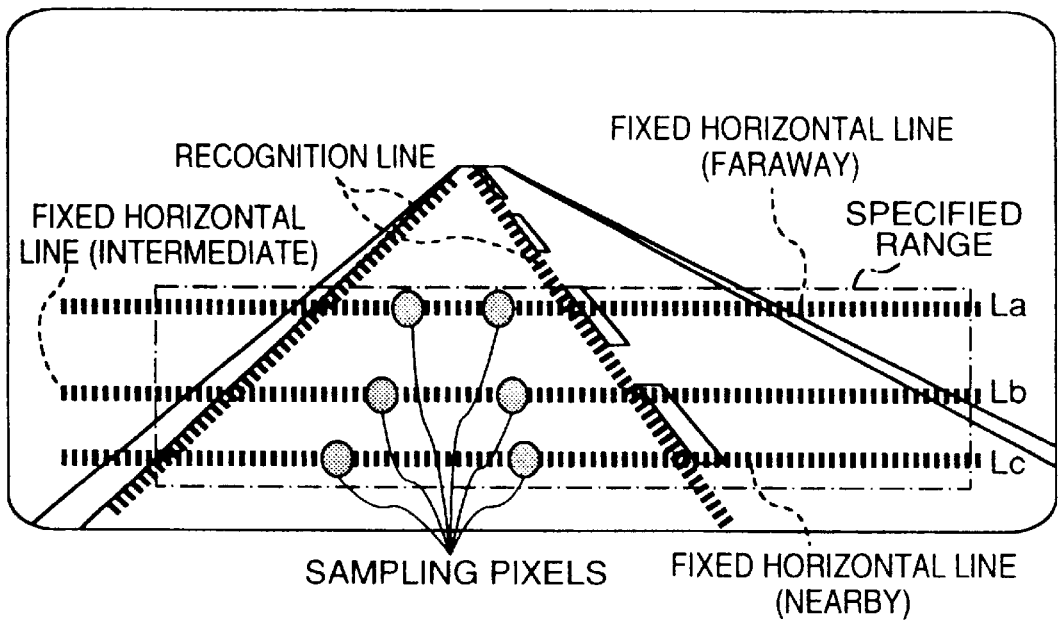
FIG. 18 is a diagram for explaining sampling pixel positions in the setting of extraction color conditions in the embodiment of FIG. 13.

In this case, description will be given of the day/night decision process for color data sampled at four points shown in FIG. 16 or at six points shown in FIG. 18.

According to the sampled color data, a comparison is accomplished between color data items at a plurality of points, two color data items in this case, on the same horizontal line. When the absolute value of the difference between these data items is larger than a threshold value stored in the memory, it is assumed that a car exists at the sampling pixel position in front of the pertinent vehicle or an indication item is present on the road surface, and the data items are consequently not utilized.

When the absolute value is smaller than the threshold value, there are attained a mean value (Hs) of all sampled data items related to three horizontal lines La, Lb, and Lc and mean values (Ha,Hb,Hc) of data items on the respective horizontal lines La, Lb, and Lc.

According to the relationships between these average values, the day/night decision is the conducted as follows.

"Day" is assumed when the conditions (2) and (4) or conditions (3) and (4) are satisfied.

:$Ha \geq Hb \geq Hc$ (for six points) . . . (2)

:$Ha \geq Hb$ (for four points) . . . (3)

:$Ha \geq$ Setting threshold value . . . (4)

"Night" is assumed when the conditions (5) and (7) or conditions (6) and (7) are satisfied.

:$Ha < Hb < Hc$ (for six points) . . . (5)

:$Ha < Hb$ (for four points) . . . (6)

:$Ha <$ Setting threshold value . . . (7)

The reason for the decision of "Day" as above is that according to the angle of incidence of the natural light (sunlight) in the daytime, there exists a condition in which the brightness is equal for the nearby and faraway places or a condition in which the brightness is stronger in the faraway place than in the nearby place. Additionally, the reason for the decision of "Night" as above is that due to light from automobiles in the nighttime, the brightness is stronger in the nearby place than in the faraway place.

Description will now be given of the setting threshold value. Depending of the road environment, for example, when the paved state of the road surface varies, there may occur a chance of mistaking the daytime for the nighttime. For example, a new paved road has a dark surface even in the daytime, namely, the luminance in a faraway place on the new paved road surface is about 40 in the daytime. On the other hand, the luminance in a faraway place on an ordinary road surface is about 100 in the daytime. In the nighttime, however, the luminance in a faraway place is about 0 regardless of the state of the road surface. Therefore, when the setting threshold value is assumed to be 50, the daytime decision formulae ((2) and (4) or (3) and (4)) are not satisfied in the daytime; moreover, the nighttime decision formulae ((5) and (7) or (6) and (7)) are not satisfied either. In consequence, if the results of the previous decision are directly adopted in such a case to thereby prevent any erroneous decision.

Subsequently, description will be given of a method of setting the extraction color condition for road surface pixels in the initialization process.

When "day" is assumed in the day/night decision process, a region of color signals which are stored beforehand in the memory as shown in FIG. 15A and which are related to colors similar to an achromatic color is set as a color region Scd satisfying the color signal condition for the daytime road surface. Next, for the luminance signals, there are obtained the maximum and minimum values of color data items of the four or six sampled points such that daytime offset values stored in the memory are respectively added to the maximum and minimum values so as to set a luminance region Sld satisfying the luminance signal condition for the daytime road surface.

On the other hand, when "night" is assumed in the day/night decision process, a region of color signals which are stored in the memory in advance as shown in FIG. 15C and which are related to colors similar to an achromatic color is set as a color region Scn satisfying the color signal condition for the nighttime road surface. For the luminance signals, there are obtained the maximum and minimum values of color data items of the four or six sampled points such that nighttime offset values stored in the memory are respectively added to the maximum and minimum values, thereby setting a luminance region Sln satisfying the luminance signal condition for the nighttime road surface.

Figure 17A:
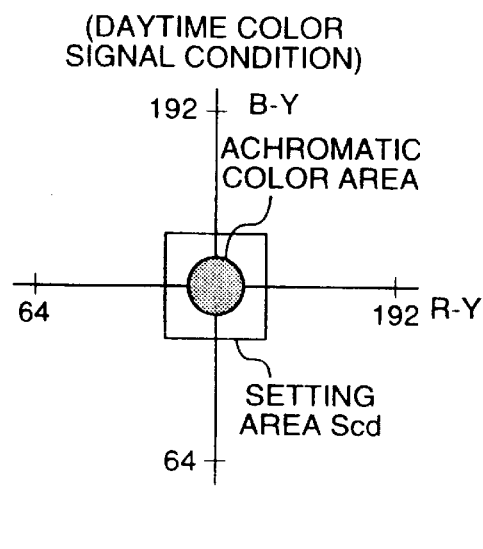
FIGS. 17A to 17G are diagrams for explaining the setting and update of extraction color conditions in the initialization of the embodiment of FIG. 13.
Figure 17B:
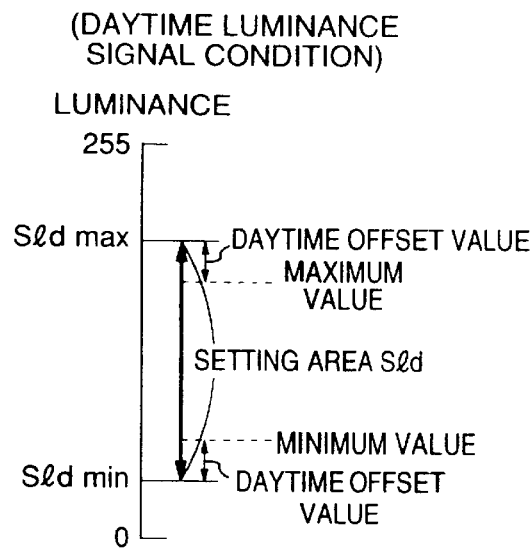

Incidentally, the reason why "setting color areas satisfying the color signal conditions of the daytime and nighttime road surfaces" are set as the achromatic color regions as shown in FIGS. 17A and 17B is that the road surface is of an achromatic color. In addition, the reason why "setting color area satisfying the color signal condition of the daytime road surface" is substantially set as a square is that the light forming the image in the daytime primarily includes the natural light.

Figure 17C:
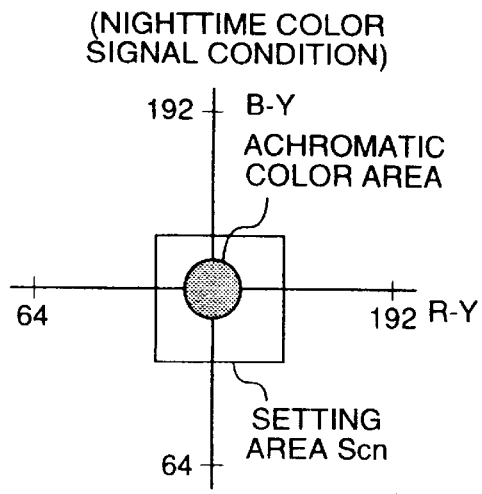

On the other hand, as can be seen from FIG. 17C, the reason why "setting color area satisfying the color signal condition of the nighttime road surface" has a larger lower-right portion in FIG. 15C when compared with "setting color area satisfying the color signal condition of the daytime road surface" is that the external light primarily includes light of lamps of automobiles or the like in the nighttime. Such light ordinarily includes a yellow component larger then the natural light and hence the region has a large area on the yellow side.

Additionally, the reason why the offset value (nighttime offset value) of "setting color area satisfying the luminance signal condition of the nighttime road surface" is larger than the offset value (daytime offset value) of "setting color area satisfying the luminance signal condition of the daytime road surface" is that the luminance more influenced in the nighttime than in the daytime (by, for example, a streetlamp, namely, is varied by external light).

Figure 17D:
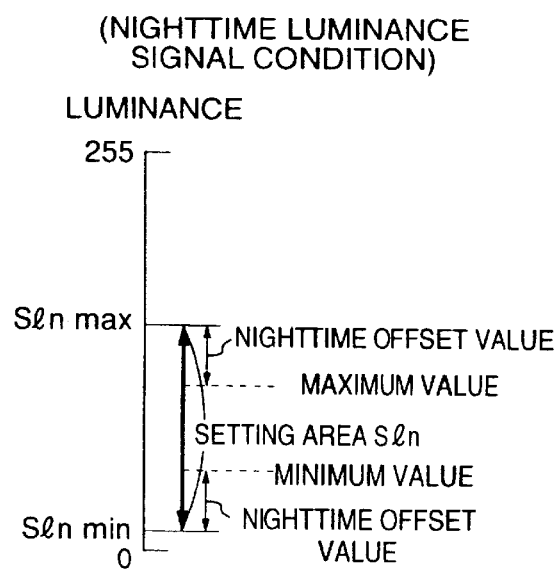

Consequently, as can be seen from the comparison between FIGS. 17A and 17C, the setting area is larger for the nighttime color signal condition. Similarly, comparing FIG. 17B with FIG. 17D, the offset value is wider for the nighttime condition.

Subsequently, in an update step of extraction color condition (S208), there is disposed a predetermined range, e.g., a range of ±0.05 to establish, for example, three kinds of areas in total using the range as boundaries, namely, "magnification" area, "retention" area, and "minimization" area.

Thereafter, similarly, the method of updating the extraction color condition is decided as follows according to in which one of the three kinds of areas the calculated distribution ratio attained in process S206 exists.

First, when the distribution ratio exists in "retention area", the extraction color condition is not updated regardless of the color data sampled.

Next, description will be given of a case in which the distribution ratio is small, that is, the number of pixels extracted as pixels of the road surface according to the present extraction color condition is small and hence the ratio exists in "magnification" area. First, color signals will be explained. Mean values Ca, Cb, and Cc of color signals of data items on three horizontal lines La, Lb, and Lc are obtained. When the mean values Ca, Cb, and Cc exists in the range of the setting color area Scd (for daytime) or Scn (for nighttime) of the extraction color condition, the margins set in the memory are added to the maximum and minimum values of sample data to thereby update the range of the setting color area. On the other hand, when either one of the mean values Ca, Cb, and Cc is beyond the range of the setting color area, the margin (fixed value) set in the memory is added to a mean value of the values beyond the range to set a new color range. Using the new color range, the setting area (Scd or Scn) of FIG. 17A (for daytime) or FIG. 17C (for nighttime) is updated, namely, magnified.

Figure 17E:
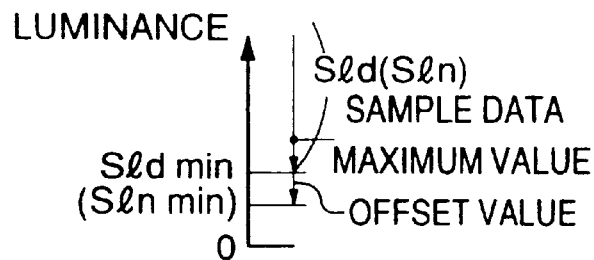

Description will be next given of the luminance signal when the calculated distribution ratio is in "magnification" area. First, the maximum and minimum values of sample data items are obtained. When the minimum value is in the range of the setting luminance area Sld or Sln of the extraction color condition, the setting value (offset value) in the memory is reduced from the minimum value $Sld_{min}$ or $Sln_{min}$ of the setting area Sld (for daytime) or Sln (for nighttime) as shown in FIG. 17E.

Figure 17F:
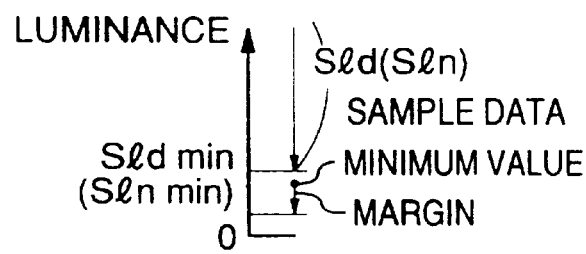

Additionally, in the process, when the minimum value of the sample data items is less than that of the setting luminance areas Sld (for daytime) and Sln (for nighttime) of the extraction color condition, the margin set in the memory is reduced from the minimum value of the sample data items to attain a new minimum value of the extraction color condition so as to update the setting area as shown in FIG. 17F. On the other hand, when the maximum value of luminance of the sample data is within the range of Sld or Sln of the setting luminance area of extraction color condition, the setting value in the memory is subtracted from the maximum value $Sld_{max}$ or $Sln_{max}$ of the setting luminance area of the extraction color condition. Furthermore, when the maximum value of luminance of sample data is larger than that of the area of extraction color condition, a half value of the discrepancy between the maximum value of sample data and that of the setting luminance area of the extraction color condition is added to the maximum value of the setting luminance area of the extraction color condition, thereby updating the maximum value of setting luminance area.

In addition, description will be given of a case in which the distribution ratio exists in "minimization area". For the color signals, mean values Ca, Cb, and Cc of color signals of data items on three horizontal lines La, Lb, and Lc are obtained. When the mean values Ca, Cb, and Cc exist in the range of the setting color area, the margins set in the memory are added to the maximum and minimum values of the mean values Ca, Cb, and Cc to obtain a new maximum value and a new minimum value of the setting color area, thereby updating the range of the setting color area. In the process, when either one of the data items Ca, Cb, and Cc is other than the setting color range, there is not conducted the update within the setting color area.

On the other hand, for the luminance signals, there are obtained the maximum and minimum values of sample data items such that when the minimum value is beyond the range of the setting luminance area, the setting margin value in the memory is added to the minimum value of the sample data to set the resultant value as a new minimum value of the setting luminance area of the extraction color condition.

In this operation, when the minimum value of luminance the sample data items is more than that of the setting luminance areas of the extraction color condition, the margin set in the memory is added to the minimum value of the sample data items to attain an updated minimum value of the extraction color condition. When the maximum value of luminance of the sample data is beyond the range of the setting luminance area of extraction color condition, the setting value in the memory is subtracted from the maximum value of the setting luminance area of the extraction color condition. Furthermore, when the maximum value of luminance of sample data is less than that of the area of extraction color condition, a half value of the difference between the maximum value of luminance of sample data and that of the setting luminance area of the extraction color condition is subtracted from the maximum value of the setting luminance area of the extraction color condition, thereby updating the maximum value of the setting luminance area.

Figure 17G:
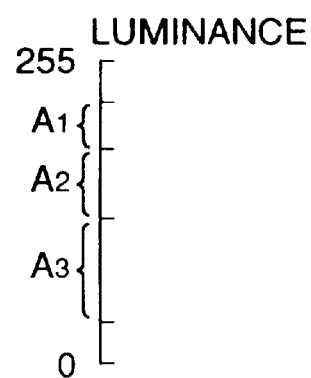

As above, when the calculated distribution ratio is in "magnification" area, the extraction color condition is loosened up to expand the area to be extracted as the road surface so as to correctly detect lines of vehicle. For example, assuming that areas A1, A2, and A3 respectively correspond to luminance zones of lines, tracks of wheels, and road surfaces in relation to luminance in the screen image as shown in FIG. 17G, when the distribution ratio exists in "magnification" area, the setting area Sld (for daytime) or Sln (for nighttime) is expanded to a portion of areas A1 and A3.

On the other hand, when the calculated distribution ratio is in "minimization" area, the extraction color condition is narrowed (restricted) to minimize the area to be extracted as the road surface so as to correctly detect lines of vehicle.

Referring next to FIGS. 21 to 25, description will be given in detail of the process to update the extraction color condition above.

Figure 20:
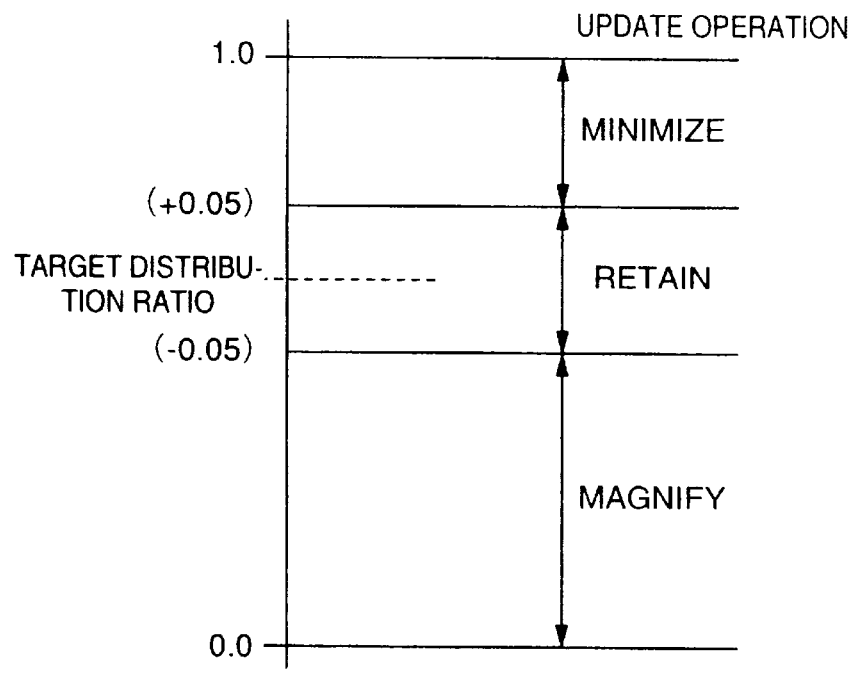
FIG. 20 is a diagram for explaining a method of updating the extraction color conditions in the embodiment of FIG. 13.
Figure 21:
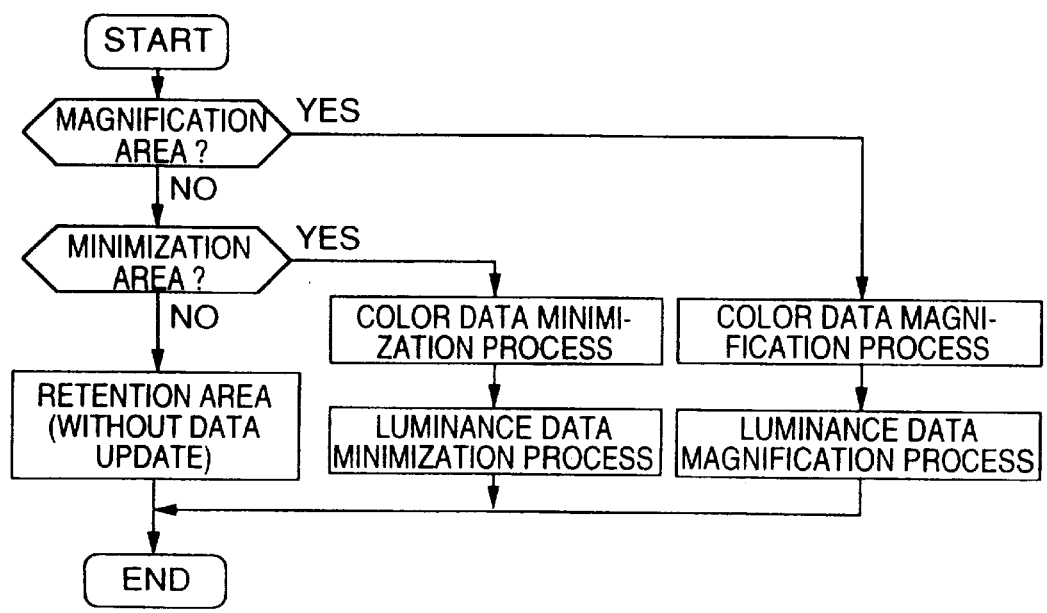
FIG. 21 is a flowchart for explaining a process of updating the extraction color conditions in the embodiment of FIG. 13.

According to the flow shown in FIG. 21, the respective processes are executed depending on in which one of the three kinds of areas of FIG. 20 the calculated distribution ratio exists.

The process of the minimization area will be described by referring to FIGS. 22A, 22B, 23A, and 23B.

Figure 22A:
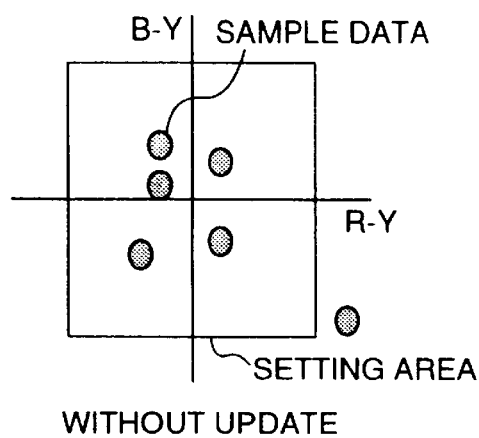
FIGS. 22A and 22B are diagrams for explaining a process of minimizing a setting color area of the extraction color conditions in the embodiment of FIG. 13.
Figure 22B:
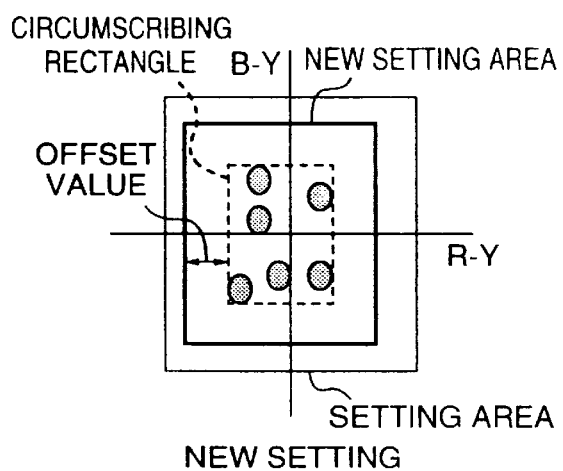

In the color data minimization process, the process is first carried out by subdividing the sample data into two states of established areas as shown in FIGS. 22A and 22B. That is, when either one of the sample data items is beyond the area as shown in FIG. 22A, the setting area is not changed. Additionally, when all of sample data items are within the established area as shown in FIG. 22B, there is attained a rectangle circumscribing the sample data items (maximum and minimum values of color data) and then the rectangle is expanded according to the setting values (offset values) in the memory (by adding the offset value to the maximum value of color data and by subtracting the offset value from the minimum value) to produce a new setting area.

Figure 23A:
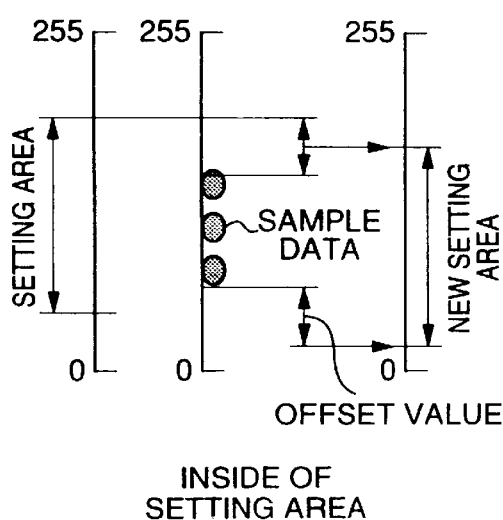
FIGS. 23A and 23B are diagrams for explaining a process of minimizing a setting luminance area of the extraction color conditions in the embodiment of FIG. 13.
Figure 23B:
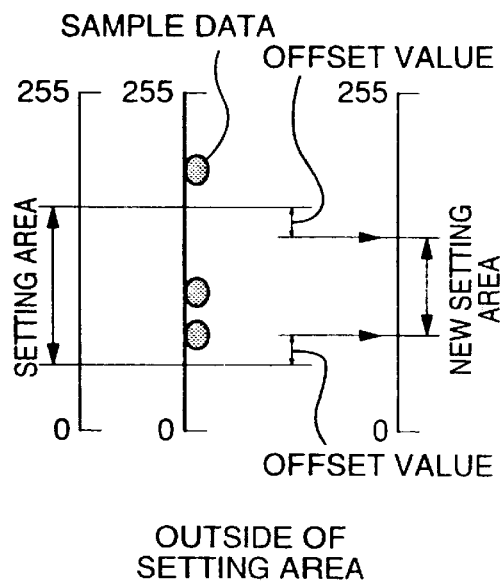

Next, in the luminance data minimization process, the process is carried out by subdividing the sample data into two states of established areas as shown in FIGS. 23A and 23B. That is, when all of sample data items are within the established area as shown in FIG. 23A, there are obtained the maximum and minimum values of luminance data items of color data. A half value of the difference between the maximum value of sample luminance data and that of the established area is added to the maximum value of sample luminance data and a setting value (offset value) in the memory is subtracted from the minimum value of sample luminance data to thereby create a new setting area. Moreover, when either one of the sample data items is beyond the area as shown in FIG. 23B, a setting values (offset values) in the memory is subtracted from the maximum value of the established area and a setting values (offset values) in the memory is added to the minimum value of the established are to produce a new setting area.

The magnification area process will be described by referring to FIGS. 24A, 24B, 25A, and 25B.

Figure 24A:
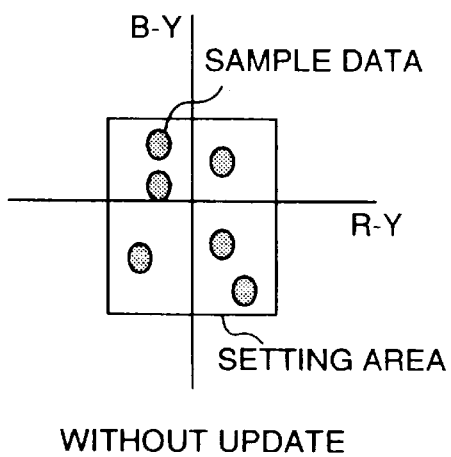
FIGS. 24A and 24B are diagrams for explaining a process of magnifying a setting color area of the extraction color conditions in the embodiment of FIG. 13.
Figure 24B:
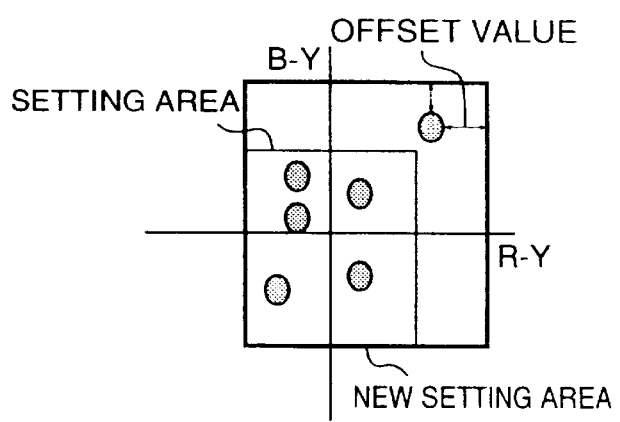

First, in the color data magnification process, the process is first carried out by subdividing the sample data into two states of established areas as shown in FIGS. 24A and 24B. That is, when all of sample data items are within the established area as shown in FIG. 24A, the setting area is unchanged. Furthermore, when either one of the sample data items is beyond the area as shown in FIG. 24B, a setting value (offset value) in the memory is added to the sample data to generate a new setting area.

Figure 25A:
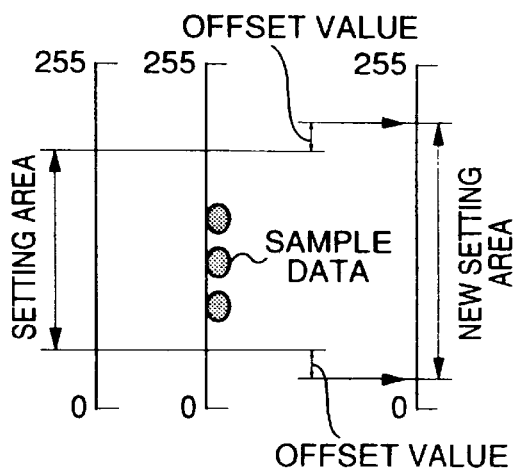
FIGS. 25A and 25B are diagrams for explaining a process of magnifying a setting luminance area of the extraction color conditions in the embodiment of FIG. 13.
Figure 25B:
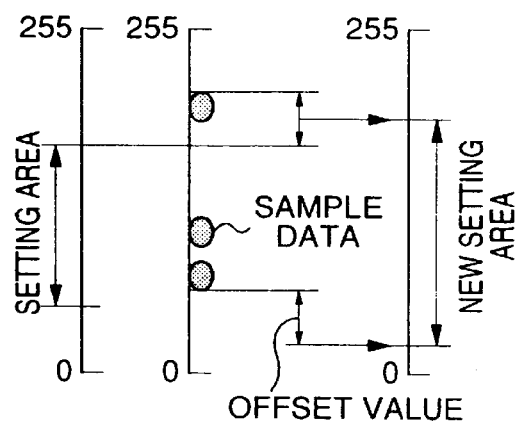

Subsequently, in the luminance data magnification process, the process is carried out by subdividing the sample data into two states of established areas as shown in FIGS. 25A and 25B. That is, when all of the sample data items are within the established area as shown in FIG. 25A, a setting value (offset value) in the memory is added to the maximum value of the established area and a setting value (offset value) in the memory is subtracted from the maximum value of the established area to produce a new setting area. Additionally, when either one of the sample data items is beyond the area as shown in FIG. 25B, there are obtained the maximum and minimum values of luminance data items of sample data. A half value of the difference between the maximum value of sample luminance data and that of the established area is added to the maximum value of sample luminance data and a setting value (offset value) in the memory is subtracted from the minimum value of sample luminance data to thereby create a new setting area.

Next, in an optical system zoom setting process (S210), according to the data of road surfaces thus recognized, the zoom rate is determined such that the width between the lines matches the width of the screen in the screen bottom portion.

In an iris setting process (S212), when the nighttime is assumed, in relation to the iris value of the video camera in the ordinary operation (in which the iris is slightly closed, namely, the iris value is minimized to prevent saturation even when the sky is partly shot), the reference value in the automatic iris mechanism set to slightly open the iris, namely, to increase the iris value.

Although this may cause saturation for an object having a high luminance (a white line on the road surface, a lamp of a car running in a direction opposite to that of the pertinent vehicle, and the like), the color data becomes clear for an object having a lower luminance.

On the other hand, when the daytime is assumed, the reference value in the ordinary operation is utilized.

Figure 26:
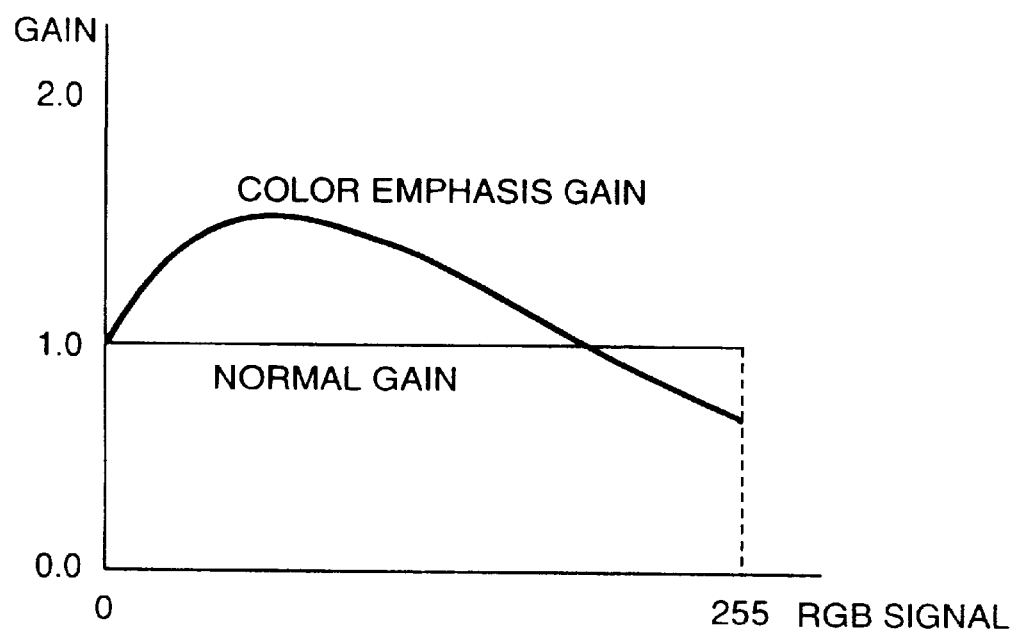
FIG. 26 is a diagram showing a setting characteristic of the color emphasis gain in the embodiment of FIG. 13.

In a color emphasis setting process (S214), when the nighttime is assumed, the conversion gain of the color difference conversion circuit 1014 is changed to the emphasized gain as shown in FIG. 26.

As a result, the color having a lower luminance can be emphasized to facilitate discrimination between the achromatic and chromatic colors.

On the other hand, when the daytime is assumed, the normal gain is employed.

Consequently, according to this embodiment even when the state of illumination on the road surface varies depending on the difference between daytime and nighttime, variation in the intensity of sunlight, and before and after a tunnel, the extraction condition can be altered in association with the change of the illumination state, which therefore makes it possible to continuously recognize the road surface area in a guaranteed manner.

As described in detail above, according to the embodiment, in a case in which the road having an achromatic color is beforehand separated from other chromatic colors and then there is executed the process to recognize the road surface, the extraction color condition related to the road surface is varied in association with the environmental changes (day and night, variation in the intensity of sunlight, before and after a tunnel, etc.), thereby providing a running road surface monitoring apparatus capable of recognizing in a guaranteed fashion a road area available for the running of the pertinent.

Subsequently, referring to the drawings, description will be given of a third embodiment of an image processing apparatus according to the present invention.

Figure 27:
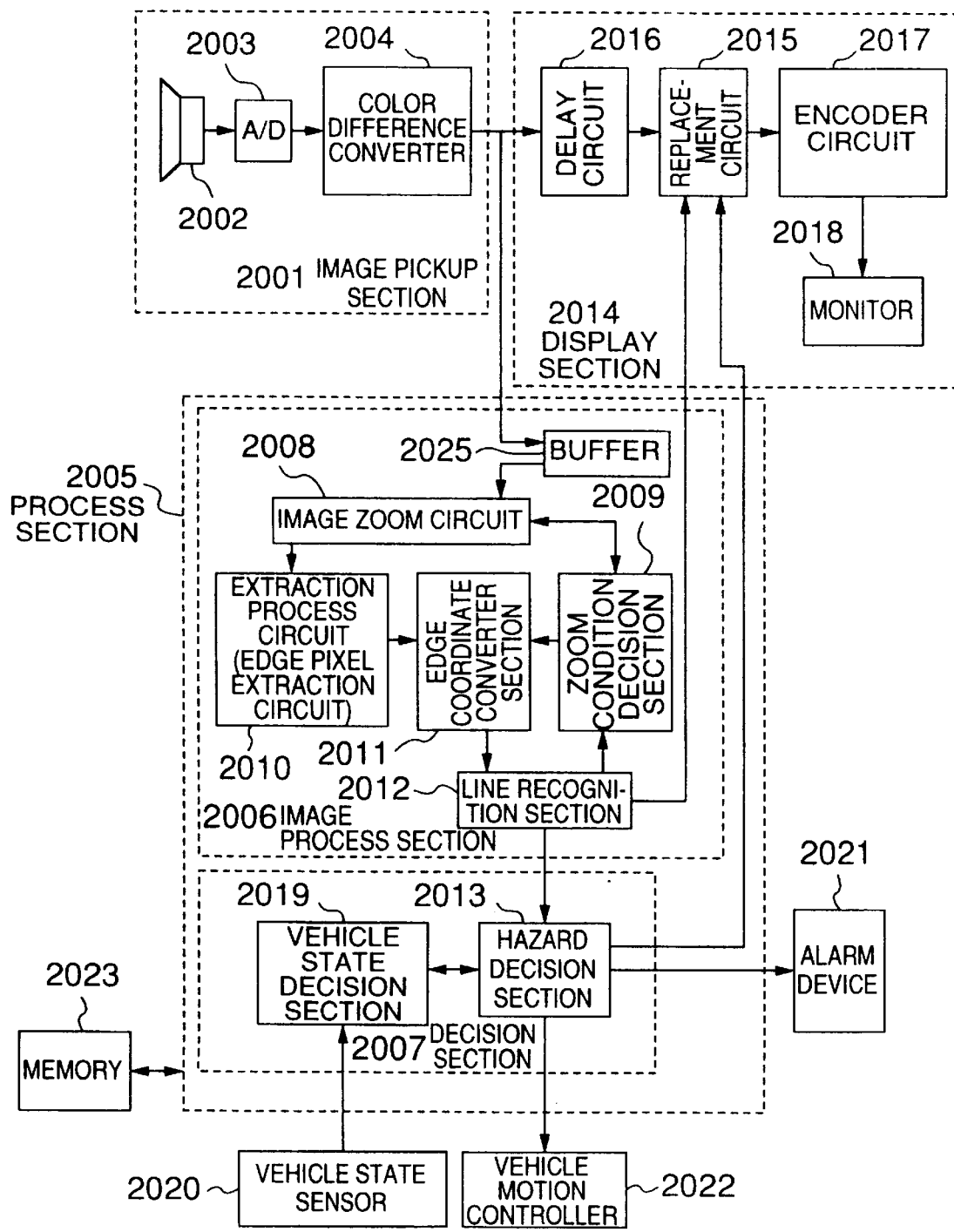
FIG. 27 is a block diagram showing the overall construction of a third embodiment of the image processing apparatus according to the present invention.

FIG. 27 shows the configuration of the image processing apparatus according to the present invention.

The apparatus includes an image pickup section 2001, a processing section 2005, a memory 2023, and a display section 2014. Moreover, the process section 2005 includes an image process section 2006 and a decision section 2007. Additionally, signals are communicated between the decision section 2007 and a vehicle state sensor 2020, a vehicle motion controller 2022, and an alarm device 2021. In this connection, the display section may be omitted in this embodiment.

The respective constituent elements of the apparatus of the embodiment will be next described.

First, the image pickup section 2001 will be described.

A CCD camera 2002 is image pickup means to shoot an object in front thereof to attain image information and has a function to convert the image information of the object into a color analog signal. For example, when using the camera 2002 on the vehicle, it is only necessary to set the camera 2002 in a clear position near the grille in the front portion of the vehicle or in a position having a wide front sight near a rearview mirror or a sun visor in the car.

Next, an A/D converter 2003 carries out a process to transform the analog image signal outputted from the CCD camera 2002 into a digital signal.

Thereafter, the color difference conversion circuit 2004 conducts a process to convert the digital signals outputted from the A/D converter 2003, namely, digital signals corresponding to three primary colors (R (red), G (green), B (blue)) of the object into luminance signal Y and color difference signals R−Y and B−Y defined according to the following formulae.

$$Y=0.3R+0.6G+0.1B$$

$$R-Y=0.7R-0.6G-0.1B$$

$$B-Y=-0.3R-0.6G+0.9B$$

The luminance and color difference signals attained through the conversion according to the formulae above are inputted to a delay circuit 2016 and are stored in a buffer 2025.

Subsequently, the process section 2005 will be described. Since the contents of operation thereof will be described later, the functions of the respective components will be briefly described in the following paragraphs.

As shown in FIG. 27, the process section 2005 includes an image process section 2006 and a decision section 2007.

First, the components of the image process section 2006 will be described.

The buffer 2025 is means to store therein image information sent from the color difference converter 2004 and it is not necessarily required that the buffer 2025 has a capacity of one frame. For example, when the process unit of the image process is three lines, the buffer need only be configured to have a capacity of three lines.

An image zoom circuit 2008 receives image information from the buffer 2025 to conduct by a zoom condition decision section 2009, which will be described later, a process to enlarge the image information only in the horizontal direction (for example, for each horizontal line) according to a zoom condition (including the zoom center coordinates and magnifying factor) decided for each horizontal line and then carries out a process to transfer the enlarged image information to an extraction process circuit 2010. In this regard, it may possible to omit the buffer 1025 such that the image information of each horizontal line is transmitted from the color difference conversion circuit 4 to the image process section 1006.

In this description, the zoom center coordinates are a parameter to indicate a position of the reference point for the magnifying process and the magnifying factor is a parameter to denote the factor of magnification of the image information.

The extraction process circuit 2010 extracts pixels associated with the predetermined extraction color condition data from the magnified image information, carries out an image process for the pixels to remove a noise and the like therefrom, and then transfers to the edge coordinate conversion section 11 the position coordinate data (edge coordinate data) corresponding to the extracted pixels on the pertinent horizontal line. Incidentally, the extraction color condition data is particular luminance and color difference data. Ordinarily, using the luminance and color difference data of the road color (running lane), it is only necessary to beforehand store the extraction color condition data in the memory 2023 such that the extraction process circuit 2010 extracts the data therefrom when necessary.

In this connection, assuming a change point in the investigation of one horizontal line from a pixel not satisfying the extraction color condition data to a pixel satisfying the condition data, the pixel satisfying the condition data is called a rising edge pixel and coordinate data thereof is referred to as edge coordinate data of the rising edge pixel. Similarly, assuming a change point in the investigation of one horizontal line from a pixel satisfying the extraction color condition data to a pixel not satisfying the condition data, the pixel satisfying the condition data is called a falling edge pixel and coordinate data thereof is referred to as edge coordinate data of the falling edge pixel. In this connection, the edge coordinate data includes, in addition to the coordinate information, information designating that the edge coordinates are related to a rising or falling edge.

Subsequently, according to the zoom center coordinates and magnifying factor transferred from the zoom condition decision section 2009, an edge coordinate conversion section 2011 converts the edge coordinate data transferred from the extraction process circuit 2010 into coordinate data before the magnification to transfer the resultant coordinate data to a line recognition section 2012. Incidentally, the zoom center coordinates and magnifying factor will be described later in detail in conjunction with the image zoom process.

Next, based on the edge coordinate data transferred from the edge coordinate conversion section 2011, the line recognition section 2012 extracts edge coordinate data corresponding to the left and right lines for the running lane on which the pertinent vehicle is running. According to the extracted edge coordinate data, the section 2012 recognizes the left and right lines to transfer the results of recognition to the zoom condition decision section 2009, hazard decision section 2013, and replacement section 2015. In this regard, the detection of edge coordinates and recognition of lines of vehicle may be accomplished in the same way as for the first embodiment.

Thereafter, the zoom condition decision section 2009 receives the recognized line information from the line recognition section 2012 to calculate the zoom center coordinates and magnification factor and then transfers the coordinates and factor to the edge coordinate conversion section 2011 and image zoom circuit 2008. In this connection, it may also be possible to beforehand set the zoom condition including the zoom center coordinates and magnifying center for each horizontal line to achieve the image magnifying process.

Next, the constituent elements of the display section 2014 will be described.

The delay circuit 2016 has a function to delay the inputted image information for a period of time corresponding to the various values of process time in the process section 2005 and is a circuit to adjust synchronization when the signal outputted from the color difference conversion circuit 2004 and the process result outputted from the line recognition section 2012 are inputted to the replacement circuit 2015.

Figure 42A:
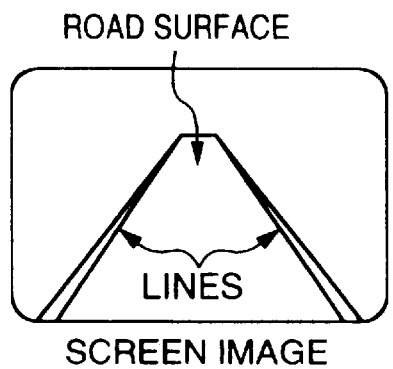
FIGS. 42A to 42D are diagrams for explaining process results of a replacement circuit.
Figure 42B:
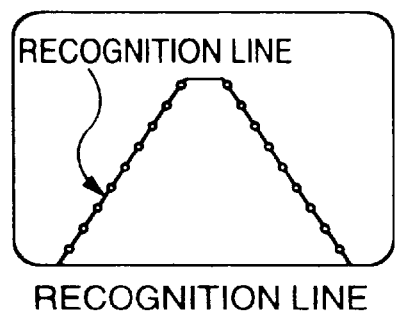
Figure 42C:
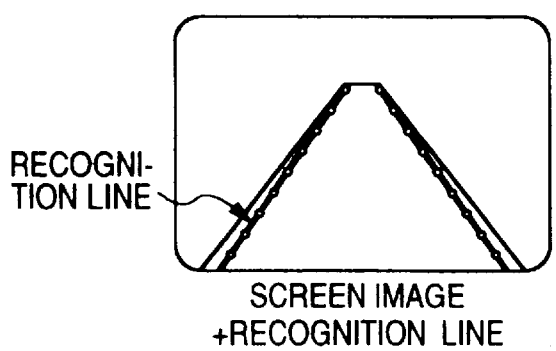
Figure 42D:
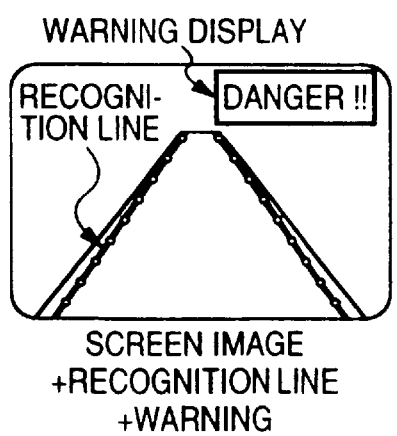

Thereafter, the replacement circuit 2015 superimposes the process result from the process section 2005 onto the image delayed by the delay circuit 2016. Specifically, image information of lines recognized by the line recognition section 2012 as shown in FIG. 42B is superimposed onto a pickup image which outputted from the delay circuit 2016 as shown in FIG. 42B and for which any image process has been conducted so as to attain image information in which the recognized lines are drawn on the pickup image as shown in FIG. 42C. Additionally, when the hazard decision section 2013 drives the alarm device 2021, it is only necessary to construct the system such that superimposing information is simultaneously supplied to the replace circuit 2015 to display alarm information on the monitor 2018. FIG. 42D shows a state in which the alarm information is displayed on the monitor 2018.

Moreover, the encoder circuit 2017 is a circuit to convert the image information outputted from the replacement circuit 2015 into an NTSC signal.

The monitor 2018 then receives the NTSC signal and then presents image information corresponding thereto on a display screen.

Next, the components of the decision section 2007 will be described.

Incidentally, the decision section 2007 is an example in which the present embodiment is applied to a device to attract intention of the driver, and the decision section itself is not included in the essential section of the embodiment.

The vehicle state decision section 2019 decides the running state of the vehicle according to a signal sent from the vehicle state sensor 2020 and then transfers the results of the decision to the hazard decision section 2013.

In the configuration, the vehicle state sensor 2008 is means to sense the moment of the vehicle, operating intention of the driver, and the like and includes a vehicle speed sensor to measure the speed of the vehicle, a direction indicator, a steering angle sensor, or the like.

The hazard decision section 2013 recognizes the running lane of the vehicle according to the edge coordinate data of the left and right lines sent from the line recognition section 2012 and existence of a car, recognizes an obstacle in front of the vehicle according to edge coordinate data corresponding to objects other than the left and right lines sent from the line recognition section 2012, and recognizes the degree of hazard for the running of the vehicle according to data transmitted from the vehicle state decision section 2019.

For example, in a case in which the speed of the vehicle sensed by the vehicle speed sensor is equal to or more than a predetermined value and existence of a car or the like is recognized at a particular position in the front image information, the hazard decision section 2013 assumes a hazard state and drives the vehicle motion controller 2022 and alarm device 2021. The vehicle motion controller 2022 is a facility to supervise the driving system, control system, and steering system. A special example is an automatic brake or the like.

Furthermore, the alarm device 2021 may be any means which stimulates attention of the driver through auditory and/or visual senses of the driver, for example, there may be used a chime driving operation and an LED display.

The configuration example of the decision section 2007 above may be implemented in various modes.

Furthermore, the memory 2023 stores and keeps therein the zoom condition determined by the zoom condition decision section 2009 and functions as a work area when the line recognition section 2012 and the like conduct processes.

Subsequently, operation of the apparatus of the embodiment will be described.

Incidentally, in this apparatus, the primary processes are concurrently executed with the different cycles.

"First process" includes a sequence of processes in which image information attained by the CCD camera 2002 is transformed via the A/D converter 2003 from an analog form into a digital form and then the digital signal is further converted through the color difference conversion circuit 2004 into a luminance signal and color difference signals such that the signals are delayed for a predetermined period of time by the delay circuit 2016 to undergo an image process by a function of the replace circuit 2015, the result of the image process is converted into an NTSC signal by the encoder circuit 2017, and then displays the results of the process on the monitor 2018.

Figure 28:
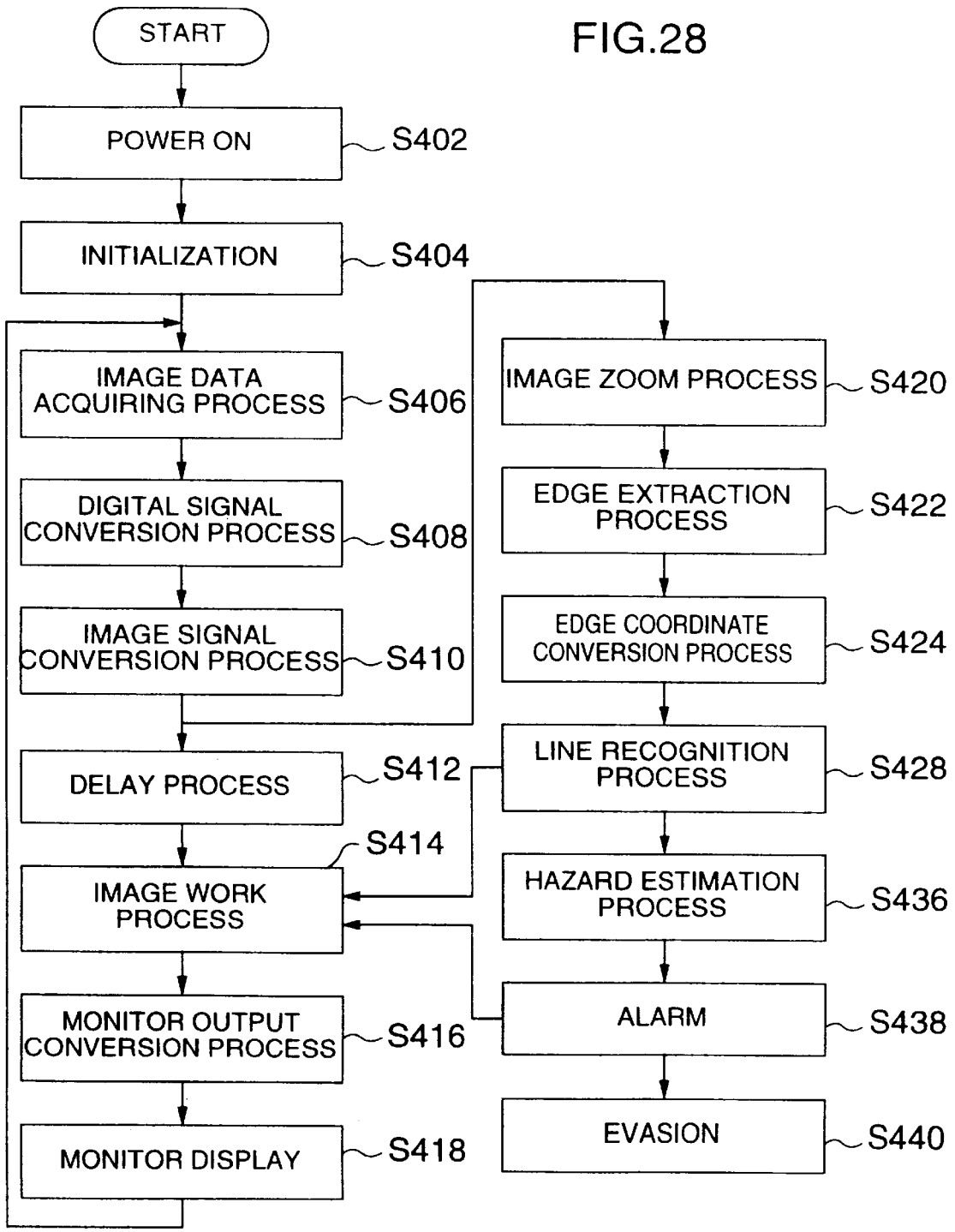
FIG. 28 is a flowchart for explaining the entire processing of the embodiment of FIG. 27.

First, the "first process" will be described by referring to FIGS. 27 and 28.

When the apparatus is operated to turn the power source of apparatus on (S402), there is executed an initialization process (S404). The initialization of the apparatus includes, for example, a process to clear the work area in the memory 2023. In addition, the operations to be accomplished by a human includes the initial adjustment of the pickup section 2001 and display section 2014 and an operation to set the extraction color condition and the initial values of the zoom condition to be used in the second process, which will be described later, via an input section, not shown.

Next, a signal corresponding to the front image information obtained by the CCD camera 2002 is outputted as an analog RGB signal (S406).

Moreover, the A/D converter 2003 transforms the analog RGB signal into a digital RGB signal (S408) and then the color difference circuit converts the digital RGB signal into a luminance signal and color difference signals according to the conversion formulae described above (S410).

Subsequently, the delay circuit 2016 receives as an input signal an image signal outputted from the color difference conversion circuit 4 to delay the input signal for a process period of time necessary for the process section 2005 (S412) so as to establish synchronization with respect to the signal processed by the process section.

Furthermore, the replacement circuit 2015 conducts a process to superimpose the process result from the process section 2017 onto the original image information not undergone any process (S414) and then the output signal from the replace circuit 2015 is converted by the encoder circuit 2017 into an NTSC signal (S416) to present a display image corresponding to the NTSC signal on the monitor (S418).

Thereafter, to obtain image information of an object in the next cycle, control is passed to step S406. Incidentally, the processes above are sequentially executed at a cycle of the frame rate (for example, 16.7 ms).

Next, "second process" will be described.

The second process includes a sequence of processes in which image information sent from the pickup section 2001 is expanded in the horizontal direction by the image zoom (image expansion) process (S420), the edge pixels are extracted (S422), lines related to the running lane are recognized for the running of the vehicle (S428), whether or not the vehicle is in a hazard state is decided (S436), the alarm device 2021 is driven (alarm; S438), and the vehicle motion controller 2022 is driven (evasion; S440).

These processes will be respectively described by referring to FIGS. 27, 28, 29A to 29D, and 30.

Figure 29A:
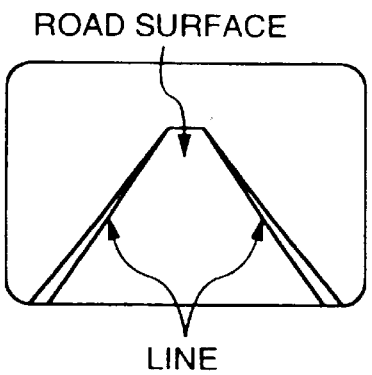
FIGS. 29A to 29E are diagrams for explaining a line recognition process in the embodiment of FIG. 27.
Figure 29B:
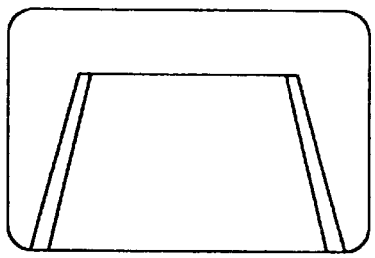
Figure 29C:
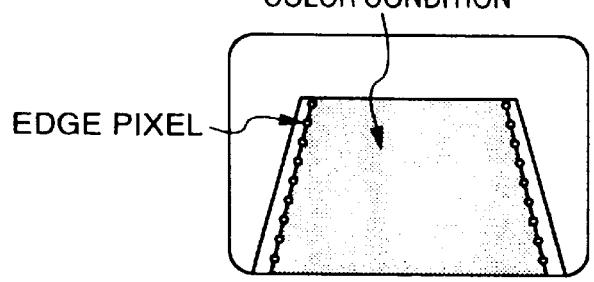
Figure 29D:
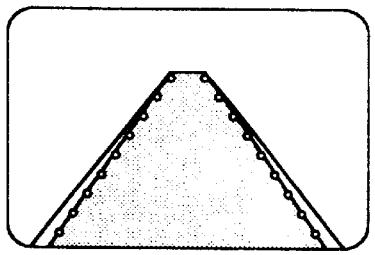

Although the image zoom process (S420) will be described in detail later, the image zoom circuit 2008 expands the image information obtained through the shooting operation only in the horizontal direction according to the established zoom condition to thereby expand the images of the road surface, white line, and the like. For example, there is executed a process in which the original image shown in FIG. 29A is magnified as shown in FIG. 29B In the edge extraction process (S422), the extraction process circuit 2010 extracts edge pixels as described above. The operation will be shown in FIG. 29C. It is naturally to be appreciated that the edge coordinate data is also extracted.

Figure 30:
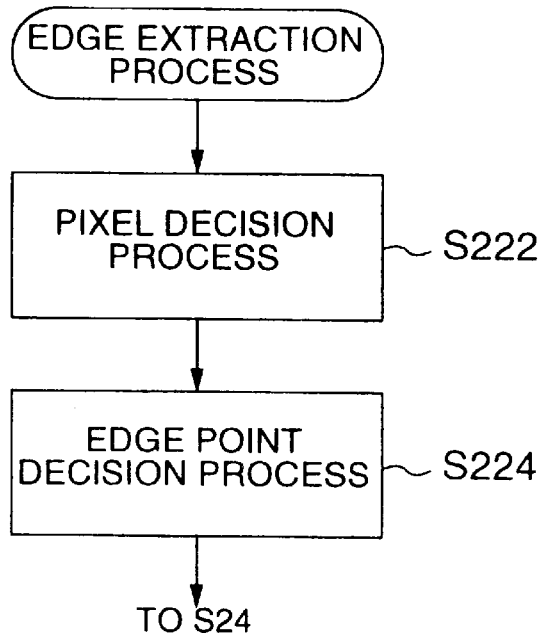
FIG. 30 is a flowchart showing an edge extraction process in the embodiment of FIG. 27.

Furthermore, FIG. 30 shows a flowchart of the contents of process of the edge extraction process (S422).

In the pixel decision process (S222), the established extraction color condition is compared with the color data of all pixels to extract the pixels satisfying the extraction color condition.

Thereafter, in the edge point decision process (S224), to remove noises, there is executed a smoothing process using, for example, "3 pixels×3 pixels" space filtering. When 50% or more of the nine pixels satisfy the extraction color condition, it is assumed that the nine pixels satisfy the extraction color condition.

Moreover, in a case in which in the investigation of the expanded image information as shown in FIG. 29B for each horizontal line, when a change occurs from a pixel not satisfying the extraction color condition data to a pixel satisfying the extraction color condition data, the pixel satisfying the extraction color condition data is called a rising edge pixel and the coordinate data thereof is referred to as edge coordinate data of the rising edge pixel. Similarly, in a case in which in the investigation of the expanded image information is conducted for each horizontal line, when a change occurs from a pixel satisfying the extraction color condition data to a pixel not satisfying the extraction color condition data, the pixel satisfying the extraction color condition data is called a falling edge pixel and the coordinate data thereof is referred to as edge coordinate data of the falling edge pixel.

Thereafter, the edge coordinate data is transferred to the edge coordinate conversion section 2011. Incidentally, in the example shown in FIG. 30, in the processing of the image information including road surfaces and lines of vehicle, when other cars or the like exist on the road surface, there may be extracted edge pixels not constituting the line.

Next, in an edge coordinate conversion process (S424), according to the zoom center coordinates and magnifying factor transferred from the zoom condition deciding section 2009, the edge coordinate data is converted to coordinate data before magnification to be transferred the line recognition section 2012.

Figures 31A, 31B:
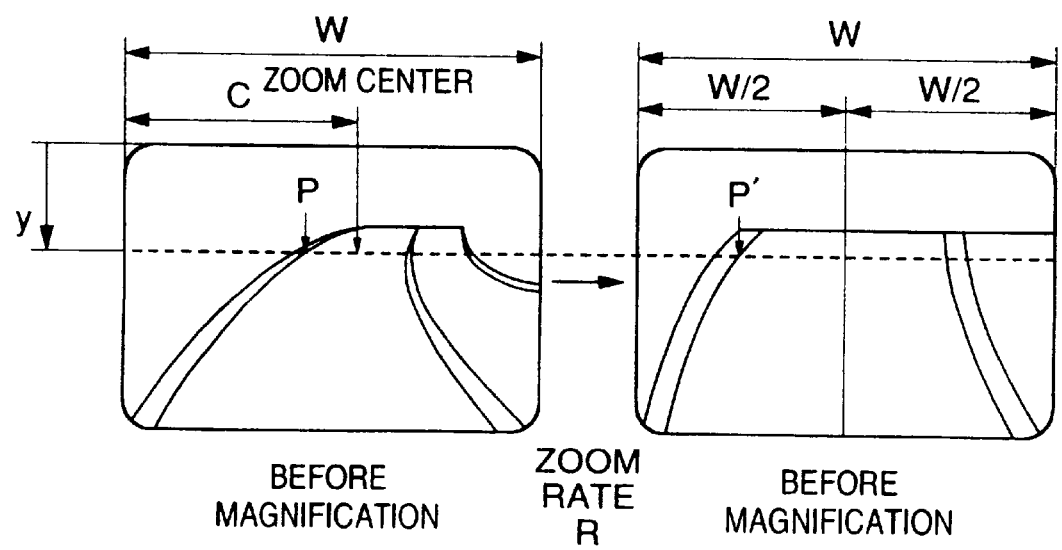
FIGS. 31A and 31B are diagrams for explaining the principle of a edge coordinate conversion process.

In this connection, FIGS. 31A and 31B respectively show image information items before and after magnification. Using the zoom center coordinates C on the y-th horizontal line relative to the upper-most edge of the screen and magnification factor R, edge coordinate data P' of FIG. 31B is converted into edge coordinate data P before magnification according to the following formula. In the formula, W designates the horizontal-directional width of a set of pixels constituting the image information.

$$P=(P'-W/2)/R+C$$

Figure 29E:
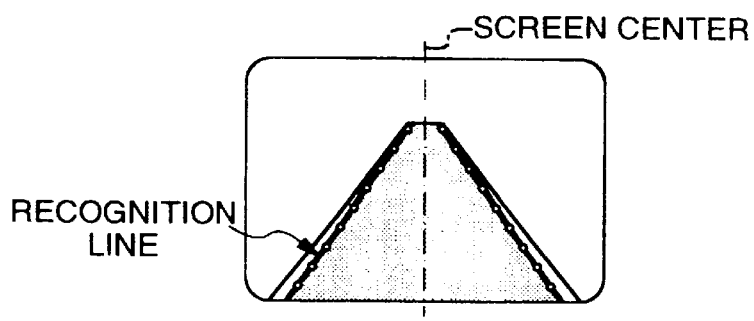

Moreover, in a line recognition process (S428), according to the transferred edge coordinate data, a plurality of approximated straight lines are obtained in a method shown, for example, in FIG. 9 related to the first embodiment to thereby estimate lines for the running lane of the pertinent vehicle as shown in FIG. 29E.

In short, the line recognition section 2012 carries out processes as follows.

Next, the line recognition section 2012 conducts a separation process for the edge coordinate data sent from the edge coordinate conversion section 2011 by deciding that the data is related to edge pixels for the left line, edge pixels for the right line, or edge pixels for the others.

In this process, the edge pixel kinds are determined on the basis of the edge coordinate conversion section 2011. In this situation, the edge coordinate data includes coordinate information of each edge pixel and information indicating that the data is related to the rising or falling edge. Generally, when the road surface color is set as the extraction color condition data, the rising edge pixels denote the left line and the falling edge pixels designates the right line. However, when a car or an obstacle exists in the road surface area in front of the pertinent vehicle, the edge pixels of other than the lines are also recognized as edge pixels of lines of vehicle.

To overcome this disadvantage, it is only necessary to assume in the decision that the rising edge pixels existing on the left of the central line of the screen of FIGS. 29A to 29E are edge pixels of the left line, the falling edges on the right of the central line are edge pixels of the right line, and the other edge pixels are edge pixels of the car or the like in front of the vehicle.

Subsequently, using the edge coordinate data of the edge pixels for the left and right lines, there are obtained approximated straight lines, for example, according to the method of least squares so as to set the lines as recognition lines. In this regard, edge coordinate data of the edge pixels other than those of the left and right lines is assumed to be related to pixels indicating the car in front of the pertinent vehicle. Of the edge coordinate data, edge coordinate data existing at a position in the proximity of the pertinent vehicle is assumed to indicate a position of the car.

Next, in the hazard decision process (S436), the running state of the vehicle (such as the vehicle speed) is decided according to a signal from the vehicle state sensor (for example, a vehicle speed sensor) to estimate whether or not the vehicle is in a dangerous state according to a relationship between the results of decision, the available road surface determined by the lines, and position of the car in front of the vehicle.

For example, when the vehicle speed detected by the vehicle speed sensor is equal to or more than a predetermined value and the position of the car is within a predetermined range, it is decided that the vehicle is in a hazardous state.

Moreover, in the alarm process (S438), when the hazardous state is determined by the hazard decision section 2013), the alarm device 2021 is driven to notify the state to the driver of the vehicle.

Thereafter, in the evasion process (S440), when the hazardous state is determined by the hazard decision section 2013), the vehicle motion controller 2022 is driven.

In this connection, the apparatus may be configured such that when it is determined that the driver's operation insufficient for the warning of the hazardous state, the vehicle motion controller 2022 is driven.

As above, repeatedly accomplishing the sequence of processes, the apparatus carries out its operation.

Next, description will be given in detail of the image zoom process (S420) which is the primary process of the present embodiment.

Figure 32:
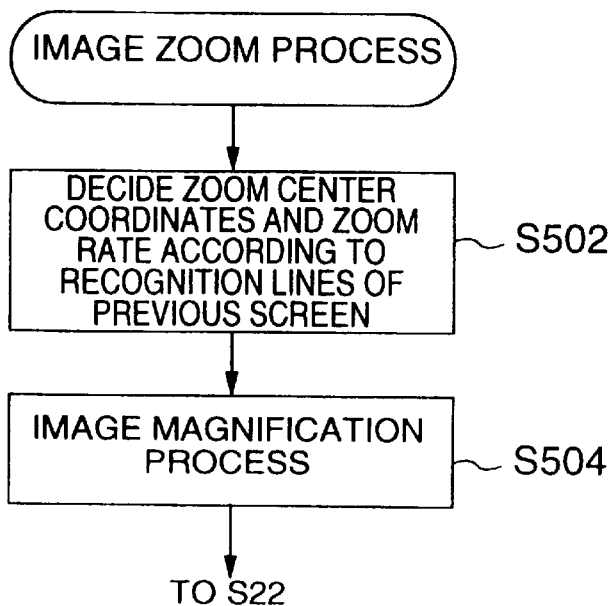
FIG. 32 is a flowchart for explaining an electronic zoom process.

FIG. 32 shows a flowchart for explaining the process contents of the image zoom process (S420).

First, with reference to the coordinate data of recognition lines and the like attained in the process during the previous cycle, the zoom condition decision section 2009 determines the zoom center coordinates and magnifying factor for each horizontal line (S502).

In the process, the zoom center coordinates are a parameter for the magnification of image information indicating a position of a reference point and the magnifying factor is a parameter denoting the factor to magnify image information. It may possible that the zoom center coordinates are set, for example, to a center position of the vehicle running lane enclosed by the recognized left and right lines and the magnifying factor is determined such that the magnified lines are within the screen (for example, about 80% of screen width W). These parameter are determined by the zoom condition decision section 2009 through an operation to recognize the center position of the vehicle running lane enclosed by the recognized left and right lines and the running lane width with reference to the edge coordinate data of the lines sent from the line recognition section 2012. When the zoom center coordinates and magnifying factor are not required to be sequentially updated, it may naturally be possible to beforehand determine these items for each horizontal line to be stored in the zoom condition decision section 2009.

Description will be next given of the operation with reference to screen images on which actual scenes are displayed.

Figure 33A:
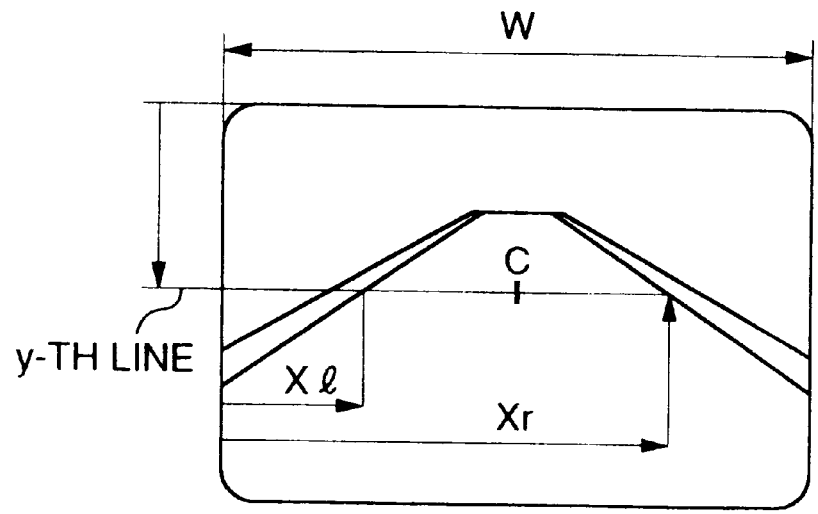
FIGS. 33A an 33B are diagrams for explaining the coordinates of a zoom center in an image.

FIG. 33A shows an example of the results of line recognition attained by the process in the previous cycle. Assuming in the y-th horizontal line relative to the upper-most edge of the screen that the left line coordinate is X1 and the right line coordinate is xr, the zoom center coordinates C and magnifying factor R are expressed by the following formulae.

Zoom center coordinate: $C=(xr+x1)/2$

Magnifying factor: $R=\alpha \times W/(xr-x1)$ where, $(xr-x1)/W < \alpha < 1$

In the formulae, $\alpha$ is a coefficient to restrict the magnified lines within the screen. When $\alpha$ is one, the distance between lines is equal to the width of the screen. However, when $\alpha$ is less than the lower-most value $((xr-x1)/W)$, R is less than one and hence image information is minimized. Consequently, $\alpha=(sr-x1)/W$ is set, namely, magnifying factor R=1. In this connection, W designates the screen width.

Figure 33B:
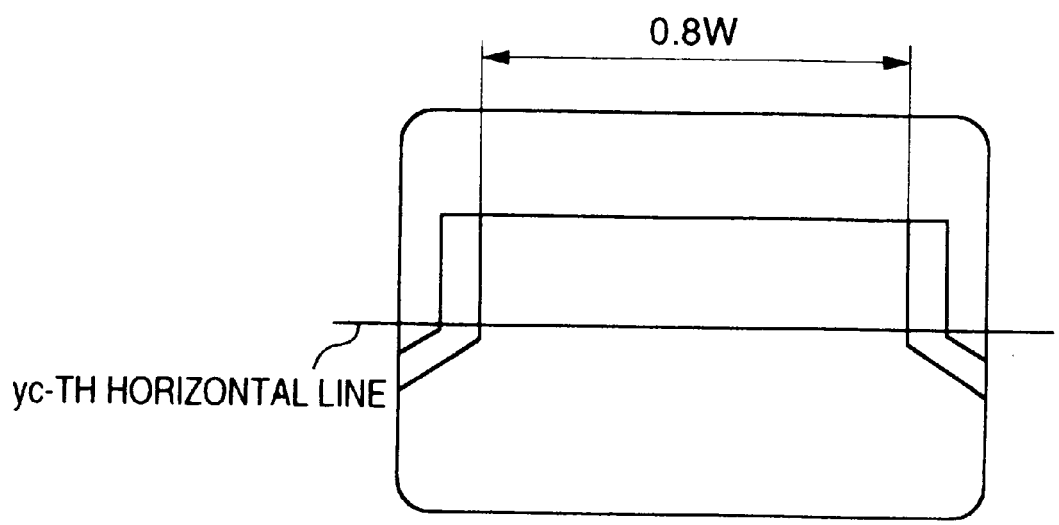

FIG. 33B shows an example of magnified image information with $\alpha=0.8$.

In this case, magnifying factor R is set such that R=1 for the lower portion beginning at $y_c$-th horizontal line and $R=0.8\times((xr-x1)/W)$ for the upper portion. That is, according to the setting operation, the distance between the lines occupies 80% of the screen in the upper portion beginning at yc-th horizontal line.

Figure 34:
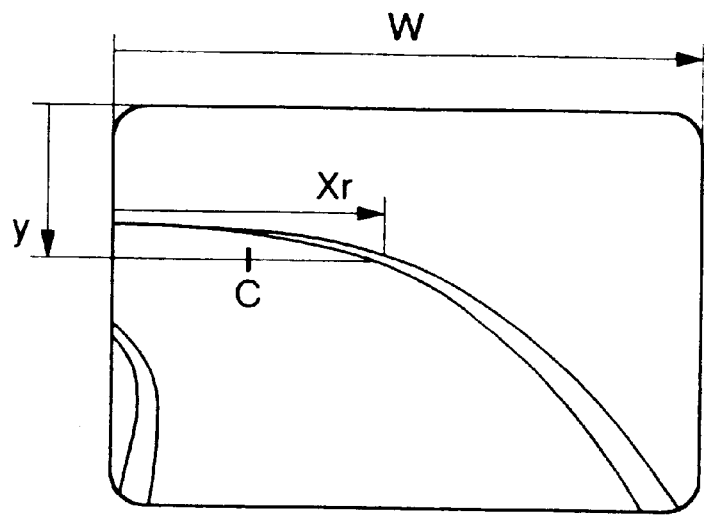
FIG. 34 is a diagram for explaining a method of attaining the zoom center coordinates in an image.

Next, FIG. 34 shows an example of results of line recognition in a case in which a curved road is assumed, namely, the recognized left line exists only partly in the screen. In this situation, in the y-th horizontal line relative to the upper-most edge of the screen, the left line coordinate is missing in the screen. Assuming the right line coordinate to be xr, the zoom center coordinate C and magnifying factor R are expressed by the following formulae.

Zoom center coordinate: $C=xr/2$

Magnifying factor: $R=\alpha \times W/xr$

These formulae are obtained by setting x1=0 in the formulae of zoom center coordinate C and magnifying factor R in association with FIGS. 33A and 33B.

Figure 35:
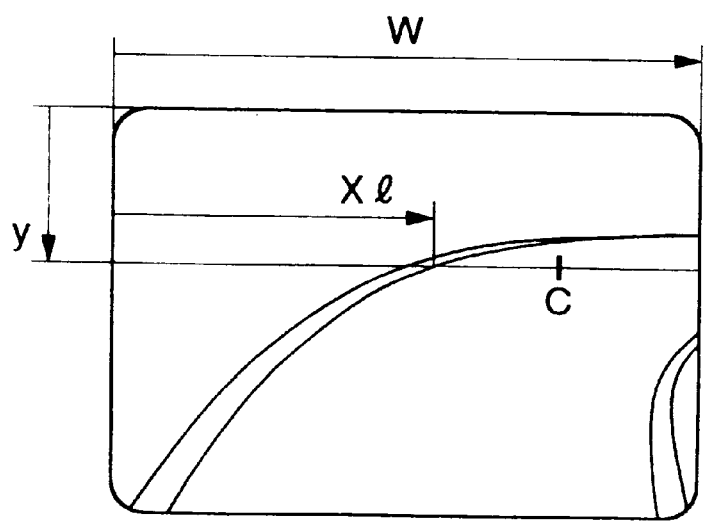
FIG. 35 is a diagram for explaining a method of attaining the zoom center coordinates in an image.

Furthermore, FIG. 35 shows an example of results of line recognition in a case in which a curved road is assumed, namely, the recognized right line exists only partly in the screen. In this case, in the y-th horizontal line relative to the upper-most edge of the screen, the left line coordinate is x1 and the left line coordinate is missing in the screen. Therefore, the zoom center coordinate C and magnifying factor R are expressed by the following formulae.

Zoom center coordinate: $C=(W+x1)/2$

Magnifying factor: $R=\alpha \times W/(W-x1)$

These formulae are attained by setting xr=W in the formulae of zoom center coordinate C and magnifying factor R in association with FIGS. 33A and 33B.

Thereafter, the image zoom circuit 2008 achieves the image magnifying process according to the determined zoom center coordinate and magnifying factor (S504).

Referring now to zooms 36A and 36B, description will be given of the magnifying process for one horizontal line.

Description will be given of a case of magnifying process in which 8-pixel data (assuming that one horizontal line includes eight pixels) is magnified with the zoom center coordinate set to a position indicated by an arrow mark and the magnifying factor set to two (times) as shown in FIG. 36A.

First, the number of pixels is obtained for the magnification. In this operation, since the number of pixels is required to be eight after the magnification, the number of pixels to be magnified is set to four in consideration of the magnifying factor "2".

Thereafter, pixel data is selected for magnification. Assume that four pixels are selected according to a selecting center set to the zoom center coordinate. The size of image information corresponding to the selected pixels is then doubled to assign eight pixels constituting one horizontal line.

Through the processes above, image information shown in FIG. 36A is magnified as shown in FIG. 36B.

By achieving the process above for all horizontal lines, the overall screen information are resultantly magnified in the horizontal direction.

Referring next to FIGS. 37A to 37C, 38A to 38D, and 39A and 39D, description will be given of a concrete example of line recognition using the image magnification process.

FIG. 38A is a detailed diagram of portion A (a part of the right line) shown in FIG. 37A. Moreover, FIG. 38B is a diagram showing results of the image magnification process (magnifying factor: 2 (times)) for FIG. 38A. As described above, in the edge point decision process (FIG. 30: S504), there is executed a "3 pixels×3 pixels" spatial filtering operation.

That is, in each of image data items $P_1$ to $P_3$, when a half or more of its nine pixels, namely, five or more pixels satisfy the extraction color condition, it is assumed that the nine pixels satisfy the extraction color condition. Incidentally, FIG. 37C shows a state of change in the magnifying factor set for each horizontal line. Specifically, the magnifying factor is determined as follows. Namely, while the magnifying factor is fixed for the upper horizontal lines beginning at the N-th horizontal line, the magnifying factor is successively reduced for the lower horizontal lines below the N-th horizontal.

FIG. 38A shows an example of three image data items P1, P2, and P3 for the magnifying factor=1. Each image data includes a total of nine pixels=3 pixels×3 pixels. In the example of FIG. 38A, in nine pixels of each of the three image data items P1, P2, and P3, three pixels indicate the white line of line of vehicle and six pixels denote the road surface. On the other hand, in the image data P2, all of the nine pixels are those denoting the white line of the line of vehicle. Therefore, in the edge point decision process, image data items P1 to P3 are respectively regarded as road surface pixels P1', white line pixels P2', and road surface pixels P3' as shown in FIG. 38C. Additionally, FIG. 38B shows an image obtained by doubling the image of FIG. 38A in the magnifying process, the image including six image data items P1a, P1b, P2a, P2b, P3a, and P3b. In nine pixels of each of the respective data items P1a and P3b, one pixel indicates the white line of the line of vehicle and eight pixels designate the road surface. In nine pixels of each of the respective data items P1b and P3a, five pixels indicate the white line of the line of vehicle and four pixels designate the road surface. In nine pixels of each of the respective data items P2a and P2b, all of the nine pixels indicate the white line of the line of vehicle. Consequently, in the edge point decision process, image data items P1a to P3b are regarded as road surface pixels P1a' and P3b' and image data items P1b, P2a, P2b, and P3a are respectively regarded as white line pixels P1b', P2a', P2b', and P3a' as shown in FIG. 38D.

In consequence, in the magnified image, the ratio of the white line in area A (reference is to be made to FIG. 37) is "⅔" as shown in FIG. 38D, namely, the ratio is increased when compared with the original image having a ratio of white line of "⅓". Therefore, when the ratio of a white line, which cannot be recognized in the original image, in the image information is increased as a result of the magnifying process, it is possible to recognize the white line. Resultantly, thanks to the magnification process, the lines of the running lane available for the vehicle can be recognized in a faraway position.

FIG. 39A shows an example of three image data items P11, P12, and P13 when the magnification factor is one and each image data item includes a total of nine pixels=3 pixels×3 pixels. In the example of FIG. 39A, the nine pixels of image data P11 includes two pixels indicating the white line of the line of vehicle and seven pixels denoting the road surface. On the other hand, the image data P12 includes three pixels designating the white line of the line of vehicle and six pixels indicating the road surface. Moreover, in the image data P12, all of the nine pixels designate the road surface. Consequently, in the edge point decision process, image data items P11', P12', and P13' are respectively regarded as road surface pixels P11', P12', and P13' and hence the white line is not detected as shown in FIG. 39C. On the other hand, FIG. 39B shows an image obtained by doubling the image of FIG. 39A, the image including six image data items P11a, P11b, P12a, P12b, P13a, and P13b. The nine pixels of image data P11b includes four pixels indicating the white line of the line of vehicle and five pixels denoting the road surface. The nine pixels of image data P12a includes five pixels indicating the white line of the line of vehicle and four pixels denoting the road surface. The nine pixels of image data P12b includes one pixel indicating the white line of the line of vehicle and eight pixels denoting the road surface. In each of the image data items P11a, P13a, and P13b, all of the nine pixels denote the road surface. Therefore, in the edge point decision process, image data P12a is regarded as white line pixel P12a' and the other data items P11a, P11b, P12b, P13a, and P13b are respectively regarded as road surface pixels P11a', P11b', P12b', P13a', and P13b' as shown in FIG. 39D. The white line can be recognized by conducting the magnifying process as above.

Next, description will be sequentially given of other methods of magnifying the image.

Figure 40A:
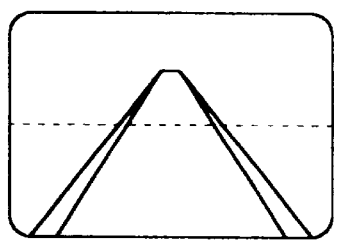
FIGS. 40A to 40C are diagrams for explaining images before and after zoom processes and zoom rates when the zoom rate varies in a discontinuous fashion.
Figure 40B:
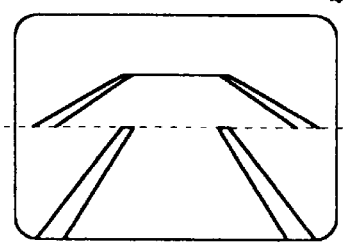

In the description above, as an example of the image magnification process, there has been explained a method in which the magnifying factor is obtained through calculation for each horizontal line. However, as shown in FIG. 40B, the magnifying factor may be discontinuously varies beginning at a horizontal line in the image magnification process.

Figure 40C:
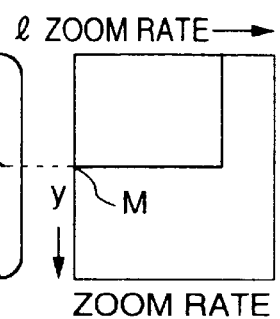
Figure 41A:
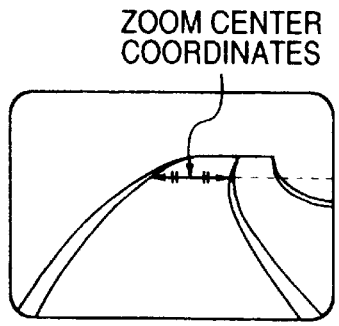
FIGS. 41A to 41C are diagrams for explaining the zoom center coordinates when the zoom rate varies in a discontinuous manner.
Figure 41B:
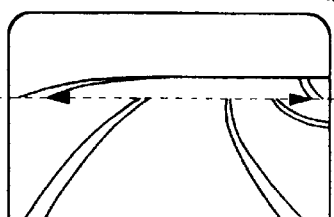
Figure 41C:
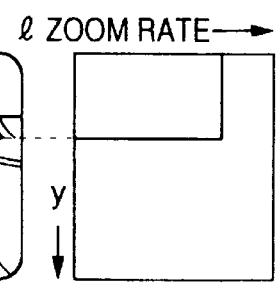

Specifically, assume as shown in FIG. 40C that a predetermined magnification factor exceeding one is set for the horizontal lines above the M-th horizontal line and a magnification factor having a value different from that of the predetermined magnification factor is set for the horizontal lines below the M-th horizontal line (the magnification process is not achieved because of magnifying factor=1 in the case of FIG. 40B). In this connection, FIG. 40B shows a process example in a case in which the magnifying factor is discontinuous. Moreover, FIG. 40A shows the original image prior to the magnification.

As above when the magnification is conducted with a predetermined magnifying factor for the horizontal lines above a particular horizontal line and the magnification process is not executed for the horizontal lines therebelow, the white line in the faraway position can be correctly recognized in a guaranteed manner. In this regard, it is only necessary to set a certain magnifying factor to the particular line.

According to this method, when compared with the method in which the magnifying factor is calculated for each horizontal line, the amount of calculations can be remarkably reduced.

Furthermore, the horizontal line at which the magnifying factor is altered and the magnifying factor may be set in the following method. In the most simple method, the horizontal line at which the magnifying factor is altered and the magnifying factor are beforehand set such that the image zoom circuit 2008 achieves the image magnification process with reference to the horizontal line and magnifying factor.

Additionally, there may be consider a method in which only the magnifying factor is fixed and the horizontal line at which the magnifying factor is altered can be changed such that a horizontal line at which the distance between the lines of vehicle is equal to a predetermined width is set as the horizontal line at which the magnifying factor is altered.

Incidentally, the zoom center coordinate need only be set to a center position of the vehicle running lane enclosed with the left and right lines in the horizontal line at which the magnifying factor is altered.

As described above, according to the present embodiment, there can be implemented an apparatus in which the lines of vehicle in a faraway position can be correctly recognized through an image magnifying process with a simple configuration.

As described above, according to the present embodiment, there can be implemented an apparatus in which the lines of vehicle can be appropriately recognized also for a faraway traffic route while retaining a wide field of vision through a process to magnifying in the horizontal direction image information obtained by an image pickup device.

We claim:

1. An image processing apparatus, comprising:
   image pickup means mounted on a vehicle for shooting an image in front of the vehicle to attain image information;
   edge pixel extraction means for scanning for each line the image information of an image in front of the vehicle obtained through the shooting operation by the image pickup means, checking boundaries between a particular color and other colors, and extracting pixels having the particular color as edge pixels;
   candidate line extraction means for referencing position coordinates of the extracted edge pixels, assuming the edge pixels to be classified into straight lines, obtaining straight lines by coupling the edge pixels corresponding to respective results of the classification, and setting the obtained straight lines as candidate lines wherein multiple candidate lines are obtained for at least one of a left and a right line;
   line selection means for selecting the left line and the right line in front of the vehicle from the candidate lines; and
   wherein the line selection means includes means for selecting two of the candidate lines which have the largest numbers of edge pixels on the left and right sides of the image information of the vehicle as the left and right lines of the vehicle, respectively.

2. An image processing apparatus according to claim 1, wherein the line selection means includes means operative in an operation to select the left and right lines for selecting as the left and right lines two candidate lines satisfying a particular positional relationship.

3. An image processing apparatus according to claim 2, wherein the line selection means includes means operative in an operation to select the left and right lines by assuming a particular horizontal line which is parallel to a horizontal direction of the front image information and which has a particular length for selecting as the left and right lines two candidate lines arranged to be brought into contact with both ends of the horizontal line.

4. An image processing apparatus, comprising:
   image pickup means mounted on a vehicle for shooting an image in front of the vehicle to attain image information;
   edge pixel extraction means for scanning for each line the image information of an image in front of the vehicle obtained through the shooting operation by the image pickup means, checking boundaries between a particular color and other colors, and extracting pixels having the particular color as edge pixels;
   candidate line extraction means for referencing position coordinates of the extracted edge pixels, assuming the edge pixels to be classified into straight lines, obtaining straight lines by coupling the edge pixels corresponding to respective results of the classification, and setting the obtained straight lines as candidate lines wherein multiple candidate lines are obtained for at least one of a left and a right line;
   line selection means for selecting the left line and the right line in front of the vehicle from the candidate lines; and
   wherein the line selection means includes means for selecting as one of the lines of the vehicle, namely, a selection line, one of the candidate lines having the largest number of edge pixels on the left or right side of the image information and selecting, in an operation to select the other line by assuming a particular horizontal line which is parallel to a horizontal direction of the front image information and which has a particular length, as the other line a candidate line arranged to be brought into contact with an end of the horizontal line when the selection line is most close to the other end thereof.

5. An image processing apparatus for identifying a line of vehicle disposed on a running road surface according to color image data of the road surface, comprising:
   color image pickup means for shooting an image in front of a vehicle along a running direction thereof;
   edge pixel extraction means for scanning for each line the image data of an image in front of the vehicle obtained through the shooting operation by the color image pickup means, checking boundaries between a particular color and other colors, obtaining pixels having the particular color as edge pixels, and extracting pixels satisfying a particular extraction color condition from the obtained edge pixels;
   color sampling means for sampling color data of the decided pixels from a single screen of the image data;
   extraction condition decision means for determining the extraction color condition according to the sampled color data; and line image extraction means for attaining as a line of the vehicle a line image configured by coupling the extracted edge pixels into a straight line.

6. An image processing apparatus according to claim 5, wherein the extraction color condition means includes means for deciding the sample pixel positions according to road surface data representing the recognized line.

7. An image processing apparatus according to claim 5, further including:
   means for deciding an illumination environment of the running road surface according to the sampled color data; and
   means responsive to a result of the decision for controlling a state of an iris of an optical system disposed in the color image pickup means and a color conversion gain of an image data processing system thereof.

8. An image processing apparatus according to claim 5, further including means for updating the extraction color condition according to a state of the sampled color data and a number of pixels satisfying the extraction color condition.

9. An image processing apparatus according to claim 5, wherein the line selection means includes means for selecting, in an operation to select either one of the left and right lines by assuming a central perpendicular line of front image information, as a line of the vehicle, one of the candidate lines which has the largest number of edge pixels on the left or right side of the central perpendicular line.

10. An image processing apparatus according to claim 9, wherein the line selection means includes means operative in an operation to select the left and right lines for selecting as the left and right lines two candidate lines satisfying a particular positional relationship.

11. An image processing apparatus according to claim 10, wherein the line selection means includes means operative in an operation to select the left and right lines by assuming a particular horizontal line which is parallel to a horizontal direction of the front image information and which has a particular length for selecting as the left and right lines two candidate lines arranged to be brought into contact with both ends of the horizontal line.

12. An image processing apparatus according to claim 9, wherein the line selection means includes means for selecting as one of the lines of the vehicle, namely, a selection line by assuming a central perpendicular line of front image information, one of the candidate lines having the largest number of edge pixels on the left or right side of the central perpendicular line and selecting, in an operation to select the other line by assuming a particular horizontal line which is parallel to a horizontal direction of the front image information and which has a particular length, as the other line a candidate line arranged to be brought into contact with an end of the horizontal line when the selection line is brought into contact with the other end thereof.

13. An image processing apparatus, comprising:
   image pickup means for shooting an image to attain image information;
   image magnification process means for magnifying a size of the obtained image information;
   edge pixel coordinate sense means for scanning for each line the magnified image information, checking boundaries between a particular color and other colors, and extracting pixels on the boundaries, and obtaining position coordinates of the extracted edge pixels;
   edge pixel coordinate conversion means for converting the position coordinates of the extracted edge pixels into coordinates before the magnification process;
   line image extraction means for referencing the converted coordinates of the edge pixels and coupling the edge pixels into a straight line, thereby attaining a line image; and
   magnifying condition storage means for storing therein a zoom rate as a magnitude of magnification of the image information and a magnification center coordinate indicating a reference position for the execution of the magnification process of the image information, the magnification factor and the magnification center coordinate being defined for each horizontal line, wherein the image magnification process means includes means for referencing storage contents in the magnifying condition storage means and magnifying for each horizontal line the size of the image information with the magnification center coordinate set to a center of magnification according to a magnification factor indicated by the zoom rate.

14. An image processing apparatus according to claim 13, wherein the image magnification process means includes means for magnifying the obtained image information only in the horizontal direction.

15. An image processing apparatus according to claim 13, wherein the magnifying condition storage means stores therein values of the zoom rate, the values continuously varying for each horizontal line.

16. An image processing apparatus according to claim 13, wherein the line extraction means includes means for obtaining, as the magnification center coordinate of each horizontal line, a center position of a vehicle running lane enclosed with the left and right lines in each horizontal line and storing the coordinate in the magnifying condition storage means.

17. An image processing apparatus according to claim 13, wherein the magnifying condition storage means beforehand stores therein values of the zoom rate, the value for horizontal lines existing above a particular horizontal line in the perpendicular direction being different from that for horizontal lines including the particular horizontal line and existing below the particular horizontal line in the perpendicular direction.

18. An image processing apparatus according to claim 14, wherein the magnifying condition storage means stores therein values of the zoom rate, the values continuously varying for each horizontal line.

19. An image processing apparatus according to claim 14, wherein the line extraction means includes means responsive to the coordinate data of extracted lines obtained by the process in a previous line extraction cycle for attaining a zoom rate and a magnification center coordinate for each horizontal line and storing the zoom rate and the magnification center coordinate in the magnifying condition storage means.

20. An image processing apparatus according to claim 14, wherein the line extraction means includes means for obtaining, according to a value obtained by dividing a predetermined screen width by a width of a vehicle running lane enclosed with the left and right lines in each horizontal line, the zoom rate for each horizontal line and storing the zoom rate in the magnifying condition storage means.

21. An image processing apparatus according to claim 15, wherein the line extraction means includes means for obtaining, as the magnification center coordinate of each horizontal line, a center position of a vehicle running lane enclosed with the left and right lines in each horizontal line and storing the coordinate in the magnifying condition storage means.

22. An image processing apparatus according to claim 14, wherein the magnifying condition storage means beforehand stores therein values of the zoom rate, the value for horizontal lines existing above a particular horizontal line in the perpendicular direction being different from that for horizontal lines including the particular horizontal line and existing below the particular horizontal line in the perpendicular direction.

23. An image processing apparatus, comprising:

image pickup means mounted on a vehicle for shooting an image in front thereof to attain image information;

image magnification process means for magnifying a size of the obtained image information;

edge pixel coordinate sense means for scanning for each line the magnified image information, checking boundaries between a particular color and other colors, and extracting pixels on the boundaries, and obtaining position coordinates of the extracted edge pixels;

edge coordinate conversion means for converting the position coordinates of the extracted edge pixels into coordinates before the magnification process; and line extraction means for referencing the converted coordinates of the edge pixels and coupling the edge pixels into a straight line, thereby attaining the left and right lines and magnifying condition storage means for storing therein a zoom rate as a magnitude of magnification of the image information and a magnification center coordinate indicating a reference position for the execution of the magnification process of the image information, the zoom rate and the magnification center coordinate being defined for each horizontal line, wherein the image magnification process means includes means for referencing storage contents in the magnifying condition storage means and magnifying for each horizontal line the size of the image information with the magnification center coordinate set to a center of magnification according to a magnification factor indicated by the zoom rate.

24. An image processing apparatus according to claim 23, wherein the line extraction means includes means responsive to the coordinate data of extracted lines obtained by the process in a previous line extraction cycle for attaining a zoom rate and a magnification center coordinate for each horizontal line and storing the zoom rate and the magnification center coordinate in the magnifying condition storage means.

25. An image processing apparatus according to claim 23, wherein the line extraction means includes means for obtaining, according to a value obtained by dividing a predetermined screen width by a width of a vehicle running lane enclosed with the left and right lines in each horizontal line, the zoom rate for each horizontal line and storing the zoom rate in the magnifying condition storage means.

26. An image processing apparatus according to claim 23, wherein the image magnification process means includes means for magnifying the obtained image information only in the horizontal direction.

27. An image processing apparatus according to claim 23, wherein the magnifying condition storage means stores therein values of the zoom rate, the values continuously varying for each horizontal line.

28. An image processing apparatus according to claim 23, wherein the line extraction means includes means for obtaining, as the magnification center coordinate of each horizontal line, a center position of a vehicle running lane enclosed with the left and right lines in each horizontal line and storing the coordinate in the magnifying condition storage means.

29. An image processing apparatus according to claim 23, wherein the magnifying condition storage means beforehand stores therein values of the zoom rate, the value for horizontal lines existing above a particular horizontal line in the perpendicular direction being different from that for horizontal lines including the particular horizontal line and existing below the particular horizontal line in the perpendicular direction.

* * * * *

UNITED STATES PATENT AND TRADEMARK OFFICE
CERTIFICATE OF CORRECTION

PATENT NO. : 5,987,174
DATED : November 16, 1999
INVENTOR(S) : Kazuto NAKAMURA et al.

It is certified that error appears in the above-identified patent and that said Letters Patent is hereby corrected as shown below:

Title page item [30], second line, change "May 18, 1995 [JP] Japan 7-11986" to --May 18, 1995 [JP] Japan 7-119856--.

Signed and Sealed this

Twenty-seventh Day of February, 2001

Attest:

NICHOLAS P. GODICI

Attesting Officer

Acting Director of the United States Patent and Trademark Office